(12) United States Patent  
Yoshino

(10) Patent No.: US 8,379,976 B2  
(45) Date of Patent: Feb. 19, 2013

(54) IMAGE PROCESSING APPARATUS AND METHOD AND A COMPUTER-READABLE RECORDING MEDIUM ON WHICH AN IMAGE PROCESSING PROGRAM IS STORED

(75) Inventor: Kyoji Yoshino, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 388 days.

(21) Appl. No.: 12/754,787

(22) Filed: Apr. 6, 2010

(65) Prior Publication Data

US 2010/0254602 A1  Oct. 7, 2010

(30) Foreign Application Priority Data

Apr. 7, 2009  (JP) ................. 2009-093384

(51) Int. Cl.
*G06K 9/00* (2006.01)
(52) U.S. Cl. ............ 382/167; 382/162; 382/165
(58) Field of Classification Search .......... 382/162, 382/167, 165, 284, 285; 345/419, 424; 348/36; 359/664, 725
See application file for complete search history.

(56) References Cited

U.S. PATENT DOCUMENTS 6,754,400 B2 * 6/2004 Florin et al. ........... 382/285

FOREIGN PATENT DOCUMENTS

JP  2008-061172 A  3/2008

\* cited by examiner

*Primary Examiner* — Anh Hong Do
(74) *Attorney, Agent, or Firm* — Sughrue Mion, PLLC

(57) ABSTRACT

An image processing apparatus converts an input data indicative of a fish-eye image into an output data indicative of a plane image. The apparatus includes an input data conversion unit that converts the fish-eye image into the input data including an input data pixel information and an input data color information; a fish-eye image corrected address generating unit that generates, based on the input data pixel information, an output data pixel information; an input data color information acquiring unit that acquires the input data color information based on a pattern of a color filter array; an output data color information calculating unit that calculates, based on the input data color information, an output data color information; an output data generating unit that generates the output data including the output data pixel information and the output data color information; and a storage unit that stores the input and output data.

3 Claims, 39 Drawing Sheets

EXAMPLE OF BAYER PATERN

A. COMBINAION OF RESPECTIVE BAYER PATTERNS

DATA AND RATIO OF FOUR POINTS OF RED IN CASE WHERE A CORRECTION POINT IS RED

DATA AND RATIO OF FOUR POINTS OF BLUE IN CASE WHERE A CORRECTION POINT IS RED

DATA AND RATE OF FOUR POINTS OF GREEN (rate_x+rate_y < 1)
IN CASE WHERE A CORRECTION POINT IS RED DATA AND RATE OF FOUR POINTS OF GREEN (rate_x+rate_y ≥ 1)
IN CASE WHERE A CORRECTION POINT IS RED

DATA AND RATE OF FOUR POINTS OF RED IN CASE WHERE A CORRECTION POINT IS GREEN

DATA AND RATE OF FOUR POINTS OF BLUE IN CASE WHERE A CORRECTION POINT IS GREEN

DATA AND RATE OF FOUR POINTS OF GREEN (rate_y>rate_x)
IN CASE WHERE A CORRECTION POINT IS GREEN DATA AND RATE OF FOUR POINTS OF GREEN (rate_y≤rate_x)
IN CASE WHERE A CORRECTION POINT IS GREEN

DATA AND RATE OF FOUR POINTS OF RED IN CASE WHERE A CORRECTION POINT IS GREEN

DATA AND RATE OF FOUR POINTS OF BLUE IN CASE WHERE A CORRECTION POINT IS GREEN

DATA AND RATE OF FOUR POINTS OF GREEN (rate_y>rate_x)
IN CASE WHERE A CORRECTION POINT IS GREEN DATA AND RATE OF FOUR POINTS OF GREEN (rate_y≤rate_x)
IN CASE WHERE A CORRECTION POINT IS GREEN

DATA AND RATE OF FOUR POINTS OF RED IN CASE WHERE A CORRECTION POINT IS BLUE

DATA AND RATE OF FOUR POINTS OF BLUE IN CASE WHERE A CORRECTION POINT IS BLUE

DATA AND RATE OF FOUR POINTS OF GREEN (rate_x+rate_y < 1)
IN CASE WHERE A CORRECTION POINT IS BLUE DATA AND RATE OF FOUR POINTS OF GREEN (rate_x+rate_y ≥ 1)
IN CASE WHERE A CORRECTION POINT IS BLUE

DATA AND RATE OF FOUR POINTS OF RED IN CASE WHERE A CORRECTION POINT IS GREEN

DATA AND RATE OF FOUR POINTS OF BLUE IN CASE WHERE A CORRECTION POINT IS GREEN

DATA AND RATE OF FOUR POINTS OF GREEN (rate_y>rate_x)
IN CASE WHERE A CORRECTION POINT IS GREEN DATA AND RATE OF FOUR POINTS OF GREEN (rate_y≤rate_x)
IN CASE WHERE A CORRECTION POINT IS GREEN

DATA AND RATE OF FOUR POINTS OF RED IN CASE WHERE A CORRECTION POINT IS RED

DATA AND RATE OF FOUR POINTS OF BLUE IN CASE WHERE A CORRECTION POINT IS RED

DATA AND RATE OF FOUR POINTS OF GREEN (rate_x+rate_y < 1)
IN CASE WHERE A CORRECTION POINT IS RED DATA AND RATE OF FOUR POINTS OF GREEN (rate_x+rate_y ≥ 1)
IN CASE WHERE A CORRECTION POINT IS RED

DATA AND RATE OF FOUR POINTS OF RED IN CASE WHERE A CORRECTION POINT IS BLUE

DATA AND RATE OF FOUR POINTS OF BLUE IN CASE WHERE A CORRECTION POINT IS BLUE

DATA AND RATE OF FOUR POINTS OF GREEN (rate_x+rate_y < 1)
IN CASE WHERE A CORRECTION POINT IS BLUE DATA AND RATE OF FOUR POINTS OF GREEN (rate_x+rate_y ≥ 1)
IN CASE WHERE A CORRECTION POINT IS BLUE

DATA AND RATE OF FOUR POINTS OF RED IN CASE WHERE A CORRECTION POINT IS GREEN

DATA AND RATE OF FOUR POINTS OF BLUE IN CASE WHERE A CORRECTION POINT IS GREEN

DATA AND RATE OF FOUR POINTS OF GREEN (rate_y>rate_x)
IN CASE WHERE A CORRECTION POINT IS GREEN DATA AND RATE OF FOUR POINTS OF GREEN (rate_y≤rate_x)
IN CASE WHERE A CORRECTION POINT IS GREEN

DATA AND RATE OF FOUR POINTS OF RED IN CASE WHERE A CORRECTION POINT IS GREEN

DATA AND RATE OF FOUR POINTS OF BLUE IN CASE WHERE A CORRECTION POINT IS GREEN

DATA AND RATE OF FOUR POINTS OF GREEN (rate_y>rate_x)
IN CASE WHERE A CORRECTION POINT IS GREEN DATA AND RATE OF FOUR POINTS OF GREEN (rate_y≤rate_x)
IN CASE WHERE A CORRECTION POINT IS GREEN

DATA AND RATE OF FOUR POINTS OF RED IN CASE WHERE A CORRECTION POINT IS BLUE

DATA AND RATE OF FOUR POINTS OF BLUE IN CASE WHERE A CORRECTION POINT IS BLUE

DATA AND RATE OF FOUR POINTS OF GREEN (rate_x+rate_y < 1)
IN CASE WHERE A CORRECTION POINT IS BLUE DATA AND RATE OF FOUR POINTS OF GREEN (rate_x+rate_y ≥ 1)
IN CASE WHERE A CORRECTION POINT IS BLUE

DATA AND RATE OF FOUR POINTS OF RED IN CASE WHERE A CORRECTION POINT IS RED

DATA AND RATE OF FOUR POINTS OF BLUE IN CASE WHERE A CORRECTION POINT IS RED

DATA AND RATE OF FOUR POINTS OF GREEN (rate_x+rate_y < 1)
IN CASE WHERE A CORRECTION POINT IS RED DATA AND RATE OF FOUR POINTS OF GREEN (rate_x+rate_y ≥ 1)
IN CASE WHERE A CORRECTION POINT IS RED

DATA AND RATE OF FOUR POINTS OF RED IN CASE WHERE A CORRECTION POINT IS GREEN

DATA AND RATE OF FOUR POINTS OF BLUE IN CASE WHERE A CORRECTION POINT IS GREEN

DATA AND RATE OF FOUR POINTS OF GREEN (rate_y>rate_x)
IN CASE WHERE A CORRECTION POINT IS GREEN DATA AND RATE OF FOUR POINTS OF GREEN (rate_y≤rate_x)
IN CASE WHERE A CORRECTION POINT IS GREEN

DATA AND RATE OF FOUR POINTS OF RED IN CASE WHERE A CORRECTION POINT IS BLUE

DATA AND RATE OF FOUR POINTS OF BLUE IN CASE WHERE A CORRECTION POINT IS BLUE

DATA AND RATE OF FOUR POINTS OF GREEN (rate_x+rate_y < 1)
IN CASE WHERE A CORRECTION POINT IS BLUE DATA AND RATE OF FOUR POINTS OF GREEN (rate_x+rate_y ≥ 1)
IN CASE WHERE A CORRECTION POINT IS BLUE

DATA AND RATE OF FOUR POINTS OF RED IN CASE WHERE A CORRECTION POINT IS GREEN

DATA AND RATE OF FOUR POINTS OF BLUE IN CASE WHERE A CORRECTION POINT IS GREEN

DATA AND RATE OF FOUR POINTS OF GREEN (rate_y>rate_x)
IN CASE WHERE A CORRECTION POINT IS GREEN DATA AND RATE OF FOUR POINTS OF GREEN (rate_y≤rate_x)
IN CASE WHERE A CORRECTION POINT IS GREEN

DATA AND RATE OF FOUR POINTS OF RED IN CASE WHERE A CORRECTION POINT IS GREEN

DATA AND RATE OF FOUR POINTS OF BLUE IN CASE WHERE A CORRECTION POINT IS GREEN

DATA AND RATE OF FOUR POINTS OF GREEN (rate_y>rate_x)
IN CASE WHERE A CORRECTION POINT IS GREEN DATA AND RATE OF FOUR POINTS OF GREEN (rate_y≤rate_x)
IN CASE WHERE A CORRECTION POINT IS GREEN

DATA AND RATE OF FOUR POINTS OF RED IN CASE WHERE A CORRECTION POINT IS RED

DATA AND RATE OF FOUR POINTS OF BLUE IN CASE WHERE A CORRECTION POINT IS RED

DATA AND RATE OF FOUR POINTS OF GREEN (rate_x+rate_y < 1)
IN CASE WHERE A CORRECTION POINT IS RED DATA AND RATE OF FOUR POINTS OF GREEN (rate_x+rate_y ≥ 1)
IN CASE WHERE A CORRECTION POINT IS RED

IMAGE PROCESSING APPARATUS AND METHOD AND A COMPUTER-READABLE RECORDING MEDIUM ON WHICH AN IMAGE PROCESSING PROGRAM IS STORED

BACKGROUND OF THE INVENTION

1. Field of the Invention

The present invention relates generally to the technical field of an image processing apparatus, an image processing method, and a computer-readable recording medium on which an image processing program is stored.

2. Related Art

In order to convert an image (e.g., a fish-eye image) as captured with the use of a wide-angle lens (e.g., a fish-eye lens) into a two-dimensional plane image and display it, the image as captured has been subjected to an RGB color conversion utilizing an RGB conversion circuit, and then subjected to a distortion correction utilizing a distortion correction circuit, thereby converting it into the plane image.

A circuit having a semiconductor chip such as an FPGA (Field Programmable Gate Array) has been used to achieve such conversion.

Japanese Patent Provisional Publication No. 2008-061172 discloses an invention in which data that are captured through a wide-angle lens and include distortion are subjected to a distortion correction, and RGB data are interpolated by an RGB interpolation circuit, thereby generating output data.

However, the above-described interpolation requires interpolation of respective color data of R (Red), G (Green) and B (Blue) in response to the input data, with the result that an amount of data of the input data after the completion of conversion increases threefold relative to the data before the input. Such an amount of data may become an obstacle of a storage region of an apparatus, which performs the above-mentioned functions, and cause problems of increased costs.

In addition, the input data (including defective parts) are corrected through an RGB conversion circuit and then further corrected through a distortion correction circuit. As a result, the image quality may be degraded in comparison with a case where the input data (e.g., image data based on the Bayer pattern, an example of a specific pattern) are directly corrected (converted into a plane image).

Recently, digital cameras with more than ten million pixels have favorably been used. RGB data of an image as captured by such a camera has an extremely huge data size. Storing such data in a memory may therefore require a memory having a huge storage region, thus causing problems of further increased costs, and a complicated circuit and an enlarged circuit along with an expansion of the memory may contribute to problems of an increased general power consumption of a product.

SUMMARY OF THE INVENTION

An object of the present invention, which has been made to solve the above-described problems, is to provide, for example, an image processing apparatus, an image processing method and an image processing program, which permit an image conversion with a high image quality in a simple structure.

In order to attain the aforementioned object, there is provided an image processing apparatus according to a first aspect of the present invention converts an input data, which is indicative of a fish-eye image as captured through a fish-eye lens, into an output data, which is indicative of a plane image that is two-dimensionally visible, said apparatus comprising:

an input data conversion unit that converts said fish-eye image into said input data, said input data comprising an input data pixel information indicative of pixels of which said fish-eye image is composed, and an input data color information indicative of a color information corresponding to said pixels;

a fish-eye image corrected address generating unit that generates, based on said input data pixel information, an output data pixel information indicative of the pixels of which said plane image is composed;

an input data color information acquiring unit that acquires said input data color information based on a pattern of a color filter array of a Bayer pattern;

an output data color information calculating unit that calculates, based on said input data color information, an output data color information indicative of the color information corresponding to the pixels of which said plane image is composed;

an output data generating unit that generate said output data comprising said output data pixel information and said output data color information; and a storage unit that stores said input data and said output data.

According to the first aspect of the present invention, the output data is generated based on the input data. The input data comprises the input data pixel information indicative of pixels of which the fish-eye image as captured through the fish-eye lens is composed, and the input data color information indicative of the color information corresponding to the pixels. The output data is indicative of the plane image which is two-dimensionally visible, and comprises the output data pixel information indicative of the pixels of which the plane image is composed and the output data color information indicative of the color information corresponding to the pixels.

It is therefore possible to acquire the RGB data (color information) from the input data, without using an exclusive processing circuit (an RGB conversion circuit), thus performing an image conversion with a high image quality in a simpler structure at a low cost.

In the first aspect of the present invention, the output data color information calculating unit may perform a linear operation to calculate the output data color information.

In order to attain the aforementioned object, there is provided an image processing method according to a second aspect of the present invention for converting an input data, which is indicative of a fish-eye image as captured through a fish-eye lens, into an output data, which is indicative of a plane image that is two-dimensionally visible, said method comprising:

an input data conversion step of converting the fish-eye image into the input data, the input data comprising an input data pixel information indicative of pixels of which the fish-eye image is composed, and an input data color information indicative of a color information corresponding to the pixels;

a fish-eye image corrected address generating step of generating, based on the input data pixel information, an output data pixel information indicative of the pixels of which the plane image is composed;

an input data color information acquiring step of acquiring the input data color information based on a pattern of a color filter array of a Bayer pattern;

an output data color information calculating step of calculating, based on the input data color information, an output data color information indicative of the color information corresponding to the pixels of which the plane image is composed;

an output data generating step of generating the output data comprising the output data pixel information and the output data color information; and a storage step of storing the input data and the output data.

In order to attain the aforementioned object, there is provided a computer-readable recording medium on which an image processing program is stored, said program is to be executed by a computer included in an image processing apparatus that converts an input data, which is indicative of a fish-eye image as captured through a fish-eye lens, into an output data, which is indicative of a plane image that is two-dimensionally visible, to cause the computer to function as:

an input data conversion unit that converts the fish-eye image into the input data, the input data comprising an input data pixel information indicative of pixels of which the fish-eye image is composed, and an input data color information indicative of a color information corresponding to the pixels;

a fish-eye image corrected address generating unit that generates, based on the input data pixel information, an output data pixel information indicative of the pixels of which the plane image is composed;

an input data color information acquiring unit that acquires the input data color information based on a pattern of a color filter array of a Bayer pattern;

an output data color information calculating unit that calculates, based on the input data color information, an output data color information indicative of the color information corresponding to the pixels of which the plane image is composed;

an output data generating unit that generate the output data comprising the output data pixel information and the output data color information; and a storage unit that stores the input data and the output data.

According to the second and third aspect of the present invention, the output data is generated based on the input data. The input data comprises the input data pixel information indicative of pixels of which the fish-eye image as captured through the fish-eye lens is composed, and the input data color information indicative of the color information corresponding to the pixels. The output data is indicative of the plane image which is two-dimensionally visible, and comprises the output data pixel information indicative of the pixels of which the plane image is composed and the output data color information indicative of the color information corresponding to the pixels.

It is therefore possible to acquire the RGB data (color information) from the input data, without using an exclusive processing circuit (an RGB conversion circuit), thus performing an image conversion with a high image quality in a simpler structure at a low cost.

DESCRIPTION OF THE PREFERRED EMBODIMENTS

Now, the preferred embodiments of the present invention will be described in detail below with reference to the accompanying drawings. The embodiments as described below are those in which the present invention is applied to an image processing system.

Description of a structure and a general outline of functions of an image processing apparatus according to the embodiment of the present invention will be given below with reference to FIG. 1.

Figure 1:
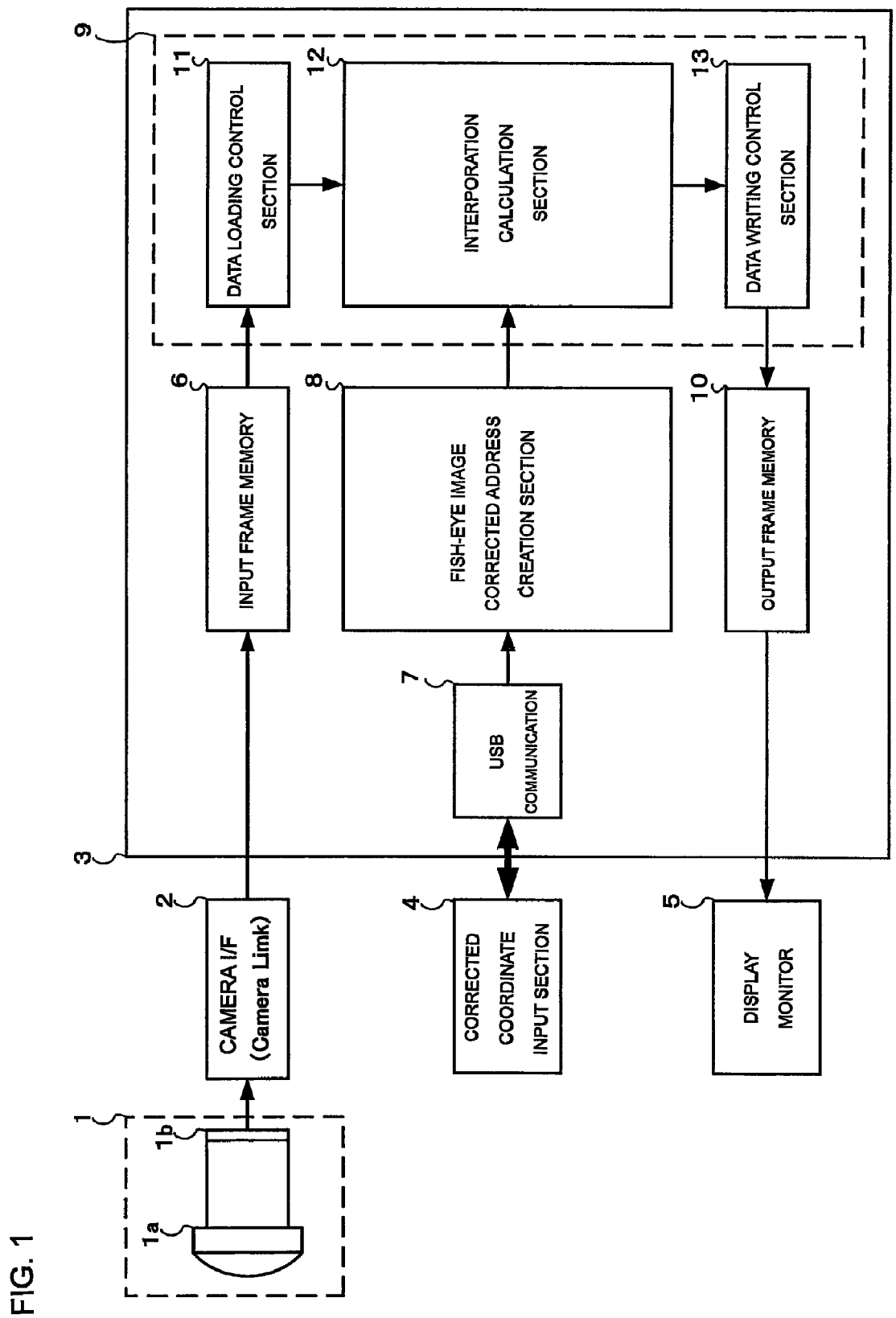
FIG. 1 is a block diagram showing a structure of an image processing apparatus according to an embodiment of the present invention.

FIG. 1 is a block diagram showing a structure of the image processing apparatus according to the embodiment of the present invention.

The image processing apparatus "S" includes an optical system 1 with a fish-eye lens, a camera I/F (interface) 2, an image correction signal processing circuit section 3, a corrected coordinate input section 4 through which corrected coordinates for desired correction of a fish-eye image may be inputted, a display monitor 5, which serves as a display unit of the present invention to display a plan image as the output data, etc.

In the optical system 1, a light captured through a fish-eye lens 1a is subjected to an adjustment operation utilizing a not-shown diaphragm mechanism, and then an image is formed as an optical image on an image sensor 1b. Such an optical image is converted into an electric signal by the image sensor 1b and then outputted to the camera I/F 2.

The fish-eye lens 1a is a kind of optical lens having a field angle of about 180 degrees. The type of fish-eye lens may include four types of an orthogonal projection, an equidistant projection, a stereographic projection and a solid angle projection. Any type of fish-eye lens may be used in the embodiment of the present invention, although the present invention is not limited only to such a lens.

The image sensor 1b converts, through a photoelectric conversion function provided by for example a photodiode as matrix-arranged, the optical image as captured into electric signals, which are proportional to brightness of the optical image, and outputs the signals to the camera I/F 2.

A CCD (Charge Coupled Device) image sensor or A CMOS (Complementary Metal-Oxide Semiconductor) image sensor may be applied for example as the image sensor 1b.

A CCD serving as a single panel color picture element provided with for example a color filter array of a known Bayer pattern is applied to the image sensor 1b used in the embodiment of the present invention, so that an object having, as one of elements thereof, a color captured through the fish-eye lens 1a may be inputted in the form of color image by the above-mentioned image sensor 1b.

Electric signals corresponding to the three primary colors of R (red), G (green) and B (blue) are required to input the object in the form of color image. The above-mentioned color filter array of the Bayer pattern is a filter used to obtain the electric signals corresponding to these colors of R, G and B.

Now, detailed description of the color filter array of the Bayer pattern will be given below with reference to FIG. 2.

Figure 2A:
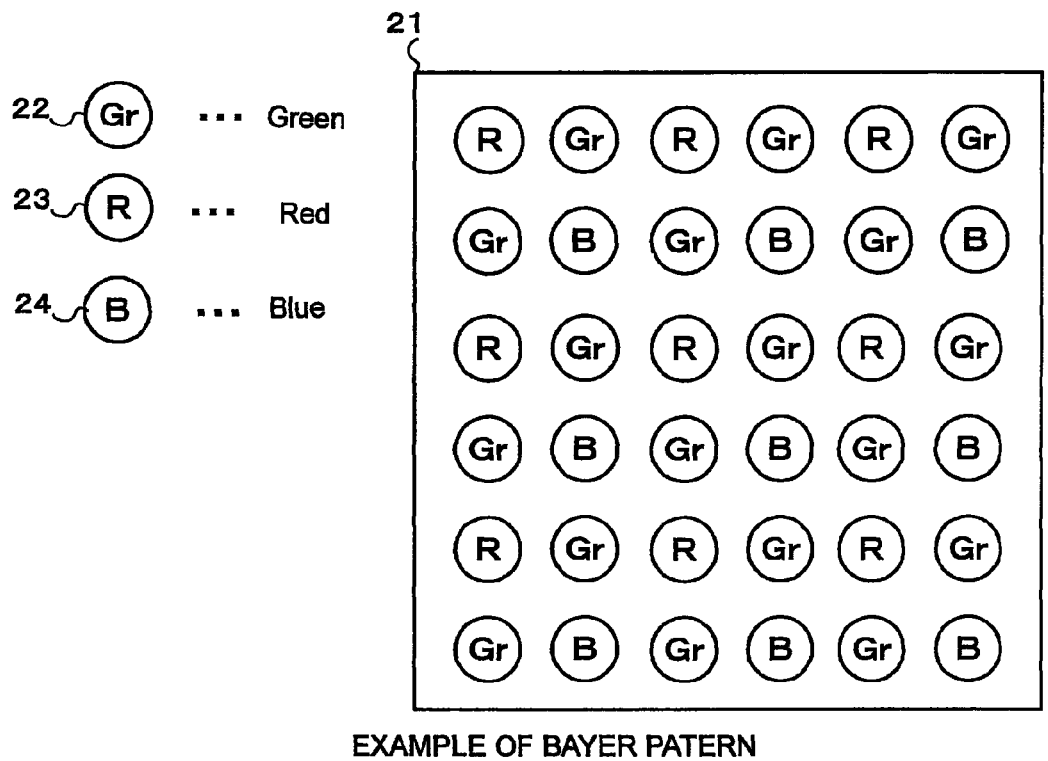
FIG. 2A is a view showing a concept of an example of a color filter array of the Bayer pattern.

FIG. 2 relates to a concept of a fundamental structure of the color filter array of the Bayer pattern, and FIG. 2A is a view showing a concept of an example of the color filter array of the Bayer pattern.

As shown in FIG. 2A, the color filter array 21 of the Bayer pattern has a stripe structure in which the first and second columns each having filters respectively operating in response to the above-mentioned electric signals are alternately placed in a horizontal direction. More specifically, there are alternately placed in the horizontal direction the first columns having green filters 22 and red filters 23, which are alternately placed, and the second columns having green filters 22 and blue filters, which are alternately placed.

Figure 2B:
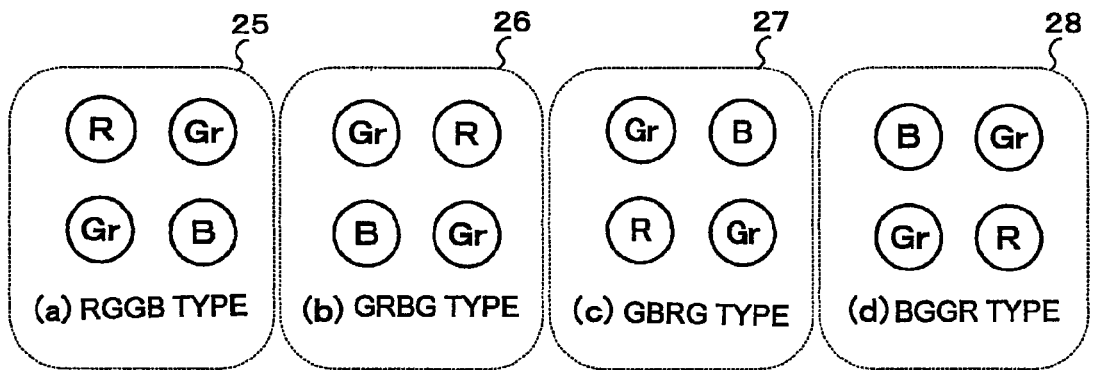
FIG. 2B is a view showing a concept of a combination of the respective Bayer patterns.

FIG. 2B is a view showing a concept of a combination of the respective Bayer patterns.

The color filter array 21 of the Bayer pattern has the specific arrangement as described above. Extracting a set of four adjacent pixels relative to an arbitrary pixel may classify the sets of four adjacent pixels into four types, i.e., (a) an RGGB type 25, (b) a GRBG type 26, (c) a GBRG type 27 and (d) a BGGR type 28.

The color filter array 21 of the Bayer pattern, as composed in this manner corresponds to the photodiode as matrix-arranged (respective pixels) so that a charge corresponding to any one of the three primary color elements of R, G and B may be accumulated in the respective pixels.

In the above-described color imaging utilizing the color filter array 21 of the Bayer pattern, the electric signal corresponding to any primary color element is outputted from the respective pixel, and accordingly, information on missing colors is required to be given for the respective pixel.

For example, concerning the pixel corresponding to the red filter 23, information on only "R" is merely given for it, and it is therefore necessary to execute an interpolation processing to calculate information on "G" and "B" based on values of the surrounding pixels.

Turning to the description relating to FIG. 1, the optical system 1 is provided further with a not-shown optical low-pass filter, which limits a space frequency as inputted into the camera I/F 2, and a not-shown infrared cut filter for cutting the other long-wavelength component than a visible light range as inputted into the camera I/F 2.

The camera I/F 2 is an interface to output the fish-eye image as captured, just in the form of an electric signal corresponding to the RGB (i.e., in the form of the Bayer pattern data, without being subjected to any processing) to an input frame memory 6 as described later.

More specifically, the camera I/F 2 outputs the fish-eye image as captured, to the input frame memory 6, in the form of an input data, which includes an input data pixel information (i.e., the electric signals corresponding to the respective pixels) indicative of pixels of which the fish-eye image is composed, and an input data color information (i.e., the charge corresponding to any one of the primary color elements of R, G and B) indicative of the color information corresponding to the pixels.

An interface, which is comparable to a known camera link with specifications and standards for connecting between for example an industrial digital camera and an image input board, is used as an example of the camera I/F 2.

The image correction signal processing circuit section 3 is a processing circuit to generate, based on the input data, the output data, which is indicative of the plane image which is two-dimensionally visible, and includes the output data pixel information indicative of the pixels of which the plane image is composed and the output data color information indicative of the color information corresponding to the pixels (in other words, a processing circuit to convert the fish-eye image into the plane image). More specifically, the image correction signal processing circuit section 3 is configured to include the input frame memory 6 serving as the storage unit of the present invention; a UART or USB communication unit 7; a fish-eye image corrected address generation section 8 serving as the fish-eye image corrected address generation unit of the present invention; a Bayer pattern data correction calculation section 9 and an output frame memory 10 serving as the storage unit of the present invention.

In the embodiment of the present invention, the input frame memory 6 and the frame memory 10 are provided within the image correction signal processing circuit section 3. However, the present invention is not limited only to such an embodiment. They may be provided outside the image correction signal processing circuit section 3.

The image correction signal processing circuit section 3 may be applicable to for example an ASIC (Application Specific Integrated Circuit), however, also applicable to a device such as an FPG, which is available in a simple structure, due to appearance of a CPU (MicroBlaze (Trademark) or Nios (Trademark) II, etc.) that is incorporated into an FPGA (Field Programmable Gate Array).

The input frame memory 6 is a storage region to store the above-mentioned input data. For example, a volatile or non-volatile memory, or a hard disc may be used as the input frame memory.

The UART or USB communication unit 7 is an interface to input corrected coordinates, which has been inputted from the corrected coordinate input section 4, into the fish-eye image corrected address generation section 8. A UART (Universal Asynchronous Receiver Transmitter) or a USB (Universal Serial Bus) may for example be used as the UART or USB communication unit 7.

The fish-eye image corrected address generating section 8, which serves as the fish-eye image corrected address generating unit, is configured to generate the output data pixel information based on the input data pixel information.

The Bayer pattern data correction calculation section 9 is composed of a data acquiring control section 11 to acquire the input data; an interpolation calculation section 12, which serves as the input data color information acquiring unit and the output data color information calculating unit of the present invention; a data writing control section 13 to control the writing of the data; etc.

The interpolation section 12, which serves as the input data color information acquiring unit, is configured to acquire the above-mentioned input data color information.

The interpolation section 12, which serves as the input data color information calculating unit, is configured to calculate the output data color information described above based on the above-mentioned input data color information.

Now, a concept of conversion of the fish-eye image into the plane image according to the present invention will be described with reference to FIGS. 3 to 5.

Figure 3:
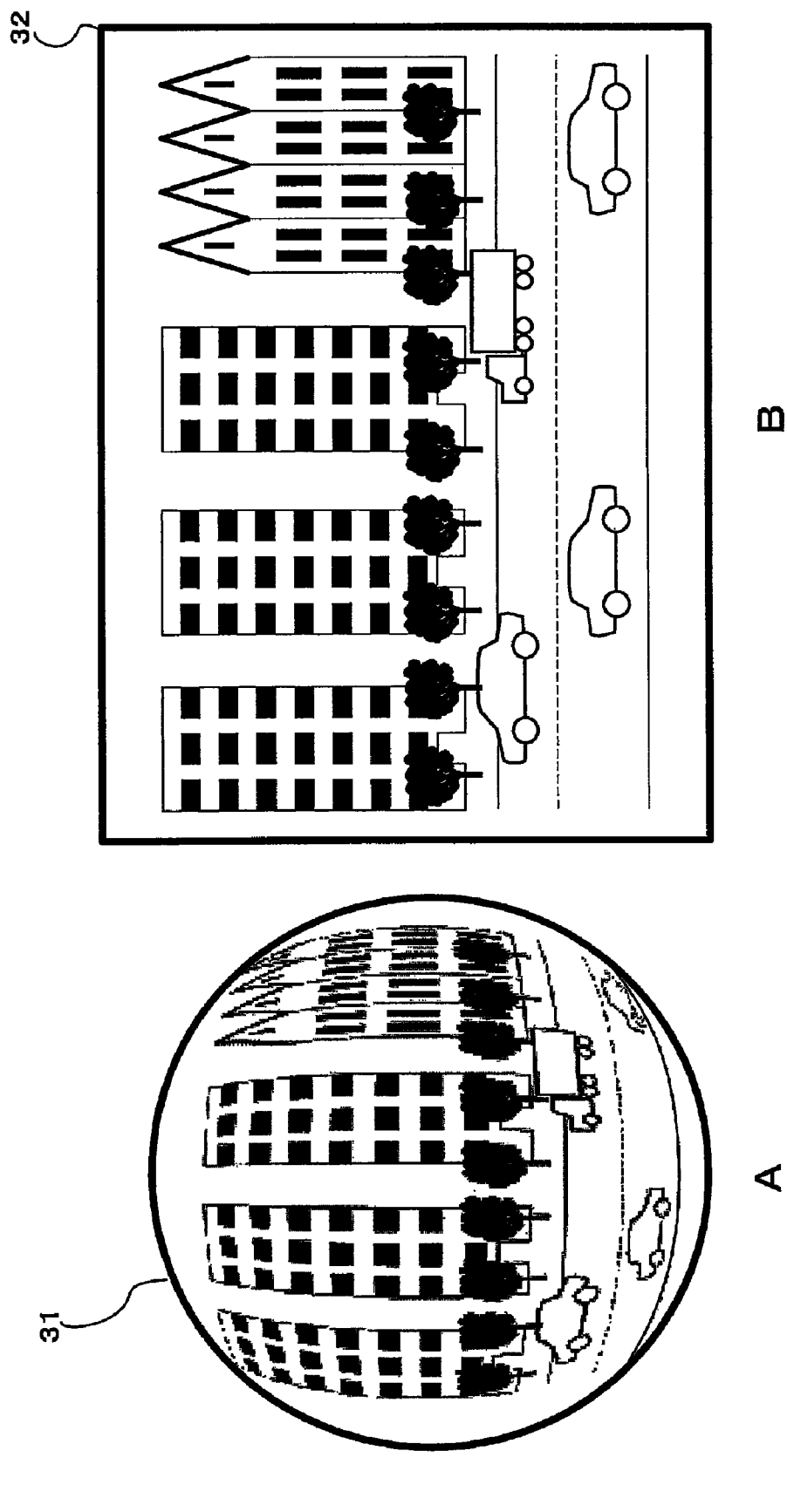
FIG. 3 is a view showing a concept of conversion of a fish-eye image into a plane image.

FIG. 3 is a view showing the concept of conversion of the fish-eye image into the plane image.

As shown in FIG. 3, the fish-eye image corrected address generation section 8 and the interpolation calculation section 12 are configured to convert the fish-eye image 31 as captured into the plane image 32 in the embodiment of the present invention.

The fish-eye image 31 is a fish-eye image as captured through the fish-eye lens. The fish-eye image 31 is obtained by imaging objects, which are located within a range of about 180 degrees from the view point, thus providing a single image as displayed. However, imaging the objects on a curved surface may cause a discomfort feeling to the eye of an observer, and there is caused difficulty in recognizing, from the distorted image, a shape and size of the object (the subject) as captured or expression of a person as captured. In view of these problems, the fish-eye image corrected address generation section 8 and the interpolation calculation section 12 are configured to convert the fish-eye image 31 into the plane image 32, which is approximate to the image obtained through a human vision.

Now, the basic principle of the conversion of the fish-eye image into the plane image will be described with reference to FIG. 4.

Figure 4:
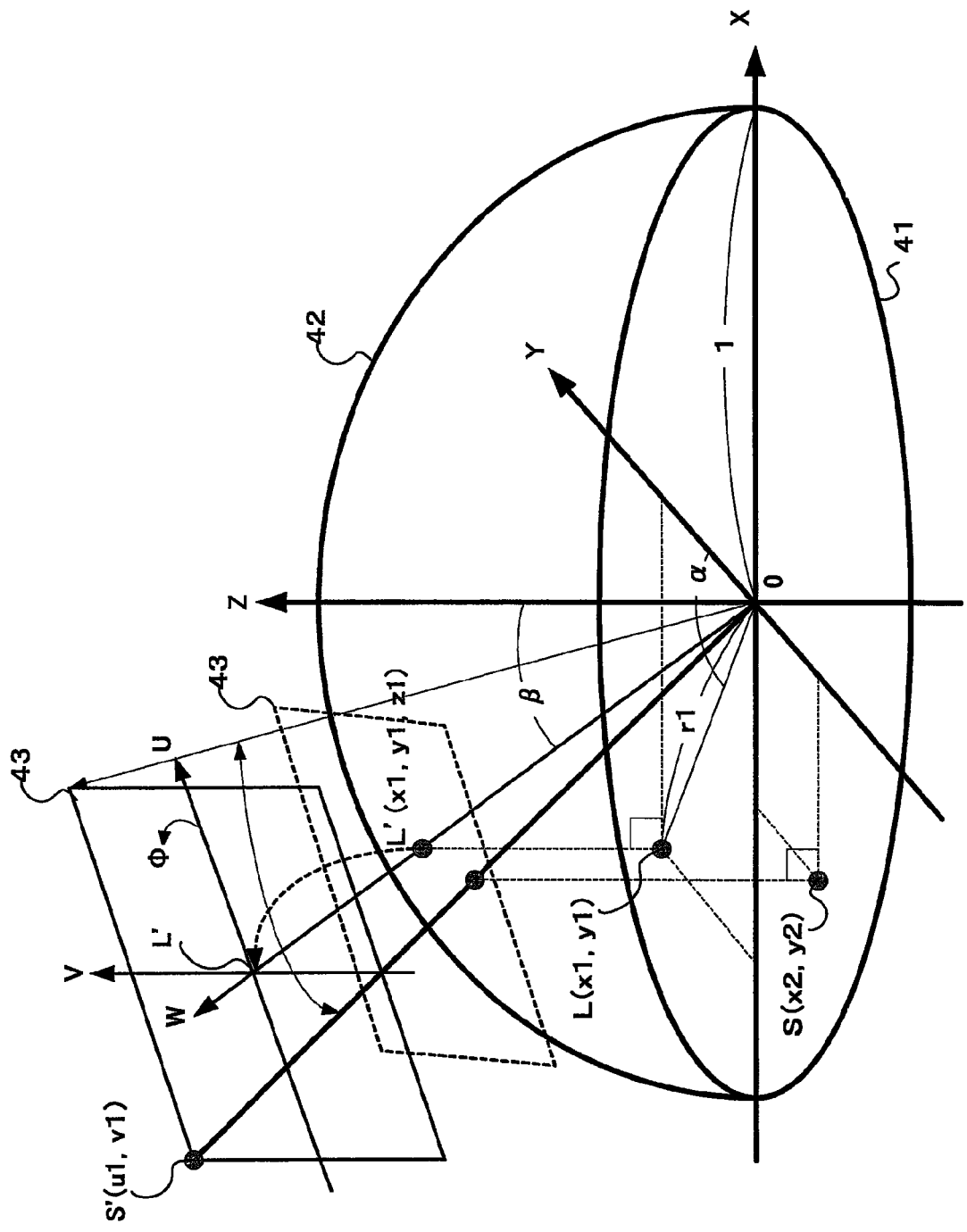
FIG. 4 is a view showing a concept of a basic principle of conversion of the fish-eye image into the plane image.

FIG. 4 is a view showing the concept of the basic principle of conversion of the fish-eye image into the plane image.

Although an art to convert a fish-eye image into a plan image is known, in such a conversion, a modeling processing is generally performed utilizing a virtual hemispherical model provided on the fish-eye image 41 as shown in FIG. 4. More specifically, a plane, which comes into contact with the virtual hemisphere 42 at an arbitrary point L' (x1, y1, z1), is used to resemble the plane image 43 into which the fish-eye image is to be converted. In FIG. 4, the plane is shifted to a position at which the plane is not overlapped with the virtual hemisphere 42 in view of an increased visibility.

A coordinate system space as shown in FIG. 4s indicates an XYZ Cartesian coordinates system so that the fish-eye image corresponds to an XY plane, the central axis of the fish-eye lens corresponds to a Z axis, and a traveling direction of a light beam corresponds to a positive direction. The origin "0" of the XYZ coordinates system is assumed as the center of the view point and the line of sight is assumed as "L" (x1, y1, z1). In addition, the central point of the plane 43 is assumed as "L'" (x1, y1, z1), and the plane 43 is assumed as the UV plane. Further, the normal vector, which extends from the origin "0" and passes through the point "L'" (x1, y1, z1), is indicated as "W".

The coordinates "S'" (u1, v1) forming an arbitrary pixel of the plane image 43 in the above-mentioned coordinate system space corresponds to the coordinates "S" (x2, y2) of an intersection point of the fish-eye image 41 with an imaginary line, which extends vertically relative to the Z axis from an intersection point of the virtual hemisphere 42 with the normal vector connecting the origin "0" to the above-mentioned coordinates.

Under the same principle, the central point "L'" (x1, y1, z1) of the plane image 43 corresponds to the coordinates "L" (x1, y1) on the fish-eye image 41.

The fish-eye image corrected address generation section 8 is configured to determine, for conversion of the fish-eye image into the plane image, the coordinates "S" (x2, y2) corresponding to the coordinates "S'" (u1, v1) based on the above-described corresponding relationship.

In the embodiment of the present invention, the information on the coordinates of "S'" is used as the output data pixel information and the information on the coordinates of "S" is used as the input data pixel information, both of which information are generated by the fish-eye image corrected address generation section 8.

Now, the concept of a generation order of the output data pixel information will be more specifically described with reference to FIG. 5.

Figure 5:
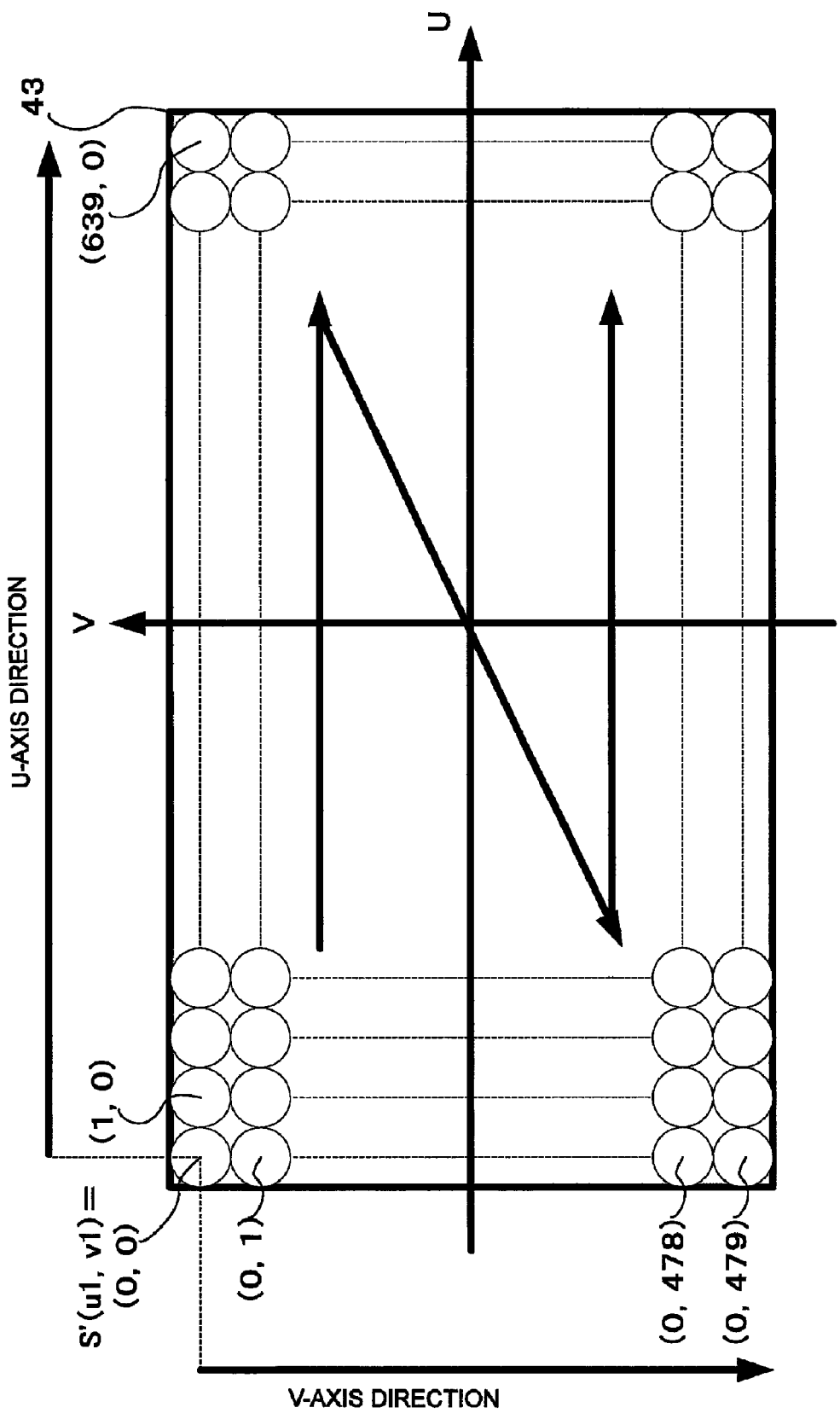
FIG. 5 is a view showing a concept of a generation order of an output data pixel information.

FIG. 5 is a view showing the concept of the generation order of the output data pixel information.

An example in which a VGA (Video Graphic Array) having for example the pixel of 640×480 dots is applied as the plane image 43 as outputted will be described with reference to FIG. 5.

Concerning the output of the plane image 43, there are determined the coordinates "S" (x2, y2) corresponding to the coordinates "S'" (u1, v1) for forming the pixel of the plane image 43 in the manner as described above. On the plane image 43 to which the VGA is applied, the coordinates "S" (x2, y2) corresponding to the coordinates "S'" (u1, v1) are determined for all the pixels of 640×480 dots (in other words, from the coordinates (0, 0) to the coordinates (639, 479) of the plane image 43), and then displayed.

More specifically, in case where the coordinates "S'" (u1, v1) are (0, 0), the corresponding coordinates "S" (x2, y2) is determined. In case where the coordinates "S'" (u1, v1) are (0, 1), the corresponding coordinates "S" (x2, y2) is then determined. The values of the corresponding coordinates "S" (x2, y2) is determined, while scanning the values of the coordinates "S'" (u1, v1) in the U-axis direction and the V-axis direction, in this manner.

Now, an operation of the fish-eye image corrected address generation section 8 and the interpolation calculation section 12 will be described with reference to FIGS. 6 to 15.

Figure 6:
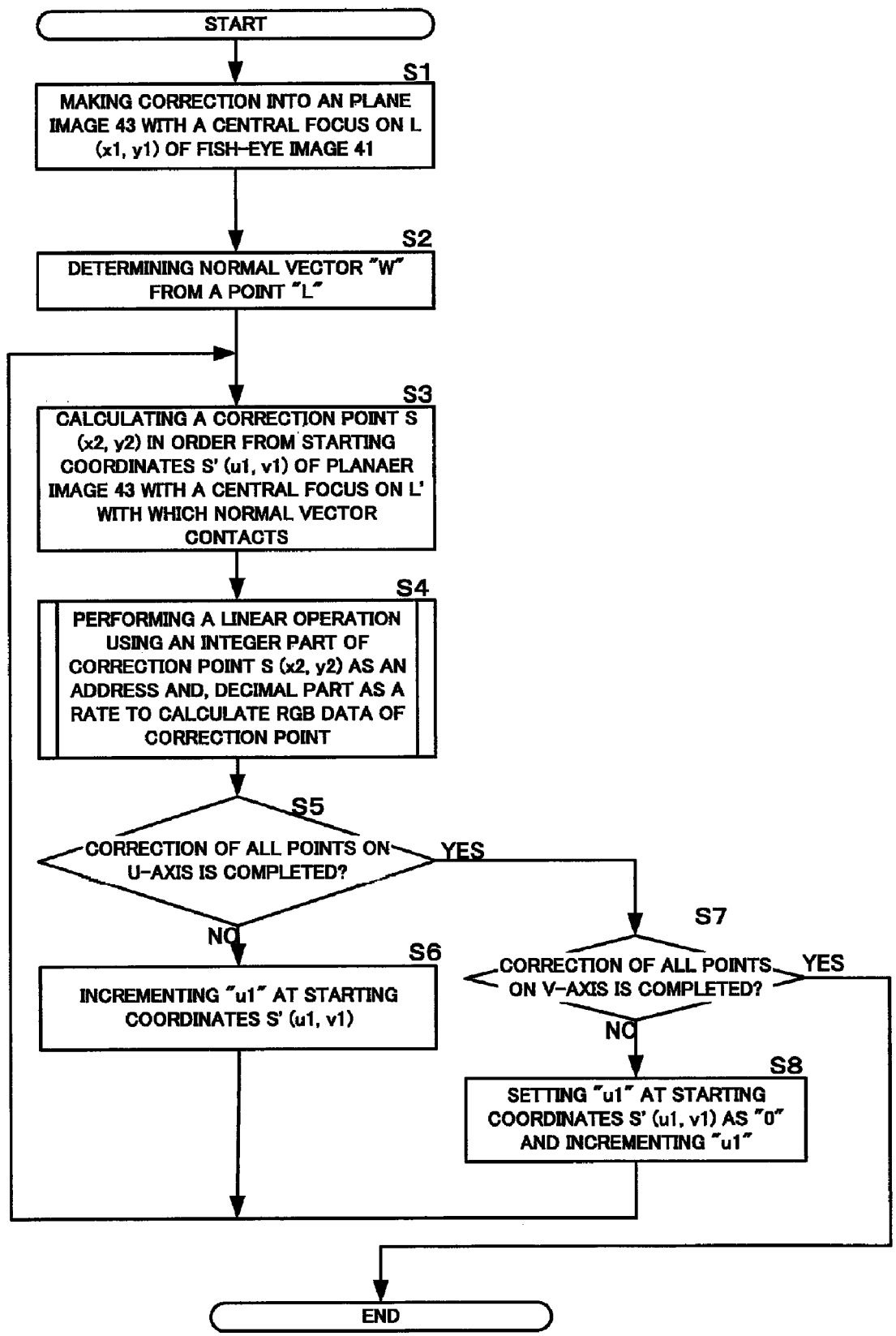
FIG. 6 is a flowchart showing an operation of a fish-eye image corrected address generation unit 8 and an interpolation calculation unit 12.

FIG. 6 is a flowchart showing the operation of the fish-eye image corrected address generation section 8 and the interpolation calculation section 12.

The operation will be described below with the use of the coordinate system as shown in FIGS. 4 and 5. First, the fish-eye image corrected address generation section 8 corrects (converts) the fish-eye image 41 into the plane image 43 with the coordinates "L" (x1, y1) on the fish-eye image 41 used as the center (Step S1) and then determines the normal vector "W" from the coordinates "L" (x1, y1).

In accordance with the basic principle as described above, the corresponding coordinates "S" (x2, y2) (a correction point "S") are calculated successively from the starting coordinates "S'" (u1, v1) (=(0, 0)) of the plane image 43 with the point "L'" (x1, y1, z1) with which the normal vector "W" contacts, used as the center (Step S3).

Then, the fish-eye image corrected address generation section 8 calculates, as the coordinates "S" as described above, the value including an integer part and a decimal part, and the interpolation calculation section 12 calculates the RGB data (the input data color information and the output data color information) based on the values of the integer part and the decimal part as described above (Step S4).

More specifically, the processing in which the RGB data is generated by the calculation, without using a circuit, is executed.

Now, such a processing will be described in detail below.

There is an assumption that the above-mentioned integer part is used as an address and the above-mentioned decimal part is used as a rate in the embodiment of the present invention.

According to such an assumption, when the correction point of "S" (x2, y2)=(111.265, 200.135) is calculated as the correction point as described above, "111" indicates the address of a point of "x2" and "0.265" indicates the rate thereof, and "200" indicates the address of a point of "y2" and "0.135" indicates the rate thereof.

The interpolation calculation section 12 acquires the input data color information based on the abovementioned address.

The input data color information means a color information corresponding to the above-mentioned address, and is specifically indicative of the primary color element indicated by the color filter array 21 of the Bayer pattern corresponding to the address and the above-mentioned pattern with which the above-mentioned address is associated.

The color filter array 21 of the Bayer pattern corresponds to the photodiode as matrix-arranged (respective pixels), with the result that any one of the three primary color elements of R, G and B can be specified as corresponding to the correction point "S" (x2, y2).

Now, the interpolation calculation section 12 specifies the above-mentioned pattern in case where the primary color element indicated by the coordinate "S'" (u1, v1) is used as a benchmark.

More specifically, in case where the primary color element indicated by the coordinate "S'" (u1, v1) is used as a benchmark, the interpolation calculation section 12 determines under which type of (a) the RGGB type 25, (b) the GRBG type 26, (c) the GBRG type 27 and (d) the BGGR type 28 it falls.

Then, the interpolation calculation section 12 calculates the output data color information based on the above-mentioned input data color information.

The output data color information means information on the primary color element at a point of the correction point "S" (x2, y2) calculated from the input data color information. The output data color information may be determined by calculating the correction data (address) and the correction rate of the respective color, from the output address and rate from the fish-eye image corrected address generation section 8.

In the above-described color imaging utilizing the color filter array 21 of the Bayer pattern, the electric signal corresponding to any primary color element is outputted from the respective pixel, and accordingly, information on missing colors is required to be given for the respective pixel.

In the embodiment of the present invention, the above-mentioned interpolation is executed by calculating the output data color information.

Now, detailed description of calculation of the output data color information will be given below with reference to FIGS. 7 to 15.

Figure 7:
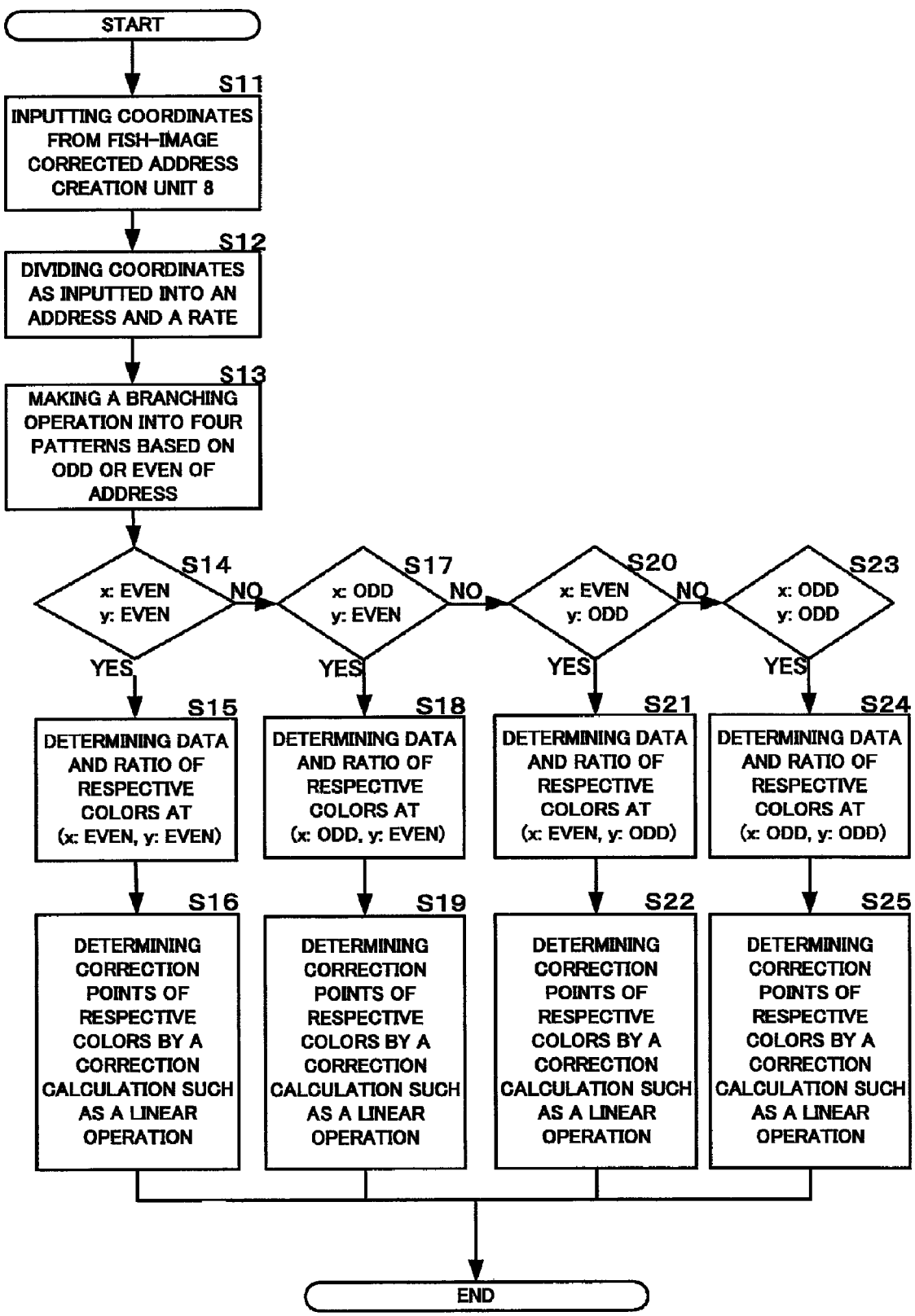
FIG. 7 is a flowchart showing calculation of an output data color information.

FIG. 7 is a flowchart showing calculation of the output data color information.

First, the correction point "S" (x2, y2) is inputted from the fish-eye image corrected address generation section 8 (Step S11). The coordinates of the correction point as inputted will hereinafter referred to as the "input coordinates" (X, Y) in order to facilitate the description. Here, there is an assumption that the following input coordinates are input as the input coordinates are inputted:

$$\text{Input coordinate: } (X, Y) = (111.625, 200.250) \qquad \text{Expression (1)}$$

The interpolation calculation section 12 divides the input coordinate into the address and the rate (Step S12). In these expressions, the value of Expression (1) is substituted, and the address is expressed by the following Expression (2) and the rate is expressed by the following Expression (3):

$$\text{Address: } (x, y) = (111, 200) \qquad \text{Expression (2)}$$

$$\text{Rate: } (rate\_x, rate\_y) = (0.625, 0.250) \qquad \text{Expression (3)}$$

Then, the interpolation calculation section 12 classifies the respective values of "x" and "y" of the address (Expression (2) into any one of the patterns in terms of odd or even (Step S13). Concerning these patterns, Expression (4) to (7) are indicated below:

$$\text{Address: } (x, y) = (\text{even}, \text{even}) \qquad \text{Expression (4)}$$

$$\text{Address: } (x, y) = (\text{odd}, \text{even}) \qquad \text{Expression (5)}$$

$$\text{Address: } (x, y) = (\text{even}, \text{odd}) \qquad \text{Expression (6)}$$

$$\text{Address: } (x, y) = (\text{odd}, \text{odd}) \qquad \text{Expression (7)}$$

Then, the interpolation calculation section 12 determines data of four points of the respective colors and a rate of the respective colors in accordance with the four patterns into which the values are classified (Step S14 and subsequent steps).

Now, detailed description for each pattern will be given below.

The color filter array 21 of the Bayer pattern, which has the specific arrangement as described above, may be classified into four types, i.e., (a) the RGGB type 25, (b) the GRBG type 26, (c) the GBRG type 27 and (d) the BGGR type 28.

The above-mentioned processing is executed in accordance with any one of these four types.

(A) (a) Calculation of Address and Rate in the RGGB Type 25 i) a) In Case of Address: (x, y)=(Even, Even) in the RGGB Type 25 (Yes in Step S14)

Now, (a) calculation of the address and the rate in case of address: (x, y)=(even, even) in the RGGB type 25 will be described below with reference to FIGS. 8 and 9 (Step S15). In this case, the color indicated by the address (x, y) is red.

As shown in FIGS. 8 and 9, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (8) to (11) and the rate may be expressed by Expressions (12) and (13).

$$R\_D1 = (x, y) \quad \text{Expression (8)}$$

$$R\_d2 = (x+2, y) \quad \text{Expression (9)}$$

$$R\_d3 = (x, y+2) \quad \text{Expression (10)}$$

$$R\_d4 = (x+2, y+2) \quad \text{Expression (11)}$$

$$R\_rate\_x = rate\_x/2 \quad \text{Expression (12)}$$

$$R\_rate\_y = rate\_y/2 \quad \text{Expression (13)}$$

Figure 8A:
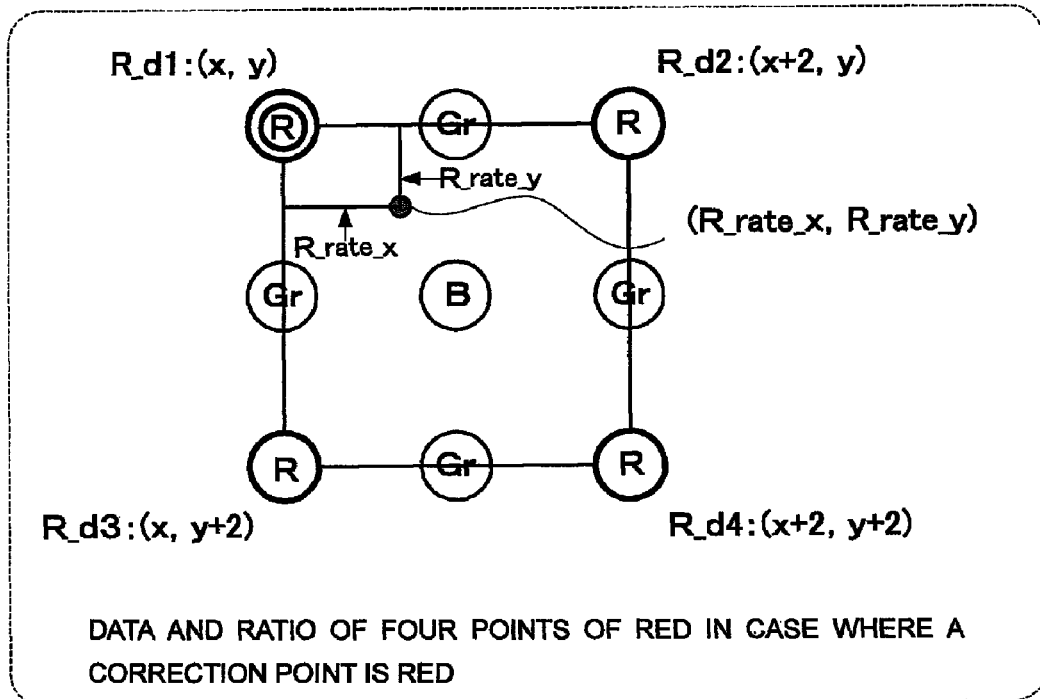
FIG. 8A is a view showing a concept of calculation of an address and a rate wherein the address: (x, y)=(even, even) in (a) an RGGB type 25.

As shown in FIG. 8A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (14) to (17) and the rate may be expressed by the following Expressions (18) and (19):

$$B\_d1 = (x-1, y-1) \quad \text{Expression (14)}$$

$$B\_d2 = (x+1, y-1) \quad \text{Expression (15)}$$

$$B\_d3 = (x-1, y+1) \quad \text{Expression (16)}$$

$$B\_d4 = (x+1, y+1) \quad \text{Expression (17)}$$

$$B\_rate\_x = rate\_x/2 + 0.5 \quad \text{Expression (18)}$$

$$B\_rate\_y = rate\_y/2 + 0.5 \quad \text{Expression (19)}$$

Figure 8B:
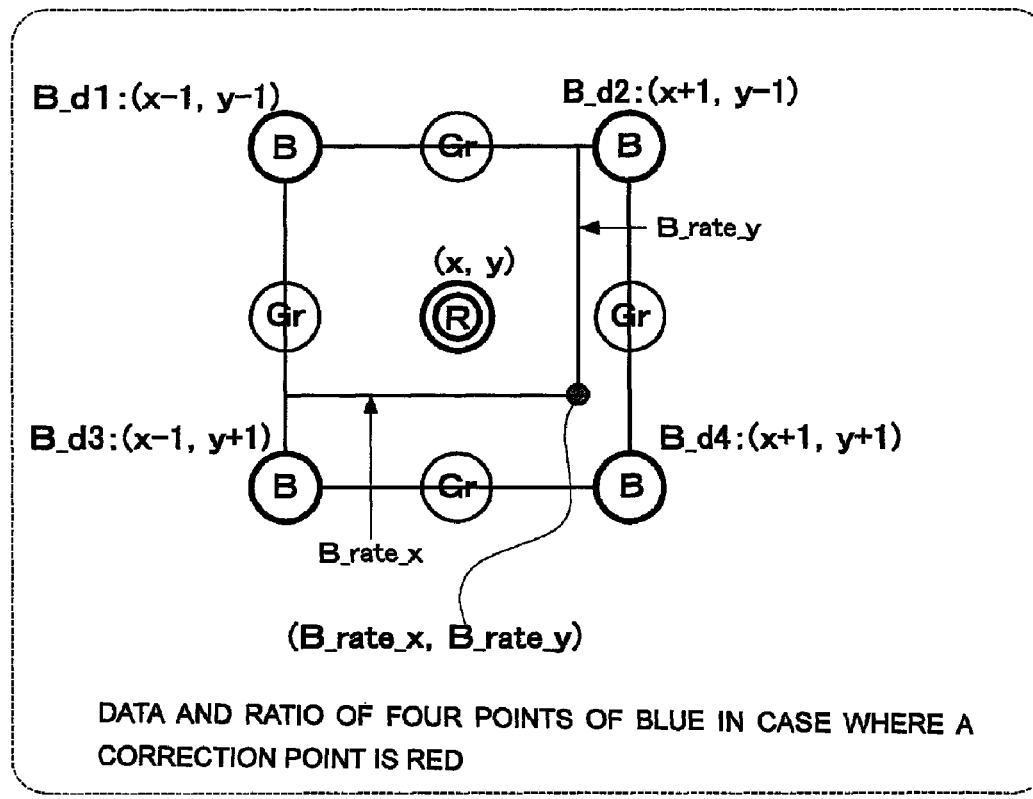
FIG. 8B is a view showing a concept of calculation of an address and a rate wherein the address: (x, y)=(even, even) in (a) the RGGB type 25.

As shown in FIG. 8B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (20) to (23) and the rate may be expressed by Expressions (24) and (25) in case of i-1) rate_x+rate_y<1.0. In addition, the correction data may be expressed by the following Expressions (26) to (29) and the rate may be expressed by the following Expressions (30) and (31) in case of i-2) rate_x+rate_y≧1.0.

In case of i-1) rate_x+rate_y<1.0

$$G\_d1 = (x, y-1) \quad \text{Expression (20)}$$

$$G\_d2 = (x+1, y) \quad \text{Expression (21)}$$

$$G\_d3 = (x-1, y) \quad \text{Expression (22)}$$

$$G\_d4 = (x, y+1) \quad \text{Expression (23)}$$

$$G\_rate\_x = (rate\_x + rate\_y)/2 + 0.5 \quad \text{Expression (24)}$$

$$G\_rate\_y = (rate\_y - rate\_x)/2 + 0.5 \quad \text{Expression (25)}$$

In case of i-2) rate_x+rate_y≧1.0

$$G\_d1 = (x+1, y) \quad \text{Expression (26)}$$

$$G\_d2 = (x+2, y+1) \quad \text{Expression (27)}$$

$$G\_d3 = (x, y+1) \quad \text{Expression (28)}$$

$$G\_d4 = (x+1, y+2) \quad \text{Expression (29)}$$

$$G\_rate\_x = (rate\_x + rate\_y)/2 - 0.5 \quad \text{Expression (30)}$$

$$G\_rate\_y = (rate\_y - rate\_x)/2 + 0.5 \quad \text{Expression (31)}$$

Figure 9A:
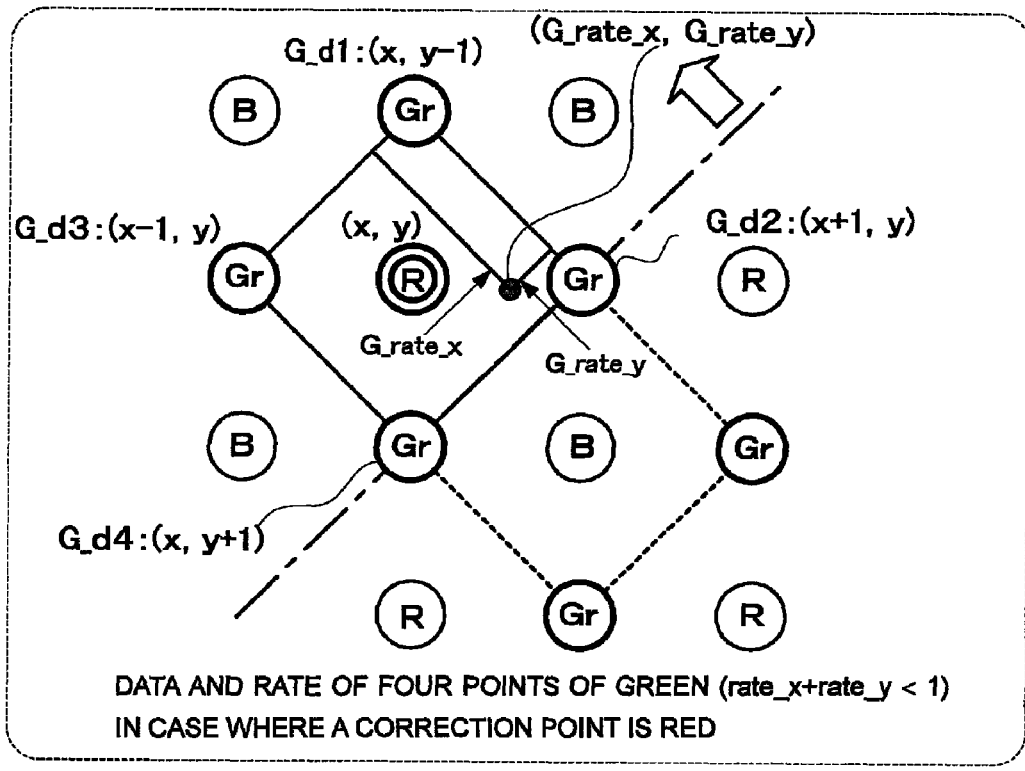
FIG. 9A is a view showing a concept of calculation of an address and a rate wherein the address: (x, y)=(even, even) in (a) the RGGB type 25.
Figure 9B:
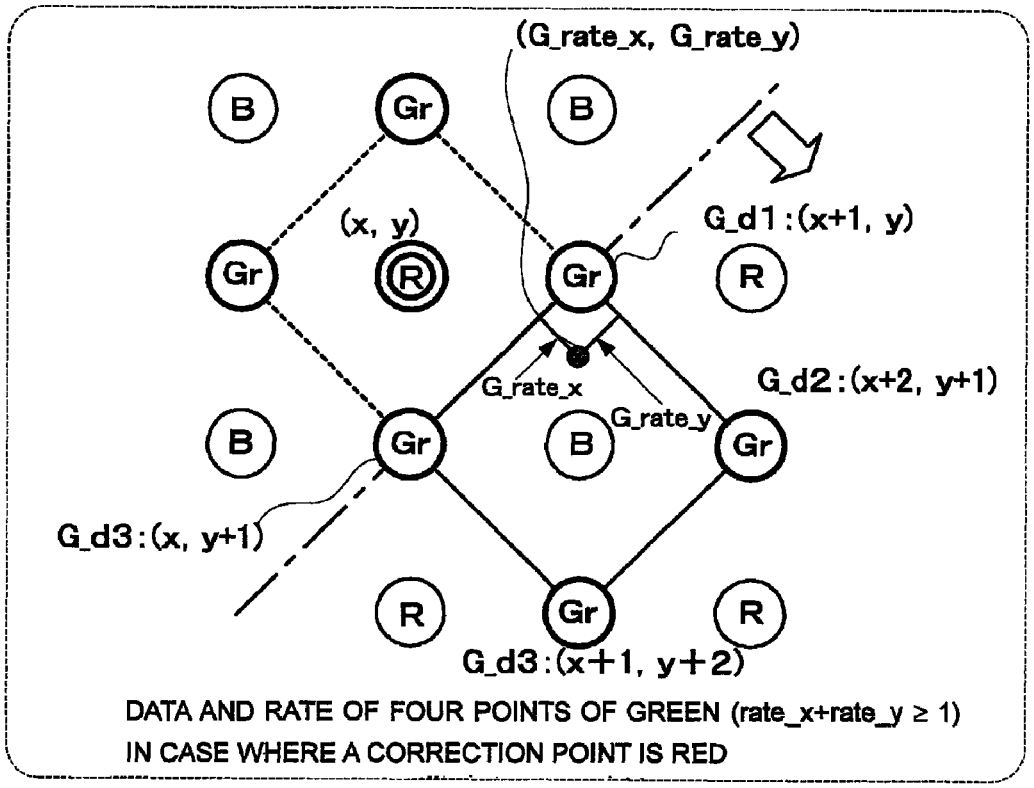
FIG. 9B is a view showing a concept of calculation of an address and a rate wherein the address: (x, y)=(even, even) in (a) the RGGB type 25.

As shown in FIG. 9, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_x+rate_y<1.0, the rate exists within a region defined by a solid line in FIG. 9A. In case of rate_x+rate_y≧1.0, the rate exists within a region defined by a solid line in FIG. 9B.

Then, the correction point data for each color are determined by a correction calculation such as a linear operation (Step S16).

More specifically, the correction point data are calculated by the correction method as described below, based on "R_d1,2,3,4", "B_d1,2,3,4" and "G_d1,2,3,4" of the correction data for respective colors, as already determined, and the rate of respective colors. In the following description, "¯" means inversion (not).

The correction data of red may be expressed by the following Expressions (32) to (34):

$$R\_data1 = R\_d1 * (\bar{R\_rate\_x} + 1) + R\_d2 * R\_rate\_x \quad \text{Expression (32)}$$

$$R\_data2 = R\_d3 * (\bar{R\_rate\_x} + 1) + R\_d4 * R\_rate\_x \quad \text{Expression (33)}$$

$$R\_data = R\_data1 * (\bar{R\_rate\_y} + 1) + R\_data2 * R\_rate\_y \quad \text{Expression (34)}$$

The correction data of blue may be expressed by the following Expressions (35) to (37):

$$B\_data1 = B\_d1 * (\bar{B\_rate\_x} + 1) + B\_d2 * B\_rate\_x \quad \text{Expression (35)}$$

$$B\_data2 = B\_d3 * (\bar{B\_rate\_x} + 1) + B\_d4 * B\_rate\_x \quad \text{Expression (36)}$$

$$B\_data = B\_data1 * (\bar{B\_rate\_y} + 1) + B\_data2 * B\_rate\_y \quad \text{Expression (37)}$$

The correction data of green may be expressed by the following Expressions (38) to (40):

$$G\_data1 = G\_d1*(\bar{}G\_rate\_x+1) + G\_d2*G\_rate\_x \quad \text{Expression (38)}$$

$$G\_data2 = G\_d3*(\bar{}G\_rate\_x+1) + G\_d4*G\_rate\_x \quad \text{Expression (39)}$$

$$G\_data = G\_data1*(\bar{}G\_rate\_y+1) + G\_data2*G\_rate\_y \quad \text{Expression (40)}$$

Using the respective data of red, blue and green as the correction RGB data of the fish-eye image makes it possible to determine the correction RGB data of the fish-eye image directly from the Bayer pattern.

ii) a) In Case of Address: (x, y)=(Odd, Even) in RGGB Type 25 (Yes in Step S17)

Now, (a) calculation of the address and the rate in case of address: (x, y)=(odd, even) in the RGGB type 25 will be described below with reference to FIGS. 10 and 11 (Step S18). In this case, the color indicated by the address (x, y) is green.

Figure 10A:
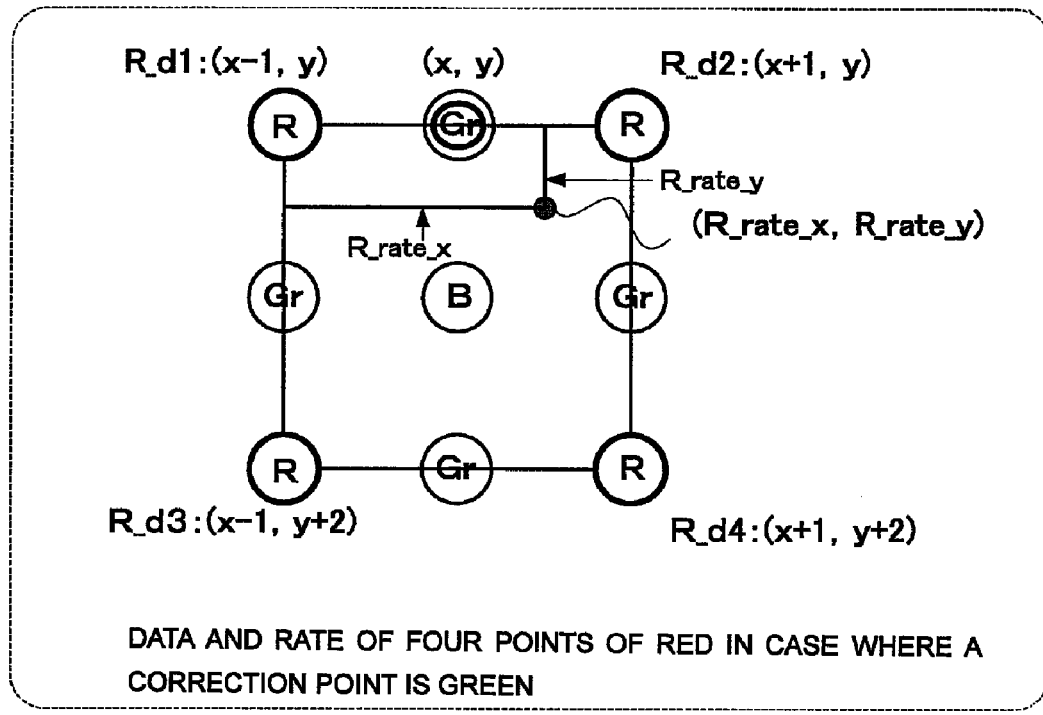
FIG. 10A is a view showing a concept of calculation of an address and a rate wherein the address: (x, y)=(odd, even) in (a) the RGGB type 25.
Figure 10B:
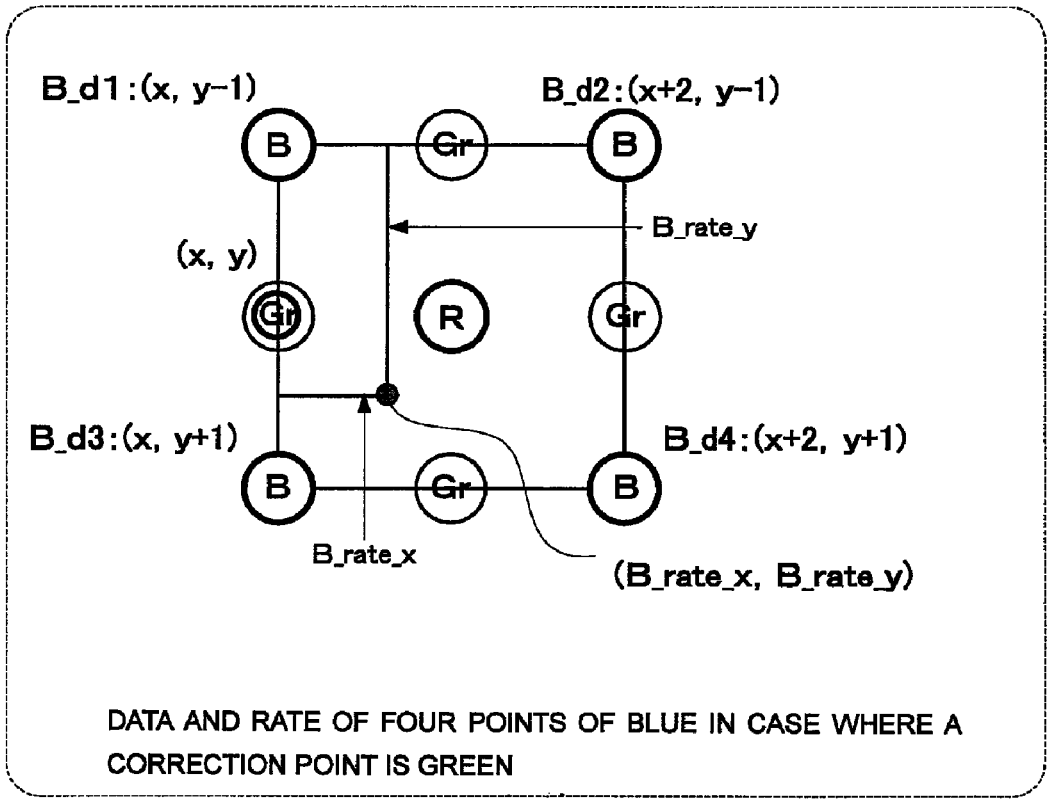
FIG. 10B is a view showing a concept of calculation of an address and a rate wherein the address: (x, y)=(odd, even) in (a) the RGGB type 25.
Figure 11A:
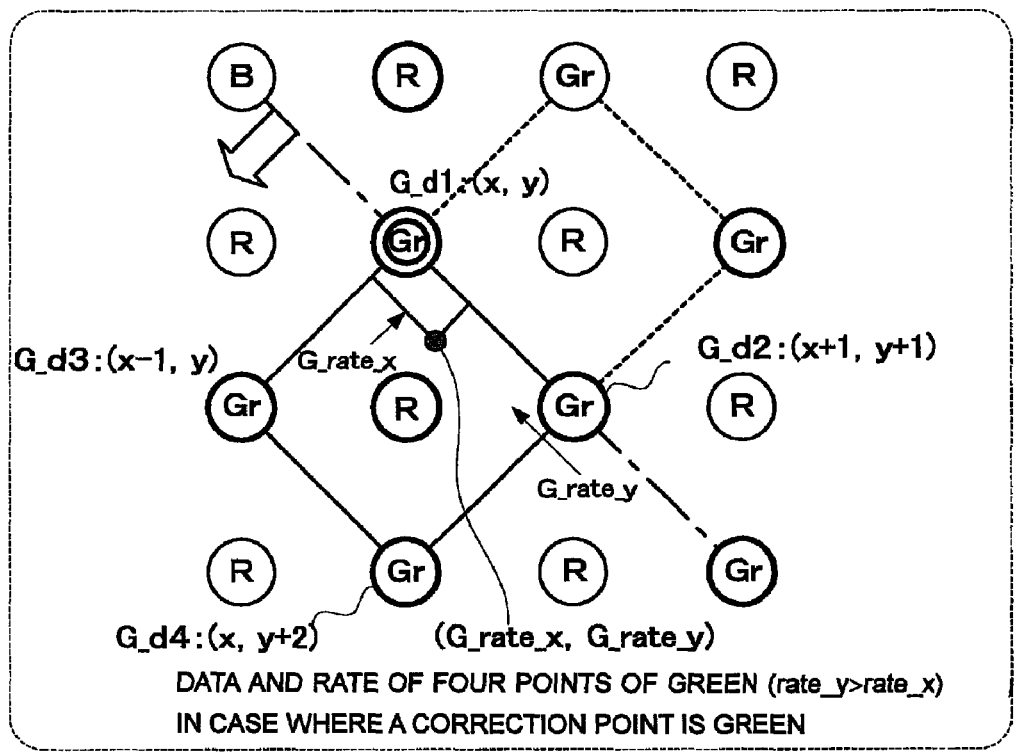
FIG. 11A is a view showing a concept of calculation of an address and a rate wherein the address: (x, y)=(odd, even) in (a) the RGGB type 25.

As shown in FIGS. 10 and 11, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (41) to (44) and the rate may be expressed by the following Expressions (45) and (46):

$$R\_d1 = (x-1, y) \quad \text{Expression (41)}$$

$$R\_d2 = (x+1, y) \quad \text{Expression (42)}$$

$$R\_d3 = (x-1, y+2) \quad \text{Expression (43)}$$

$$R\_d4 = (x+1, y+2) \quad \text{Expression (44)}$$

$$R\_rate\_x = rate\_x/2 + 0.5 \quad \text{Expression (45)}$$

$$R\_rate\_y = rate\_y/2 \quad \text{Expression (46)}$$

As shown in FIG. 10A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (47) to (50) and the rate may be expressed by the following Expressions (51) and (52).

$$B\_d1 = (x, y-1) \quad \text{Expression (47)}$$

$$B\_d2 = (x+2, y-1) \quad \text{Expression (48)}$$

$$B\_d3 = (x, y+1) \quad \text{Expression (49)}$$

$$B\_d4 = (x+2, y+1) \quad \text{Expression (50)}$$

$$B\_rate\_x = rate\_x/2 \quad \text{Expression (51)}$$

$$B\_rate\_y = rate\_y/2 + 0.5 \quad \text{Expression (52)}$$

As shown in FIG. 10B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (53) to (56) and the rate may be expressed by the following Expressions (57) and (58) in case of ii-1) rate_y>rate_x. In addition, the correction data may be expressed by the following Expressions (59) to (62) and the rate may be expressed by the following Expressions (63) and (64) in case of ii-2) rate_y≦rate_x.

In case of ii-1) rate_y>rate_x $$G\_d1 = (x, y) \quad \text{Expression (53)}$$

$$G\_d2 = (x+1, y+1) \quad \text{Expression (54)}$$

$$G\_d3 = (x-1, y+1) \quad \text{Expression (55)}$$

$$G\_d4 = (x, y+2) \quad \text{Expression (56)}$$

$$G\_rate\_x = (rate\_y + rate\_x)/2 \quad \text{Expression (57)}$$

$$G\_rate\_y = (rate\_y - rate\_x)/2 \quad \text{Expression (58)}$$

In case of ii-2) rate_y≦rate_x $$G\_d1 = (x, y) \quad \text{Expression (59)}$$

$$G\_d2 = (x+1, y+1) \quad \text{Expression (60)}$$

$$G\_d3 = (x+1, y-1) \quad \text{Expression (61)}$$

$$G\_d4 = (x+2, y) \quad \text{Expression (62)}$$

$$G\_rate\_x = (rate\_y + rate\_x)/2 \quad \text{Expression (63)}$$

$$G\_rate\_y = (rate\_x - rate\_y)/2 \quad \text{Expression (64)}$$

Figure 11B:
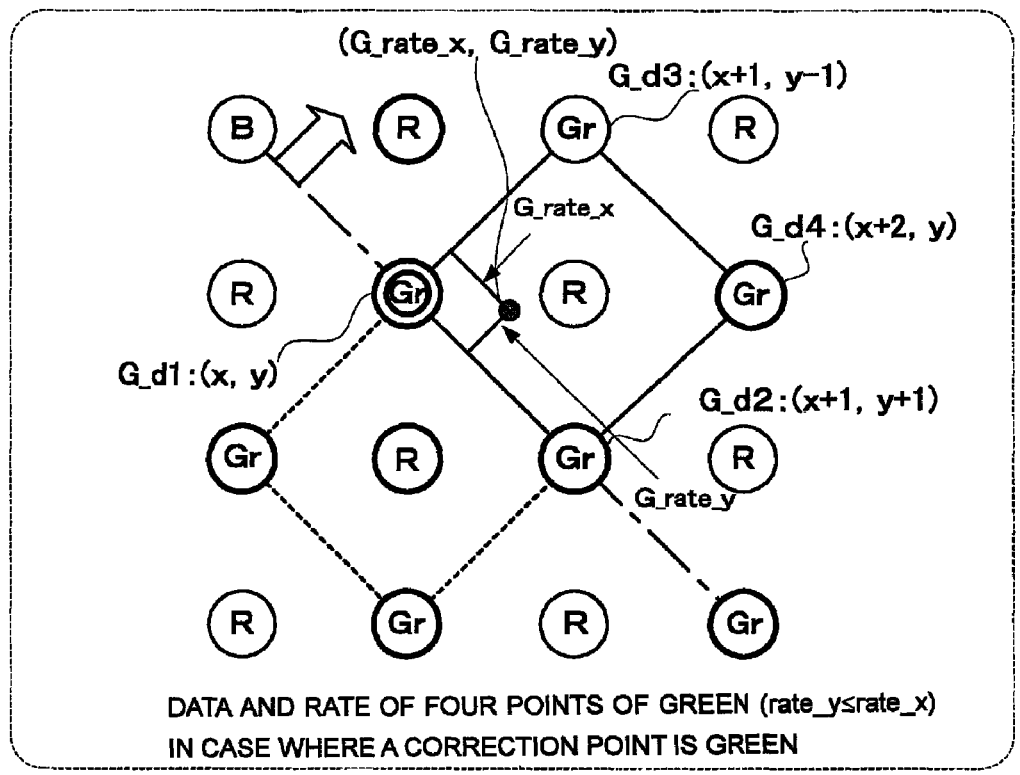
FIG. 11B is a view showing a concept of calculation of an address and a rate wherein the address: (x, y)=(odd, even) in (a) the RGGB type 25.

As shown in FIG. 11, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_y>rate_x, the rate exists within a region defined by a solid line in FIG. 11. In case of rate_y≦rate_x, the rate exists within a region defined by a solid line in FIG. 11B.

Then, the correction point data for each color are determined by a correction calculation such as a linear operation (Step S19). The method of the correction calculation is the same as the step S16.

iii) a) In Case of Address: (x, y)=(Even, Odd) in RGGB Type 25 (Yes in Step S20)

Now, (a) calculation of the address and the rate in case of address: (x, y)=(even, odd) in the RGGB type 25 will be described below with reference to FIGS. 12 and 13 (Step S21). In this case, the color indicated by the address (x, y) is green.

As shown in FIGS. 12 and 13, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (65) to (68) and the rate may be expressed by the following Expressions (69) and (70):

$$R\_d1 = (x, y-1) \quad \text{Expression (65)}$$

$$R\_d2 = (x+2, y-1) \quad \text{Expression (66)}$$

$$R\_d3 = (x, y+1) \quad \text{Expression (67)}$$

$$R\_d4 = (x+2, y+1) \quad \text{Expression (68)}$$

$$R\_rate\_x = rate\_x/2 \quad \text{Expression (69)}$$

$$R\_rate\_y = rate\_y/2 + 0.5 \quad \text{Expression (70)}$$

Figure 12A:
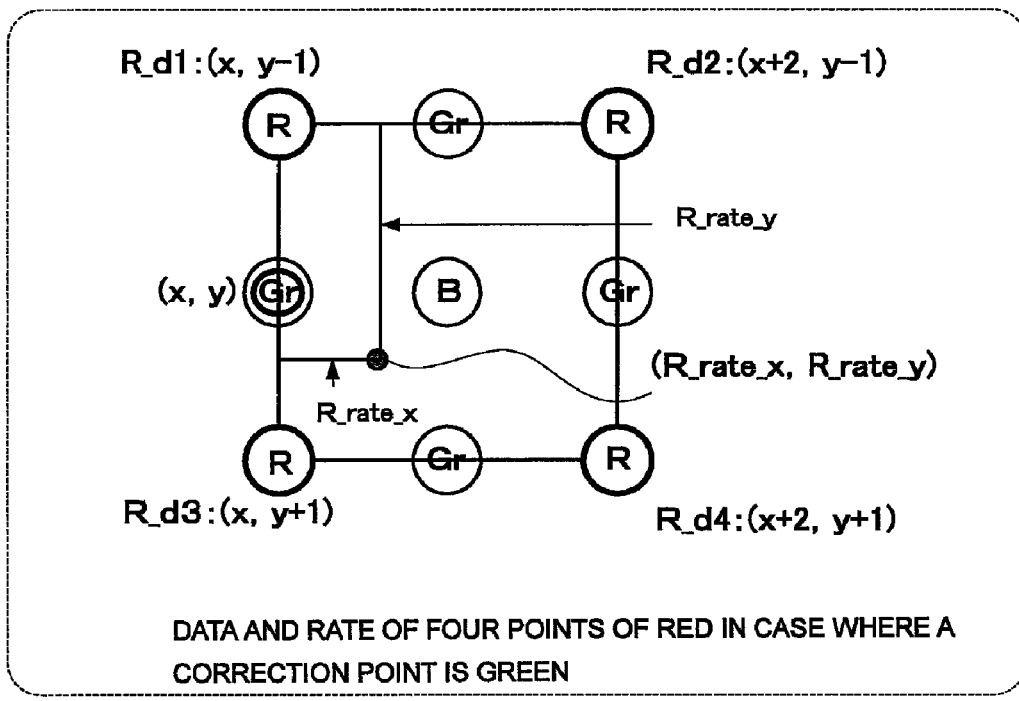
FIG. 12A is a view showing a concept of calculation of an address and a rate wherein the address: (x, y)=(even, odd) in (a) the RGGB type 25.

As shown in FIG. 12A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (71) to (74) and the rate may be expressed by the following Expressions (75) and (76).

$$B\_d1 = (x-1, y) \quad \text{Expression (71)}$$

$$B\_d2 = (x+1, y) \quad \text{Expression (72)}$$

$$B\_d3 = (x-1, y+2) \quad \text{Expression (73)}$$

$$B\_d4 = (x+1, y+2) \quad \text{Expression (74)}$$

$$B\_rate\_x = rate\_x/2 + 0.5 \quad \text{Expression (75)}$$

$$B\_rate\_y = rate\_y/2 \quad \text{Expression (76)}$$

Figure 12B:
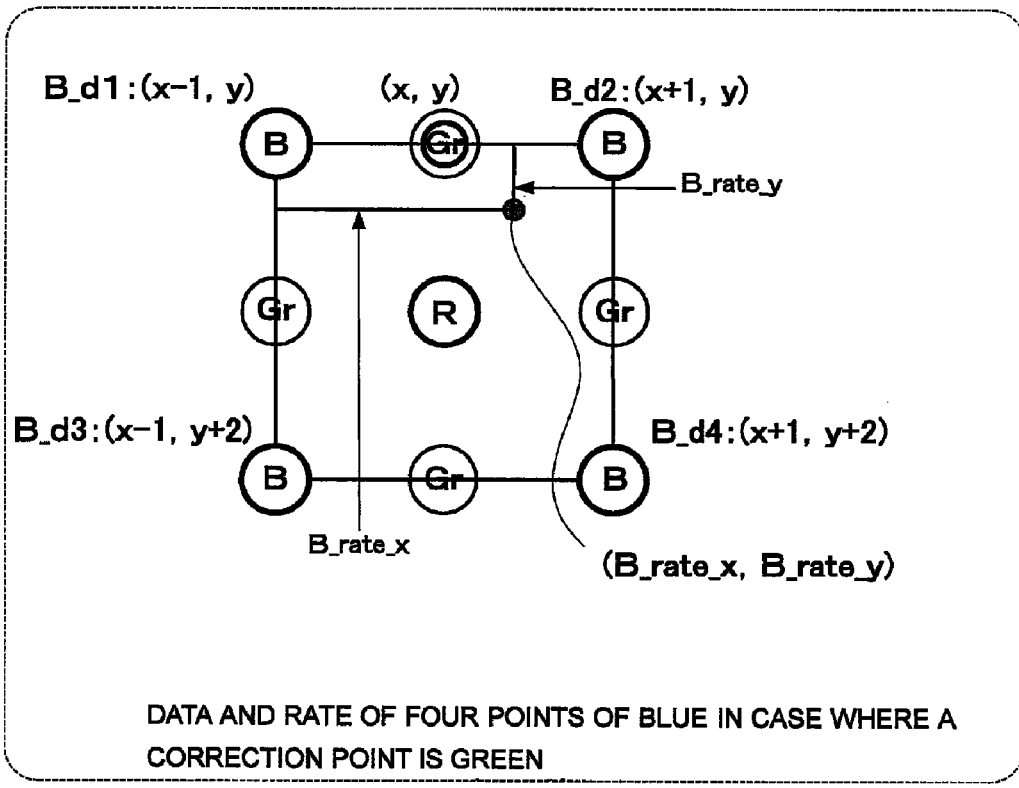
FIG. 12B is a view showing a concept of calculation of an address and a rate wherein the address: (x, y)=(even, odd) in (a) the RGGB type 25.

As shown in FIG. 12B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (77) to (80) and the rate may be expressed by the following Expressions (81) and (82) in case of iii-1) rate_y>rate_x. In addition, the correction data may be expressed by the following Expressions (83) to (86) and the rate may be expressed by the following Expressions (87) and (88) in case of iii-2) rate_y≦rate_x.

In case of iii-1) rate_y>rate_x $$G\_d1 = (x, y) \quad \text{Expression (77)}$$

$$G\_d2 = (x+1, y+1) \quad \text{Expression (78)}$$

$$G\_d3 = (x-1, y+1) \quad \text{Expression (79)}$$

$$G\_d4 = (x, y+2) \quad \text{Expression (80)}$$

$$G\_rate\_x = (rate\_y + rate\_x)/2 \quad \text{Expression (81)}$$

$$G\_rate\_y = (rate\_y - rate\_x)/2 \quad \text{Expression (82)}$$

In case of iii-2) rate_y≦rate_x $$G\_d1 = (x, y) \quad \text{Expression (83)}$$

$$G\_d2 = (x+1, y+1) \quad \text{Expression (84)}$$

$$G\_d3 = (x+1, y-1) \quad \text{Expression (85)}$$

$$G\_d4 = (x+2, y) \quad \text{Expression (86)}$$

$$G\_rate\_x = (rate\_y + rate\_x)/2 \quad \text{Expression (87)}$$

$$G\_rate\_y = (rate\_x - rate\_y)/2 \quad \text{Expression (88)}$$

Figure 13A:
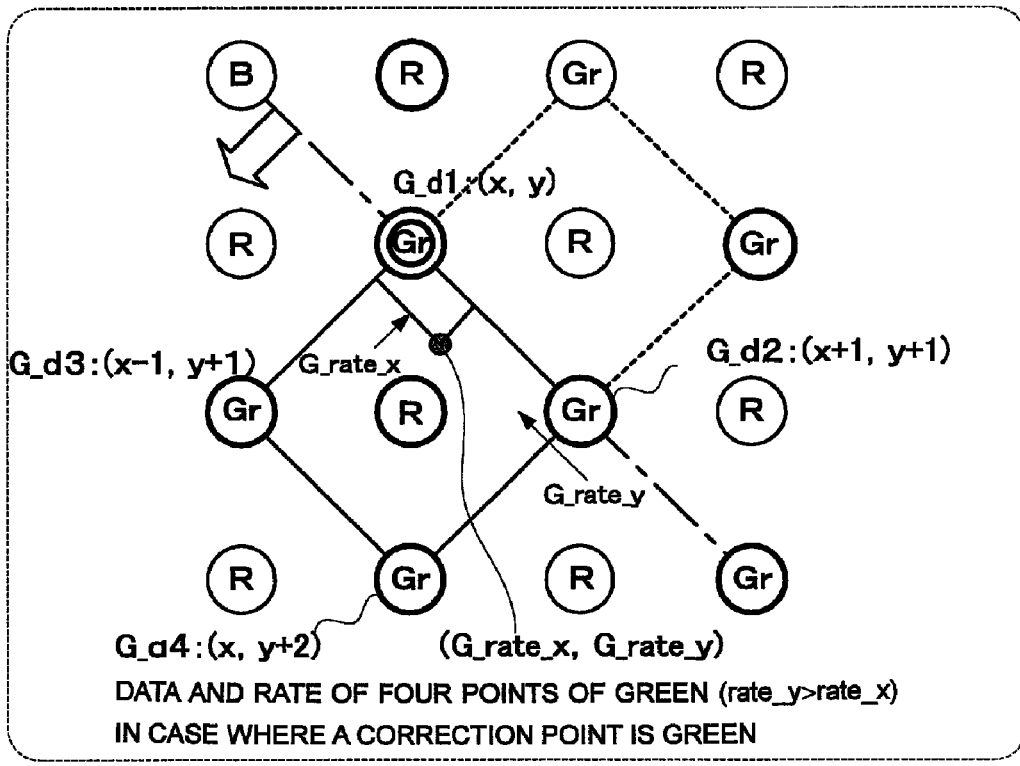
FIG. 13A is a view showing a concept of calculation of an address and a rate wherein the address: (x, y)=(even, odd) in (a) the RGGB type 25.
Figure 13B:
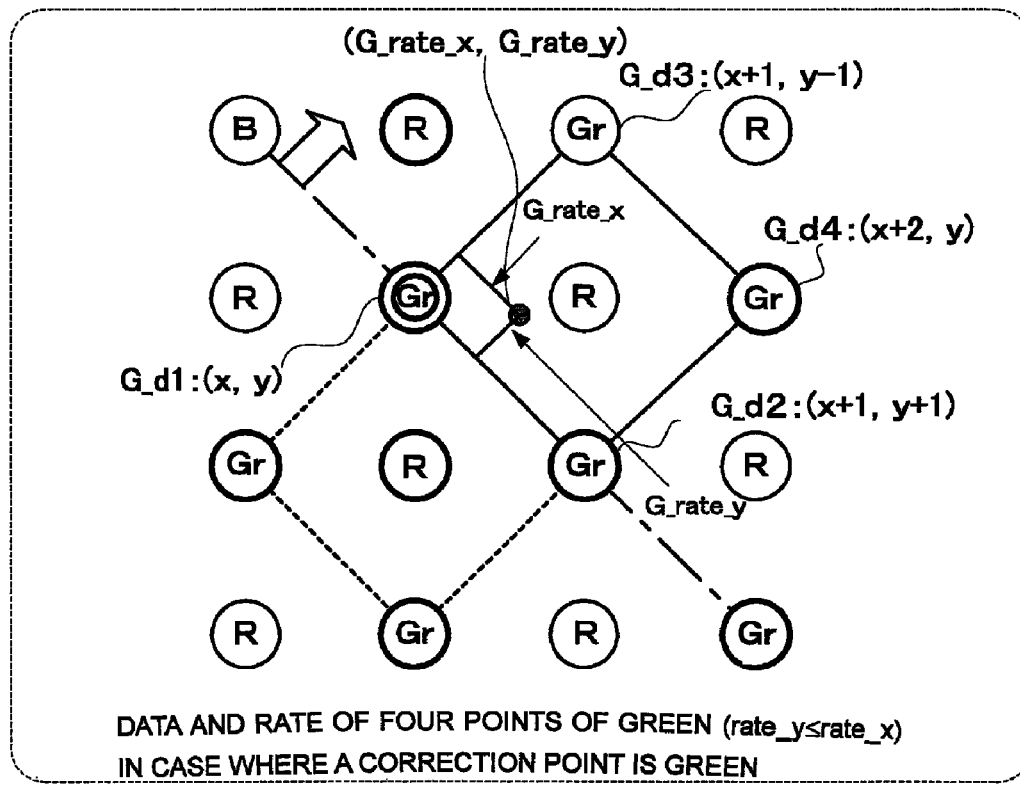
FIG. 13B is a view showing a concept of calculation of an address and a rate wherein the address: (x, y)=(even, odd) in (a) the RGGB type 25.

As shown in FIG. 13, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_y>rate_x, the rate exists within a region defined by a solid line in FIG. 13A. In case of rate_y≦rate_x, the rate exists within a region defined by a solid line in FIG. 13B.

Then, the correction point data for each color are determined by a correction calculation such as a linear operation (Step S22). The method of the correction calculation is the same as the step S16.

iv) a) In Case of Address: (x, y)=(Odd, Odd) in RGGB Type 25 (Yes in Step S23)

Now, (a) calculation of the address and the rate in case of address: (x, y)=(odd, odd) in the RGGB type 25 will be described below with reference to FIGS. 14 and 15 (Step S24). In this case, the color indicated by the address (x, y) is blue.

As shown in FIGS. 14 and 15, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (89) to (92) and the rate may be expressed by the following Expressions (93) and (94):

$$R\_d1 = (x-1, y-1) \quad \text{Expression (89)}$$

$$R\_d2 = (x+1, y-1) \quad \text{Expression (90)}$$

$$R\_d3 = (x-1, y+1) \quad \text{Expression (91)}$$

$$R\_d4 = (x+1, y+1) \quad \text{Expression (92)}$$

$$R\_rate\_x = rate\_x/2 + 0.5 \quad \text{Expression (93)}$$

$$R\_rate\_y = rate\_y/2 + 0.5 \quad \text{Expression (94)}$$

Figure 14A:
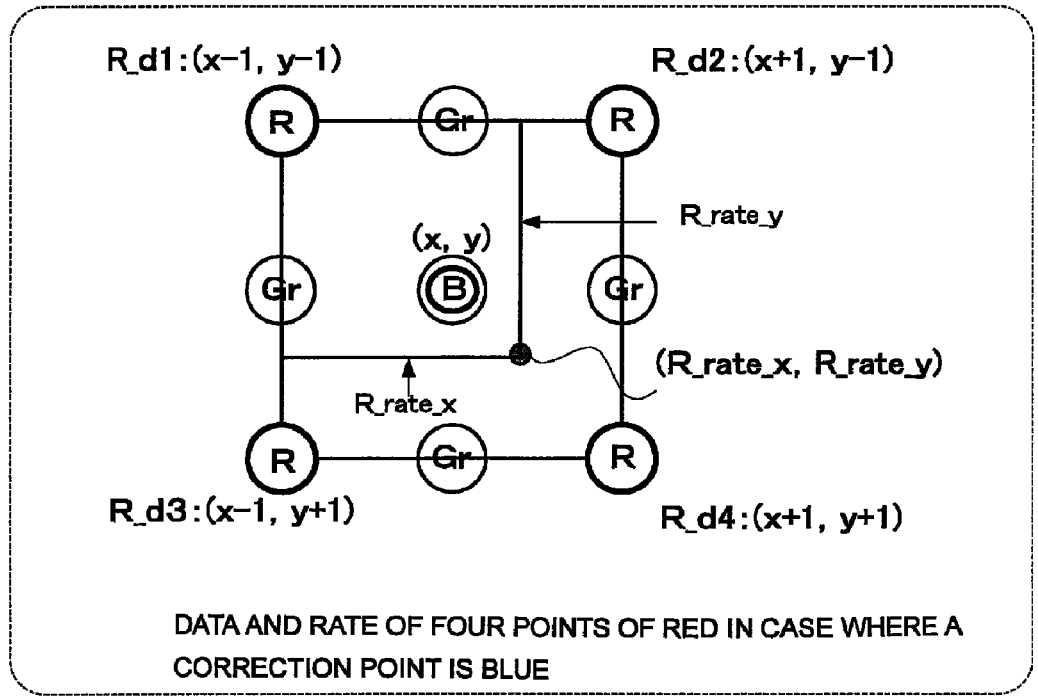
FIG. 14A is a view showing a concept of calculation of an address and a rate wherein the address: (x, y)=(odd, odd) in (a) the RGGB type 25.

As shown in FIG. 14A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (95) to (98) and the rate may be expressed by the following Expressions (99) and (100).

$$B\_d1 = (x, y) \quad \text{Expression (95)}$$

$$B\_d2 = (x+2, y) \quad \text{Expression (96)}$$

$$B\_d3 = (x, y+2) \quad \text{Expression (97)}$$

$$B\_d4 = (x+2, y2) \quad \text{Expression (98)}$$

$$B\_rate\_x = rate\_x/2 \quad \text{Expression (99)}$$

$$B\_rate\_y = rate\_y/2 \quad \text{Expression (100)}$$

Figure 14B:
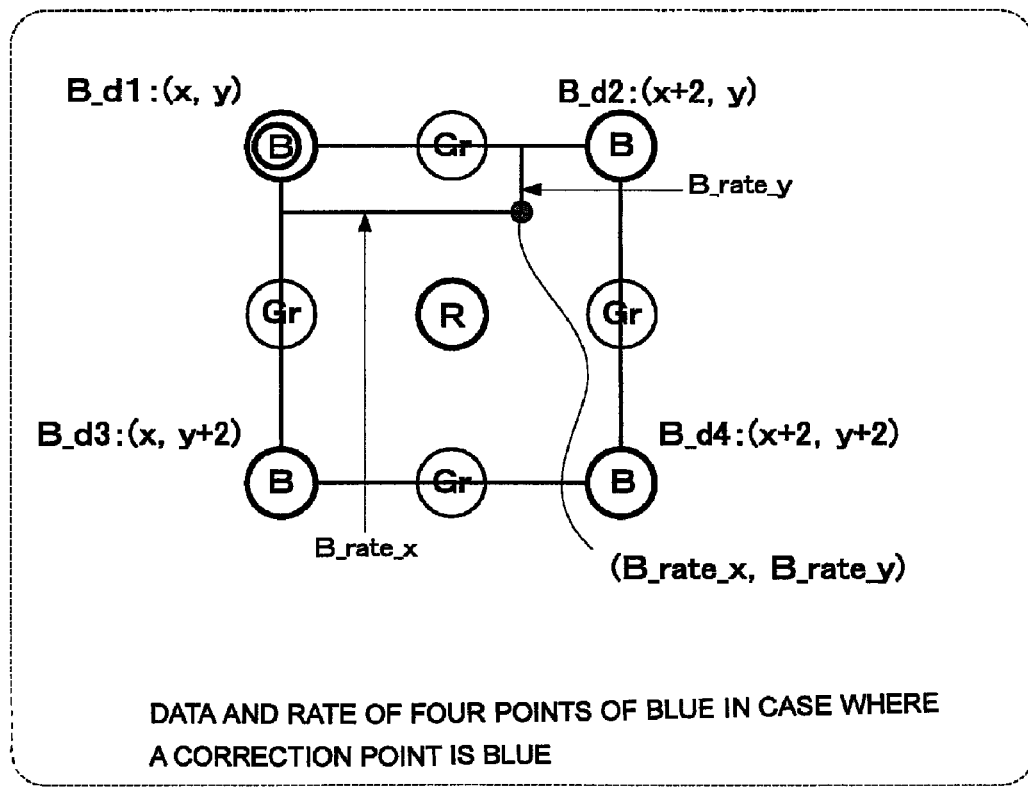
FIG. 14B is a view showing a concept of calculation of an address and a rate wherein the address: (x, y)=(odd, odd) in (a) the RGGB type 25.

As shown in FIG. 14B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (101) to (104) and the rate may be expressed by the following Expressions (105) and (106) in case of iv-1) rate_x+rate_y<1.0. In addition, the correction data may be expressed by the following Expressions (107) to (110) and the rate may be expressed by the following Expressions (111) and (112) in case of iv-2) rate_x+rate_y≧1.0.

In case of iv-1) rate_x+rate_y<1.0

$G\_d1=(x,y-1)$ Expression (101)

$G\_d2=(x+1,y)$ Expression (102)

$G\_d3=(x-1,y)$ Expression (103)

$G\_d4=(x,y+1)$ Expression (104)

$G\_rate\_x=(rate\_x+rate\_y)/2+0.5$ Expression (105)

$G\_rate\_y=(rate\_y-rate\_x)/2+0.5$ Expression (106)

In case of iv-2) rate_x+rate_y≧1.0

$G\_d1=(x+1,y)$ Expression (107)

$G\_d2=(x+2,y+1)$ Expression (108)

$G\_d3=(x,y+1)$ Expression (109)

$G\_d4=(x+1,y+2)$ Expression (110)

$G\_rate\_x=(rate\_x+rate\_y)/2-0.5$ Expression (111)

$G\_rate\_y=(rate\_y-rate\_x)/2+0.5$ Expression (112)

Figure 15A:
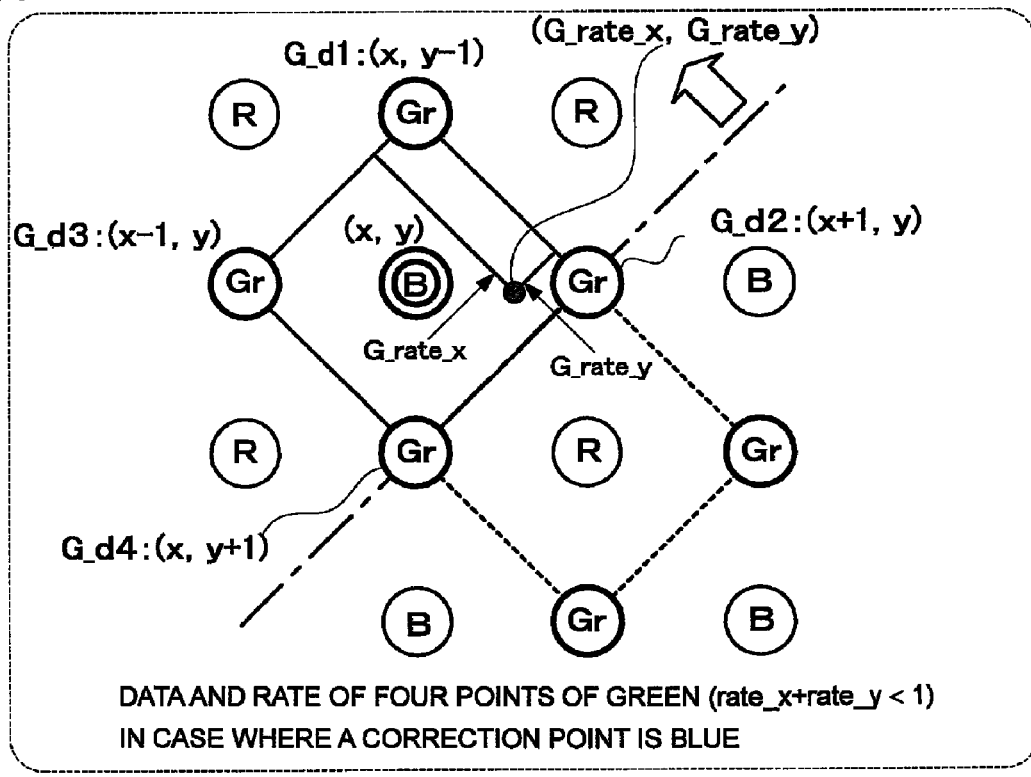
FIG. 15A is a view showing a concept of calculation of an address and a rate wherein the address: (x, y)=(odd, odd) in (a) the RGGB type 25.
Figure 15B:
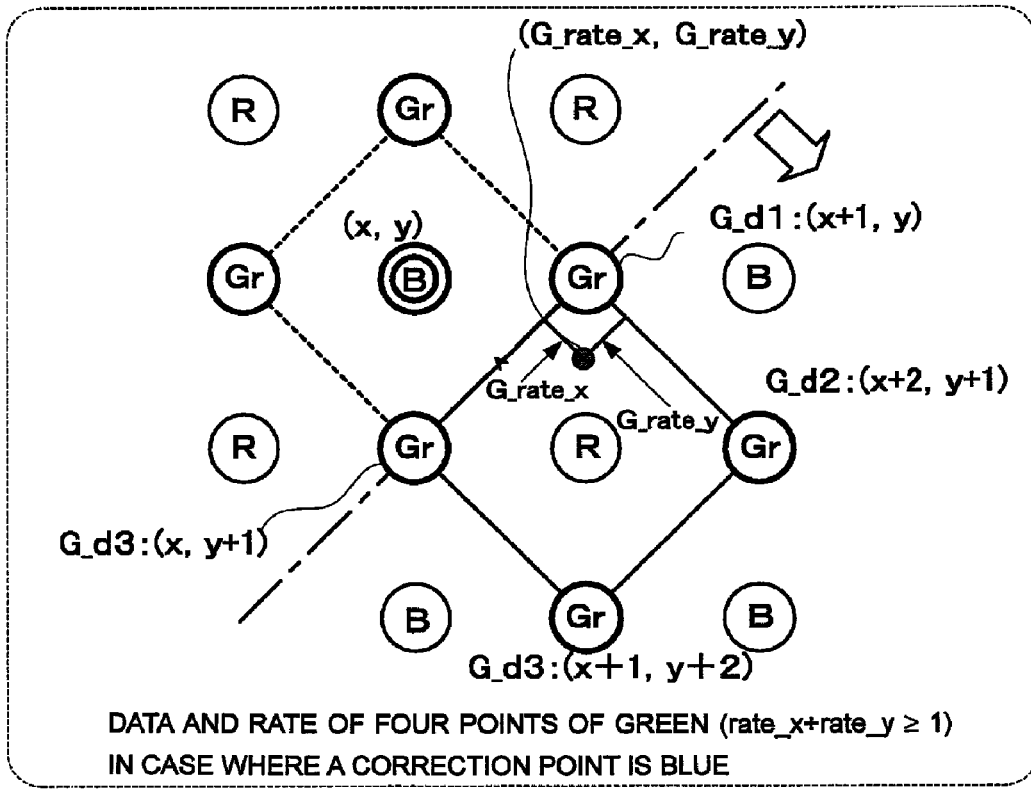
FIG. 15B is a view showing a concept of calculation of an address and a rate wherein the address: (x, y)=(odd, odd) in (a) the RGGB type 25.

As shown in FIG. 15, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_x+>rate_y<1.0, the rate exists within a region defined by a solid line in FIG. 15A. In case of rate_x+>rate_y≧1.0, the rate exists within a region defined by a solid line in FIG. 15B.

Then, the correction point data for each color are determined by a correction calculation such as a linear operation (Step S25). The method of the correction calculation is the same as the step S16.

It is possible to calculate the correction data and the correction rate of the respective colors from the output address and the rate from the fish-eye image corrected address generation section in each of the (b) the GRBG type 26, (c) the GBRG type 27 and (d) the BGGR type 28 in the same manner as mentioned in item (A) above.

Now, calculation of the correction data and the correction rate of the respective colors from the output address and the rate in the above-mentioned three types will be described below.

(B) (b) Calculation of Address and Rate in the GRBG Type 26 i) b) In Case of Address: (x, y)=(Even, Even) in the GRBG Type 26

Now, (b) calculation of the address and the rate in case of address: (x, y)=(even, even) in the RGGB type 26 will be described below with reference to FIGS. 16 and 17. In this case, the color indicated by the address (x, y) is green.

As shown in FIGS. 16 and 17, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (113) to (116) and the rate may be expressed by Expressions (117) and (118).

$R\_D1=(x-1,y)$ Expression (113)

$R\_d2=(x+1,y)$ Expression (114)

$R\_d3=(x-1,y+2)$ Expression (115)

$R\_d4=(x+1,y+2)$ Expression (116)

$R\_rate\_x=rate\_x/2+0.5$ Expression (117)

$R\_rate\_y=rate\_y/2$ Expression (118)

Figure 16A:
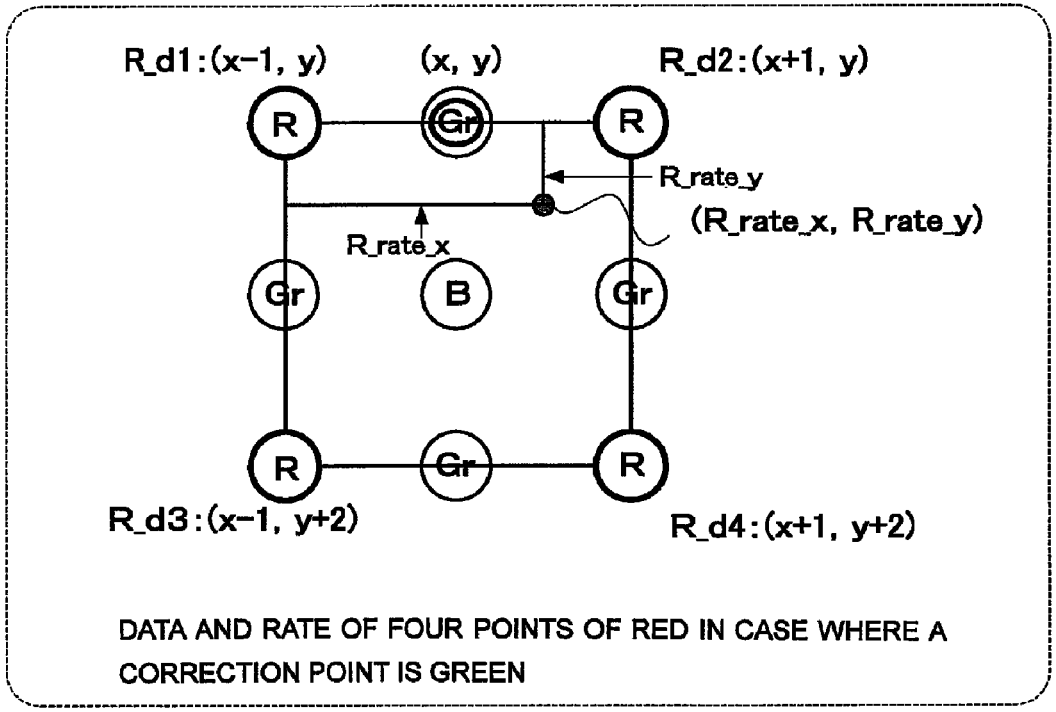
FIG. 16A is a view showing a concept of calculation of an address and a rate wherein the address: (x, y)=(even, even) in (b) a GRBG type 26.

As shown in FIG. 16A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (119) to (122) and the rate may be expressed by the following Expressions (123) and (124):

$B\_d1=(x,y-1)$ Expression (119)

$B\_d2=(x+2,y-1)$ Expression (120)

$B\_d3=(x,y+1)$ Expression (121)

$B\_d4=(x+2,y+1)$ Expression (122)

$B\_rate\_x=rate\_x/2$ Expression (123)

$B\_rate\_y=rate\_y/2+0.5$ Expression (124)

Figure 16B:
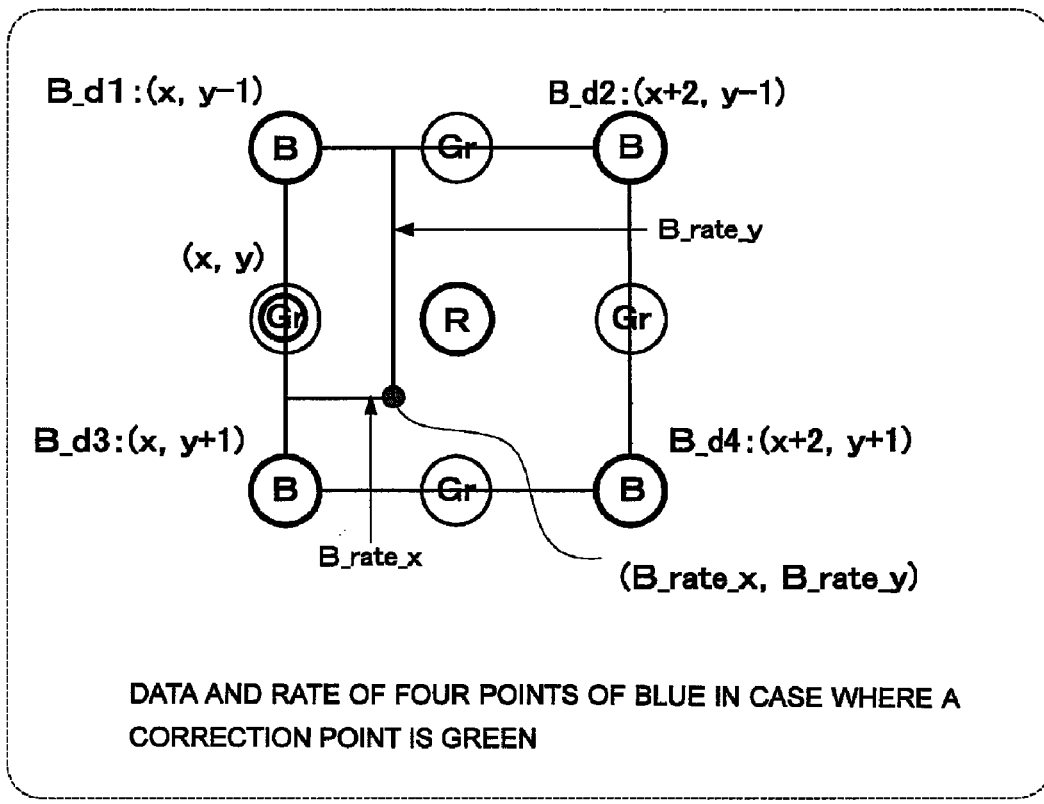
FIG. 16B is a view showing a concept of calculation of an address and a rate wherein the address: (x, y)=(even, even) in (b) the GRBG type 26.

As shown in FIG. 16B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (125) to (128) and the rate may be expressed by Expressions (129) and (130) in case of i-1) rate_y>rate_x. In addition, the correction data may be expressed by the following Expressions (131) to (134) and the rate may be expressed by the following Expressions (135) and (136) in case of i-2) rate_y≦rate_x.

In case of i-1) rate_y>rate_x $G\_d1=(x,y)$ Expression (125)

$G\_d2=(x+1,y+1)$ Expression (126)

$G\_d3=(x-1,y+1)$ Expression (127)

$G\_d4=(x,y+2)$ Expression (128)

$G\_rate\_x=(rate\_y+rate\_x)/2$ Expression (129)

$G\_rate\_y=(rate\_y-rate\_x)/2$ Expression (130)

In case of i-2) rate_y≦rate_x $G\_d1=(x,y)$ Expression (131)

$G\_d2=(x+1,y+1)$ Expression (132)

$G\_d3=(x+1,y-1)$ Expression (133)

$G\_d4=(x+2,y)$ Expression (134)

$G\_rate\_x=(rate\_y+rate\_x)/2$     Expression (135)

$G\_rate\_y=(rate\_x-rate\_y)/2$     Expression (136)

Figure 17A:
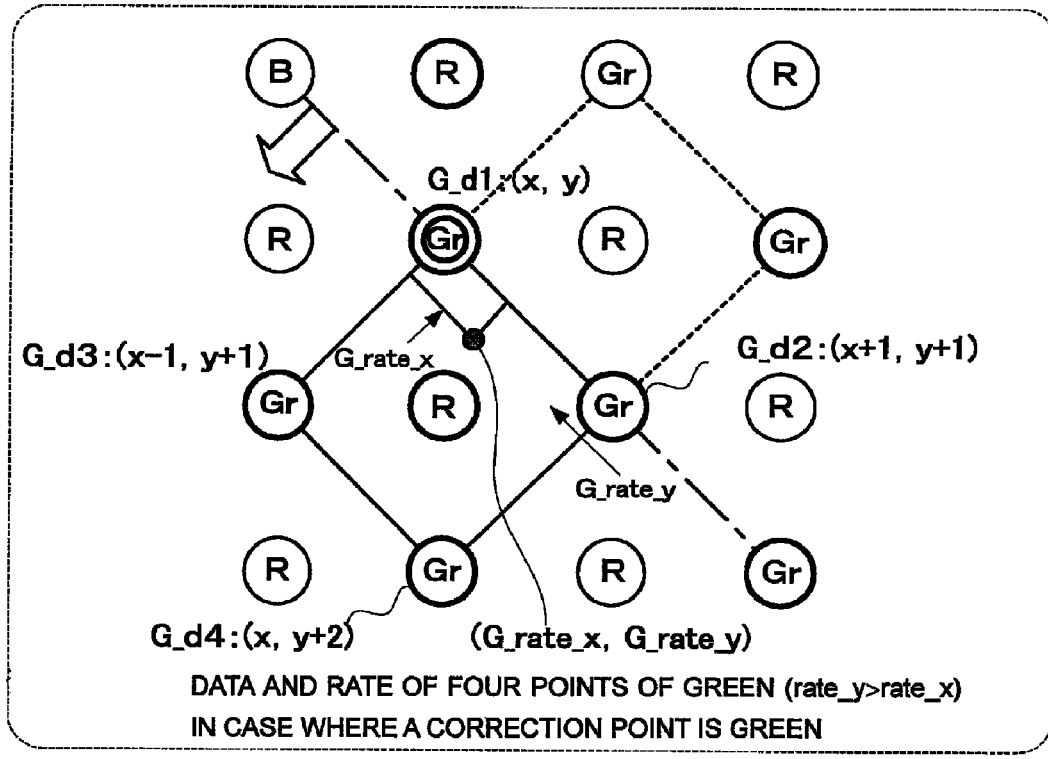
FIG. 17A is a view showing a concept of calculation of an address and a rate wherein the address: (x, y)=(even, even) in (b) the GRBG type 26.
Figure 17B:
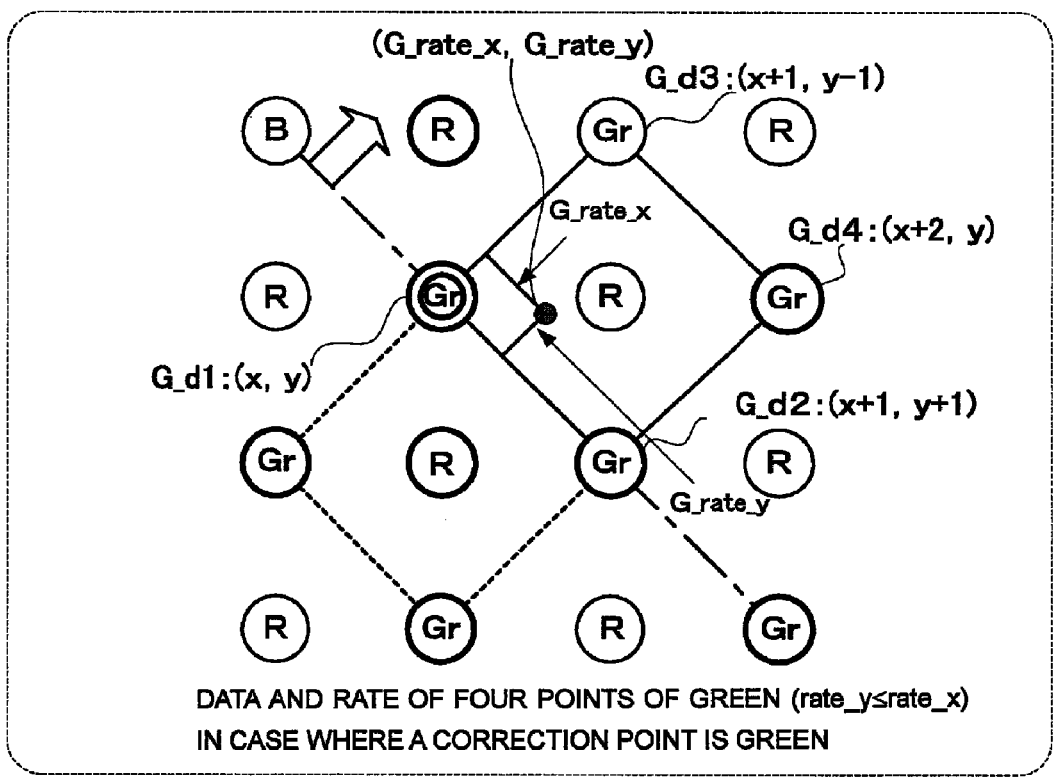
FIG. 17B is a view showing a concept of calculation of an address and a rate wherein the address: (x, y)=(even, even) in (b) the GRBG type 26.

As shown in FIG. 17, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_y>rate_x, the rate exists within a region defined by a solid line in FIG. 17A. In case of rate_y≦rate_x, the rate exists within a region defined by a solid line in FIG. 17B.

Then, the correction point data for each color are determined by a correction calculation such as a linear operation (Step S16).

ii) b) In Case of Address: (x, y)=(Odd, Even) in GRBG Type 26

Now, (b) calculation of the address and the rate in case of address: (x, y)=(odd, even) in the GRBG type 26 will be described below with reference to FIGS. 18 and 19. In this case, the color indicated by the address (x, y) is red.

As shown in FIGS. 18 and 19, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (137) to (140) and the rate may be expressed by the following Expressions (141) and (142):

$R\_d1=(x,y)$     Expression (137)

$R\_d2=(x+2,y)$     Expression (138)

$R\_d3=(x,y+2)$     Expression (139)

$R\_d4=(x+2,y+2)$     Expression (140)

$R\_rate\_x=rate\_x/2$     Expression (141)

$R\_rate\_y=rate\_y/2$     Expression (142)

Figure 18A:
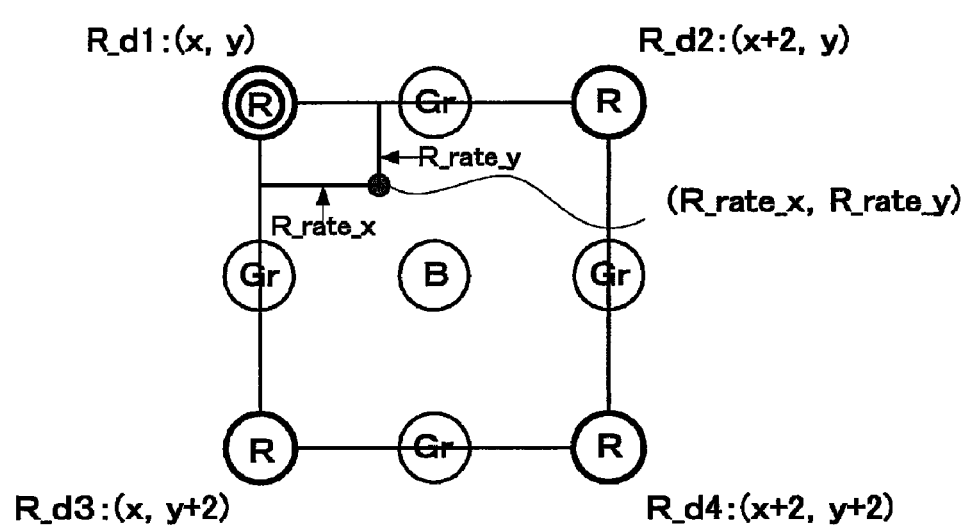
FIG. 18A is a view showing a concept of calculation of an address and a rate wherein the address: (x, y)=(odd, even) in (b) the GRBG type 26.

As shown in FIG. 18A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (143) to (146) and the rate may be expressed by the following Expressions (147) and (148).

$B\_d1=(x-1,y-1)$     Expression (143)

$B\_d2=(x+1,y-1)$     Expression (144)

$B\_d3=(x-1,y+1)$     Expression (145)

$B\_d4=(x+1,y+1)$     Expression (146)

$B\_rate\_x=rate\_x/2+0.5$     Expression (147)

$B\_rate\_y=rate\_y/2+0.5$     Expression (148)

Figure 18B:
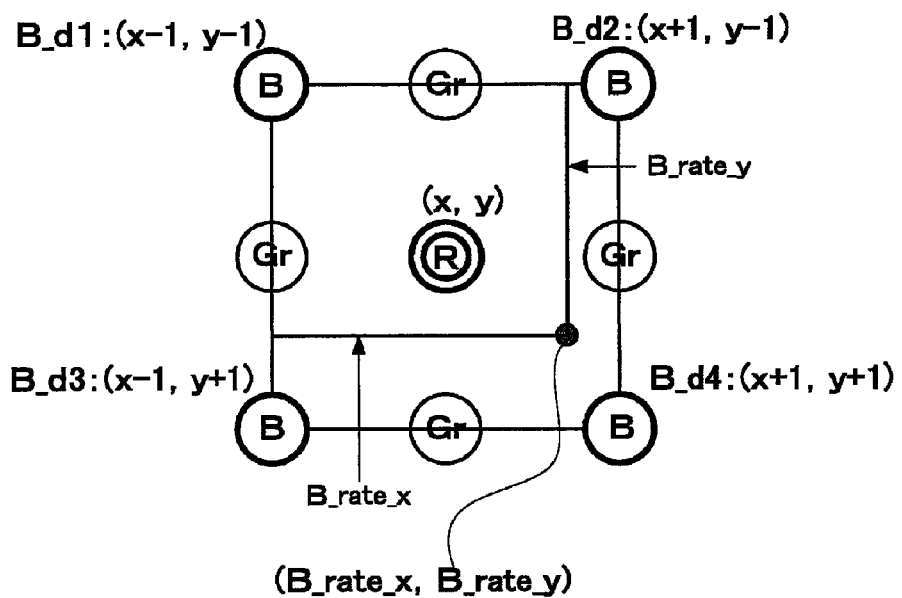
FIG. 18B is a view showing a concept of calculation of an address and a rate wherein the address: (x, y)=(odd, even) in (b) the GRBG type 26.

As shown in FIG. 18B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (149) to (152) and the rate may be expressed by the following Expressions (153) and (154) in case of ii-1) rate_x+rate_y<1.0. In addition, the correction data may be expressed by the following Expressions (155) to (158) and the rate may be expressed by the following Expressions (159) and (160) in case of ii-2) rate_x+rate_y≧1.0.

In case of ii-1) rate_x+rate_y<1.0

$G\_d1=(x,y-1)$     Expression (149)

$G\_d2=(x+1,y)$     Expression (150)

$G\_d3=(x-1,y)$     Expression (151)

$G\_d4=(x,y+1)$     Expression (152)

$G\_rate\_x=(rate\_x+rate\_y)/2+0.5$     Expression (153)

$G\_rate\_y=(rate\_y-rate\_x)/2+0.5$     Expression (154)

In case of ii-2) rate_x+rate_y≧1.0

$G\_d1=(x+1,y)$     Expression (155)

$G\_d2=(x+2,y+1)$     Expression (156)

$G\_d3=(x,y+1)$     Expression (157)

$G\_d4=(x+1,y+2)$     Expression (158)

$G\_rate\_x=(rate\_x+rate\_y)/2-0.5$     Expression (159)

$G\_rate\_y=(rate\_y-rate\_x)/2+0.5$     Expression (160)

Figure 19A:
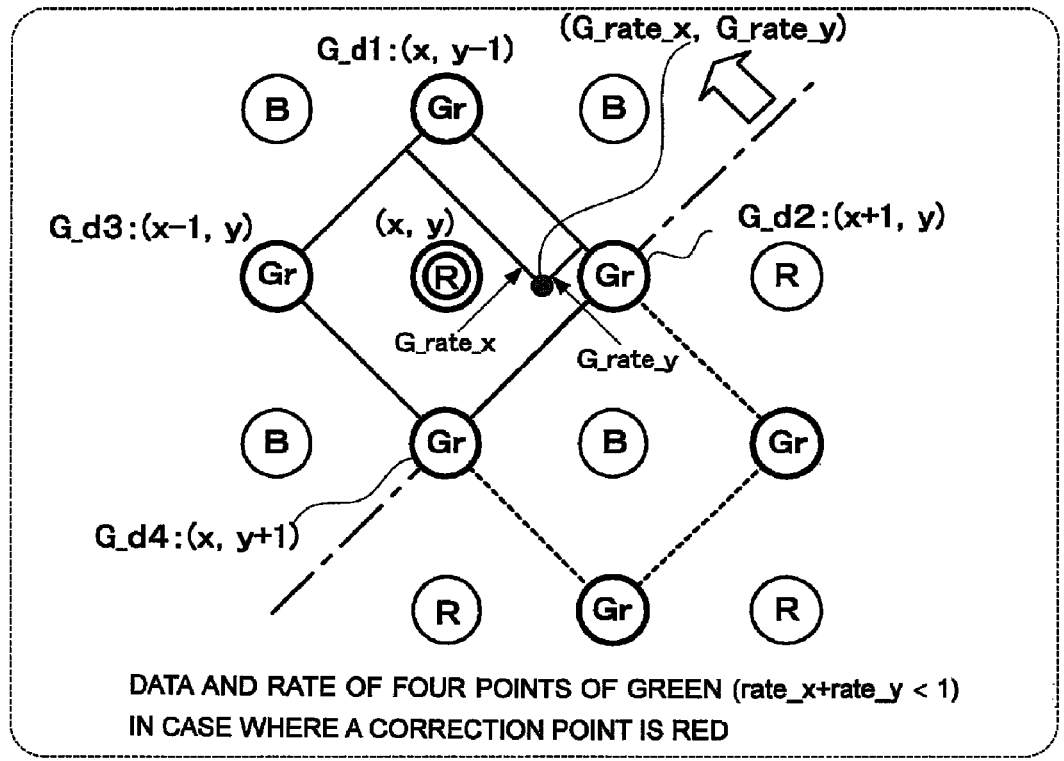
FIG. 19A is a view showing a concept of calculation of an address and a rate wherein the address: (x, y)=(odd, even) in (b) the GRBG type 26.
Figure 19B:
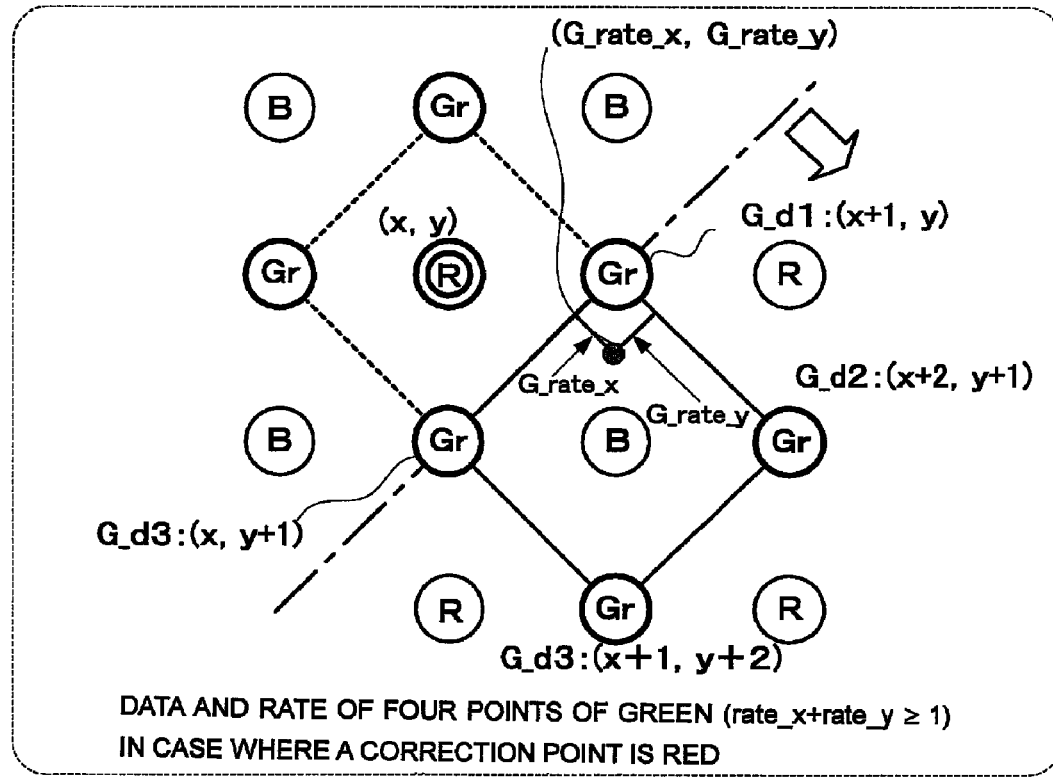
FIG. 19B is a view showing a concept of calculation of an address and a rate wherein the address: (x, y)=(odd, even) in (b) the GRBG type 26.

As shown in FIG. 19, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_x+rate_y<1.0, the rate exists within a region defined by a solid line in FIG. 19A. In case of rate_x+rate_y≧1.0, the rate exists within a region defined by a solid line in FIG. 19B.

Then, the correction point data for each color are determined by a correction calculation such as a linear operation. The method of the correction calculation is the same as the step S16.

iii) b) In Case of Address: (x, y)=(Even, Odd) in the GRBG Type 26

Now, (b) calculation of the address and the rate in case of address: (x, y)=(even, odd) in the GRBG type 26 will be described below with reference to FIGS. 20 and 21. In this case, the color indicated by the address (x, y) is blue.

As shown in FIGS. 20 and 21, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (161) to (164) and the rate may be expressed by the following Expressions (165) and (166):

$R\_d1=(x-1,y-1)$     Expression (161)

$R\_d2=(x+1,y-1)$     Expression (162)

$R\_d3=(x-1,y+1)$     Expression (163)

$$R\_d4=(x+1,y+1) \quad \text{Expression (164)}$$

$$R\_rate\_x=rate\_x/2+0.5 \quad \text{Expression (165)}$$

$$R\_rate\_y=rate\_y/2+0.5 \quad \text{Expression (166)}$$

Figure 20A:
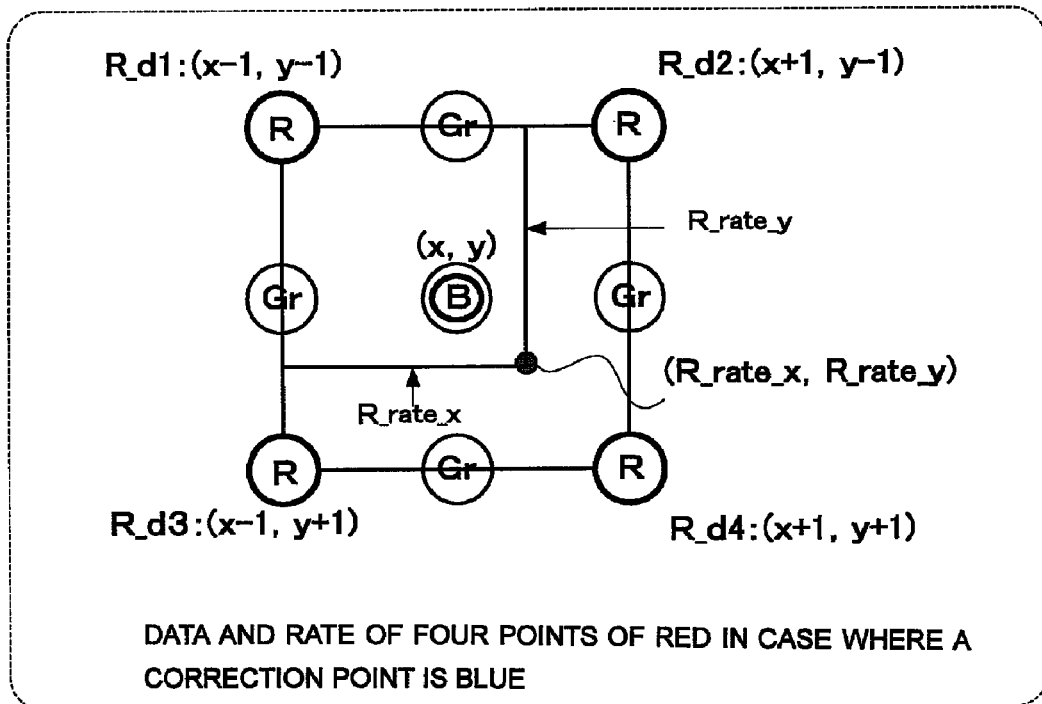
FIG. 20A is a view showing a concept of calculation of an address and a rate wherein the address: (x, y)=(even, odd) in (b) the GRBG type 26.

As shown in FIG. 20A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (167) to (170) and the rate may be expressed by the following Expressions (171) and (172).

$$B\_d1=(x,y) \quad \text{Expression (167)}$$

$$B\_d2=(x+2,y) \quad \text{Expression (168)}$$

$$B\_d3=(x,y+2) \quad \text{Expression (169)}$$

$$B\_d4=(x+2,y+2) \quad \text{Expression (170)}$$

$$B\_rate\_x=rate\_x/2 \quad \text{Expression (171)}$$

$$B\_rate\_y=rate\_y/2 \quad \text{Expression (172)}$$

Figure 20B:
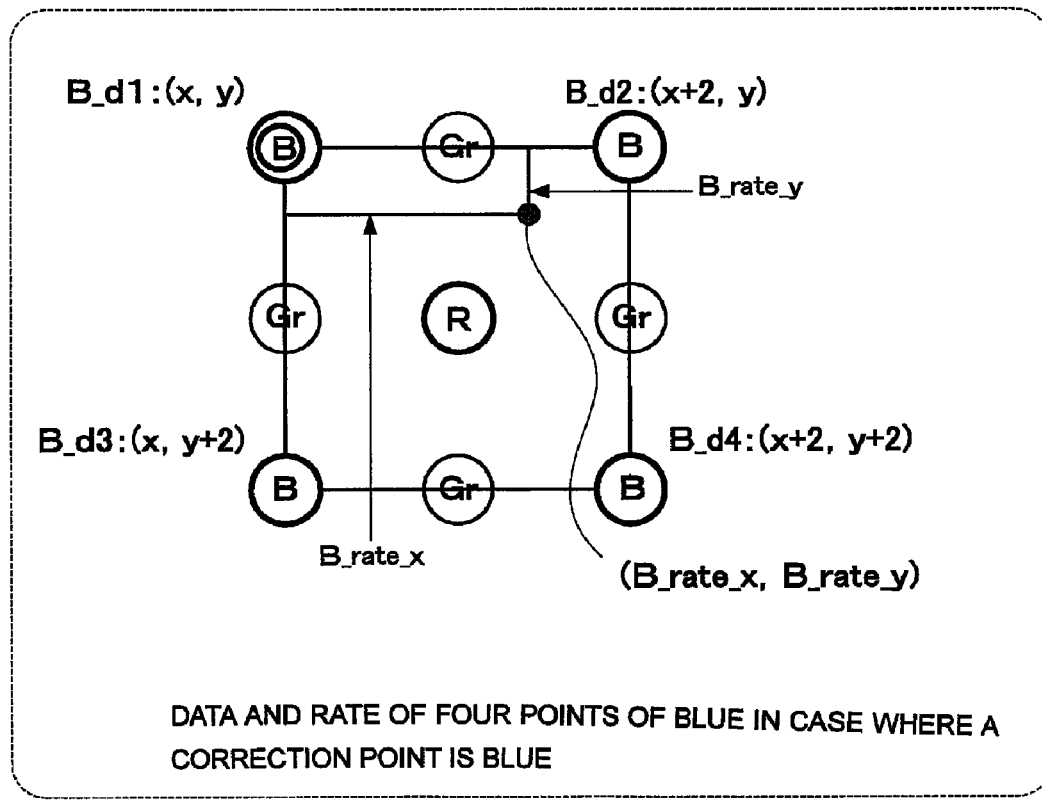
FIG. 20B is a view showing a concept of calculation of an address and a rate wherein the address: (x, y)=(even, odd) in (b) the GRBG type 26.

As shown in FIG. 20B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (173) to (176) and the rate may be expressed by the following Expressions (183) and (184) in case of iii-1) rate_x+rate_y<1.0. In addition, the correction data may be expressed by the following Expressions (179) to (182) and the rate may be expressed by the following Expressions (183) and (184) in case of iii-2) rate_x+rate_y≧1.0.

In case of iii-1) rate_x+rate_y<1.0

$$G\_d1=(x,y-1) \quad \text{Expression (173)}$$

$$G\_d2=(x+1,y) \quad \text{Expression (174)}$$

$$G\_d3=(x-1,y) \quad \text{Expression (175)}$$

$$G\_d4=(x,y+1) \quad \text{Expression (176)}$$

$$G\_rate\_x=(rate\_x+rate\_y)/2+0.5 \quad \text{Expression (177)}$$

$$G\_rate\_y=(rate\_y-rate\_x)/2+0.5 \quad \text{Expression (178)}$$

In case of iii-2) rate_x+rate_y≧1.0

$$G\_d1=(x+1,y) \quad \text{Expression (179)}$$

$$G\_d2=(x+2,y+1) \quad \text{Expression (180)}$$

$$G\_d3=(x,y+1) \quad \text{Expression (181)}$$

$$G\_d4=(x+1,y+2) \quad \text{Expression (182)}$$

$$G\_rate\_x=(rate\_x+rate\_y)/2-0.5 \quad \text{Expression (183)}$$

$$G\_rate\_y=(rate\_y-rate\_x)/2+0.5 \quad \text{Expression (184)}$$

As shown in FIG. 21, the distance between the adjacent pixels may be expressed by "1", and the distance between the adjacent green pixels may be expressed by "root 2". The distance between the adjacent green pixels are normalized as "1", and accordingly, the rate may be expressed as "1/root 2".

Figure 21A:
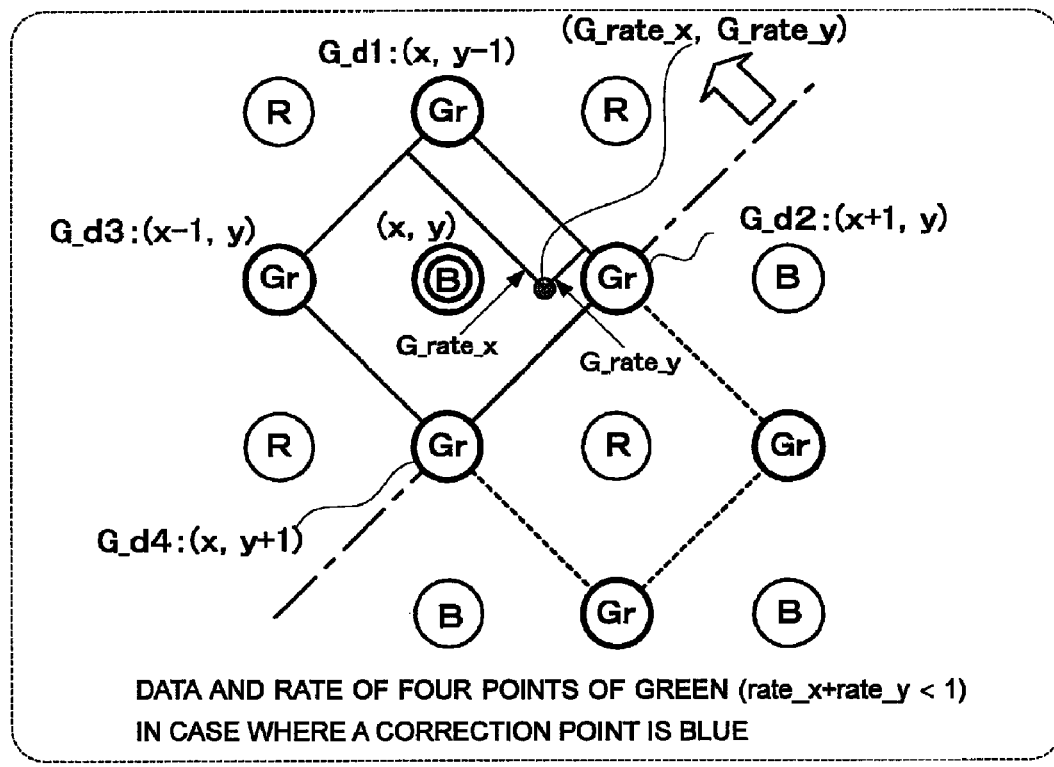
FIG. 21A is a view showing a concept of calculation of an address and a rate wherein the address: (x, y)=(even, odd) in (b) the GRBG type 26.
Figure 21B:
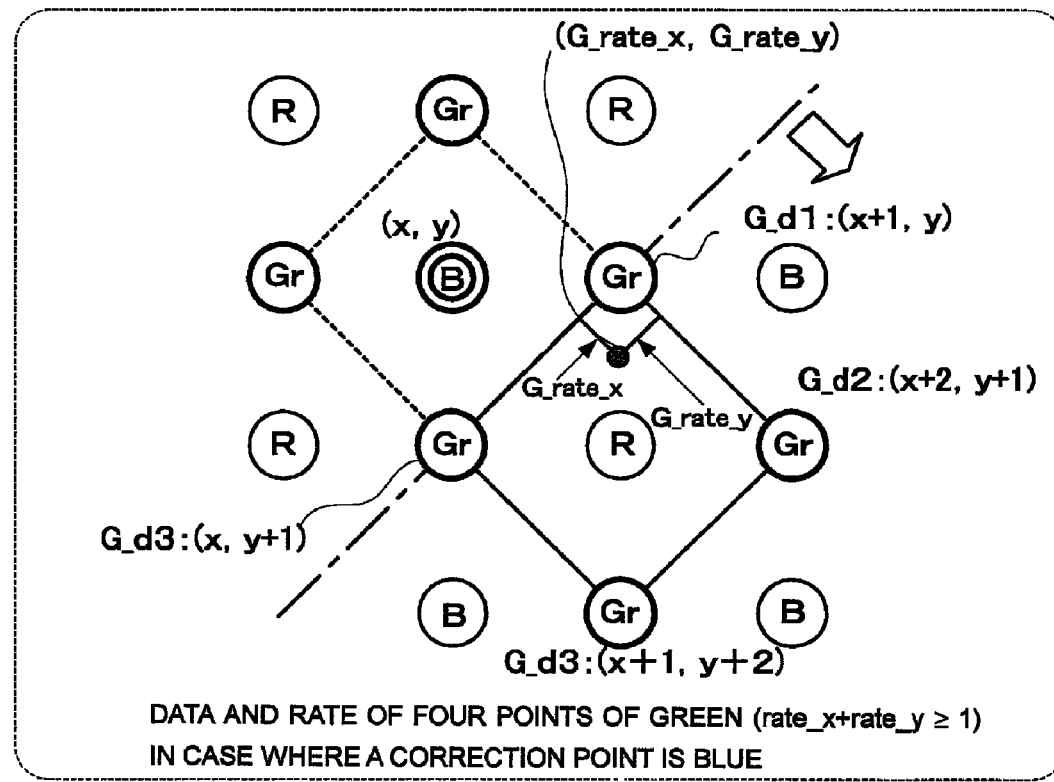
FIG. 21B is a view showing a concept of calculation of an address and a rate wherein the address: (x, y)=(even, odd) in (b) the GRBG type 26.

In case of rate_x+rate_y<1.0, the rate exists within a region defined by a solid line in FIG. 21A. In case of rate_x+rate_y≧1.0, the rate exists within a region defined by a solid line in FIG. 21B.

Then, the correction point data for each color are determined by a correction calculation such as a linear operation. The method of the correction calculation is the same as the step S16.

iv) b) In Case of Address: (x, y)=(Odd, Odd) in GRBG Type 26

Now, (b) calculation of the address and the rate in case of address: (x, y)=(odd, odd) in the GRBG type 26 will be described below with reference to FIGS. 22 and 23. In this case, the color indicated by the address (x, y) is green.

As shown in FIGS. 22 and 23, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (185) to (188) and the rate may be expressed by the following Expressions (189) and (190):

$$R\_d1=(x,y-1) \quad \text{Expression (185)}$$

$$R\_d2=(x+2,y-1) \quad \text{Expression (186)}$$

$$R\_d3=(x,y+1) \quad \text{Expression (187)}$$

$$R\_d4=(x+2,y+1) \quad \text{Expression (188)}$$

$$R\_rate\_x=rate\_x/2 \quad \text{Expression (189)}$$

$$R\_rate\_y=rate\_y/2+0.5 \quad \text{Expression (190)}$$

Figure 22A:
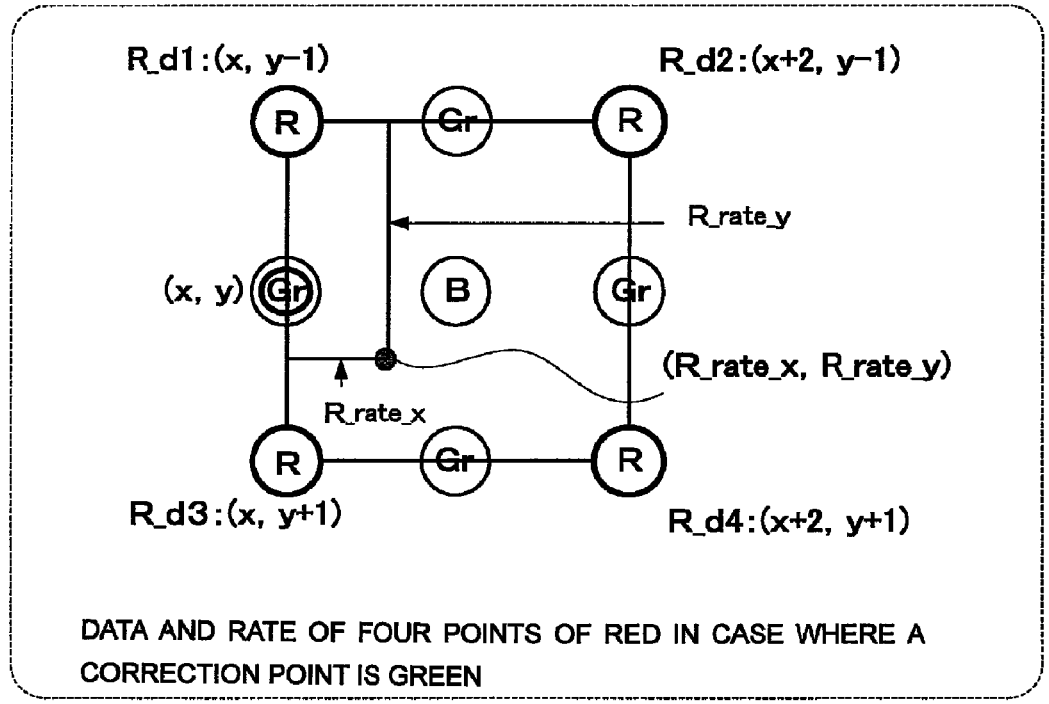
FIG. 22A is a view showing a concept of calculation of an address and a rate wherein the address: (x, y)=(odd, odd) in (b) the GRBG type 26.

As shown in FIG. 22A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (191) to (194) and the rate may be expressed by the following Expressions (195) and (196).

$$B\_d1=(x-1,y) \quad \text{Expression (191)}$$

$$B\_d2=(x+1,y) \quad \text{Expression (192)}$$

$$B\_d3=(x-1,y+2) \quad \text{Expression (193)}$$

$$B\_d4=(x+1,y+2) \quad \text{Expression (194)}$$

$$B\_rate\_x=rate\_x/2+0.5 \quad \text{Expression (195)}$$

$$B\_rate\_y=rate\_y/2 \quad \text{Expression (196)}$$

Figure 22B:
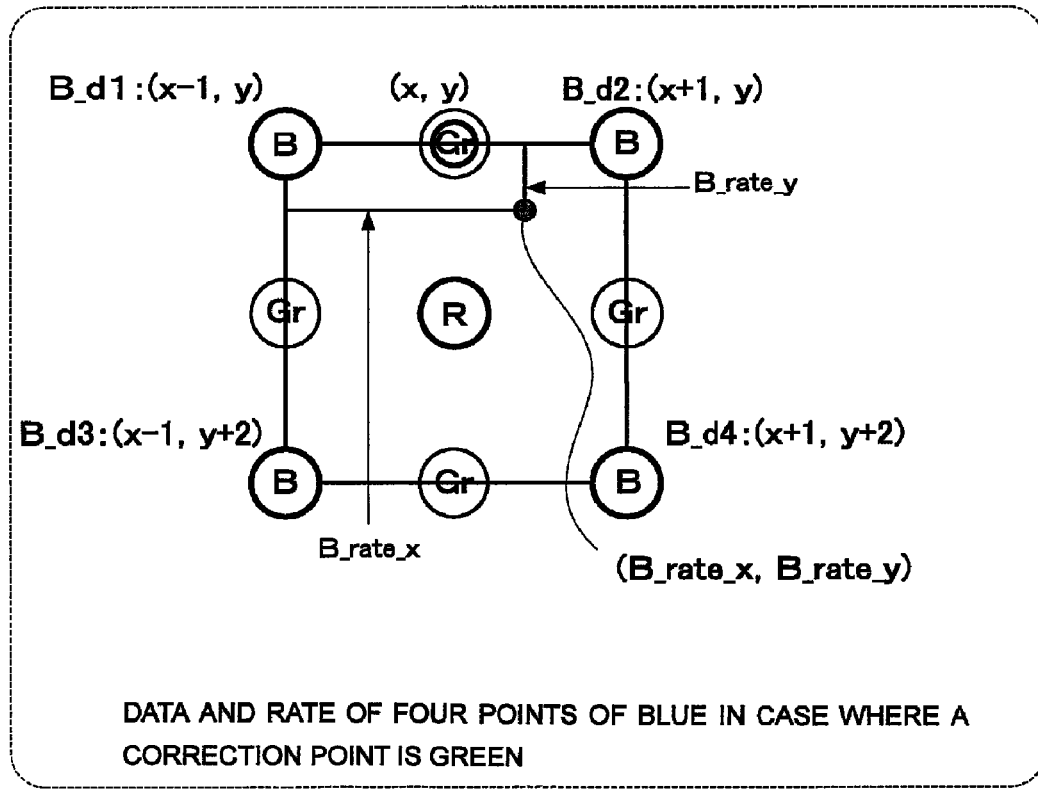
FIG. 22B is a view showing a concept of calculation of an address and a rate wherein the address: (x, y)=(odd, odd) in (b) the GRBG type 26.

As shown in FIG. 22B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (197) to (200) and the rate may be expressed by the following Expressions (201) and (202) in case of iv-1) rate_y>rate_x. In addition, the correction data may be expressed by the following Expressions (203) to (206) and the rate may be expressed by the following Expressions (207) and (208) in case of iv-2) rate_y≦rate_x.

In case of iv-1) rate_y>rate_x $G\_d1=(x,y)$      Expression (197)

$G\_d2=(x+1,y+1)$      Expression (198)

$G\_d3=(x-1,y+1)$      Expression (199)

$G\_d4=(x,y+2)$      Expression (200)

$G\_rate\_x=(rate\_y+rate\_x)/2$      Expression (201)

$G\_rate\_y=(rate\_y-rate\_x)/2$      Expression (202)

In case of iv-2) rate_y≦rate_x $G\_d1=(x,y)$      Expression (203)

$G\_d2=(x+1,y+1)$      Expression (204)

$G\_d3=(x+1,y-1)$      Expression (205)

$G\_d4=(x+2,y)$      Expression (206)

$G\_rate\_x=(rate\_y+rate\_x)/2$      Expression (207)

$G\_rate\_y=(rate\_x-rate\_y)/2$      Expression (208)

Figure 23A:
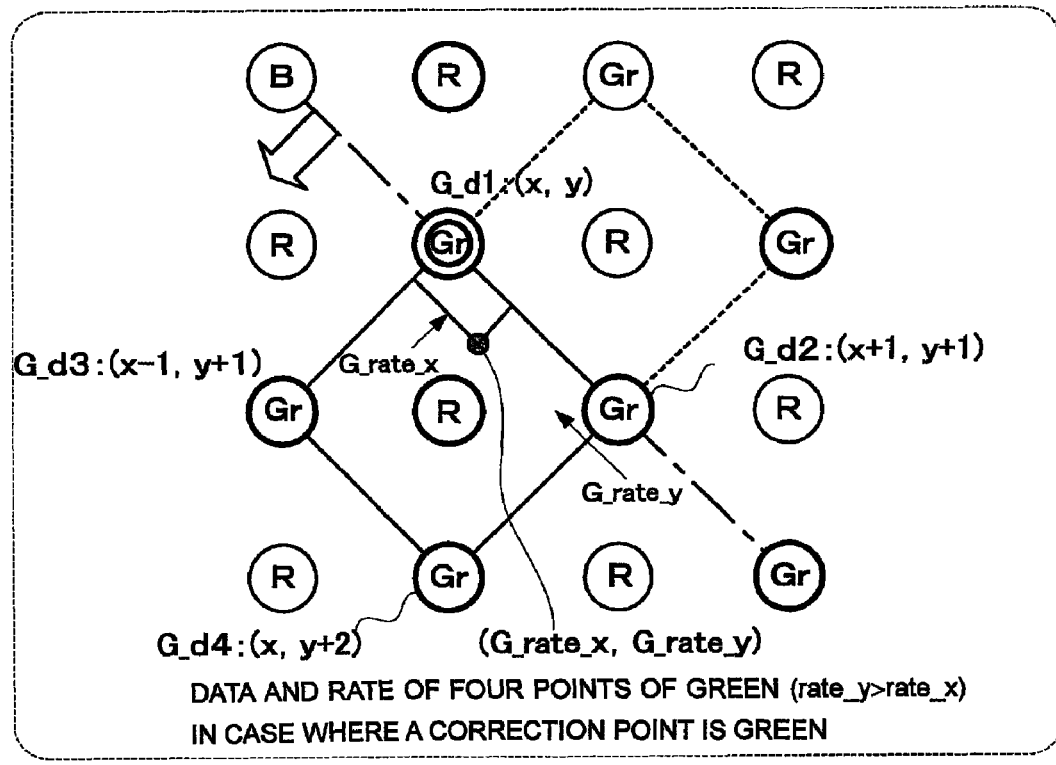
FIG. 23A is a view showing a concept of calculation of an address and a rate wherein the address: (x, y)=(odd, odd) in (b) the GRBG type 26.
Figure 23B:
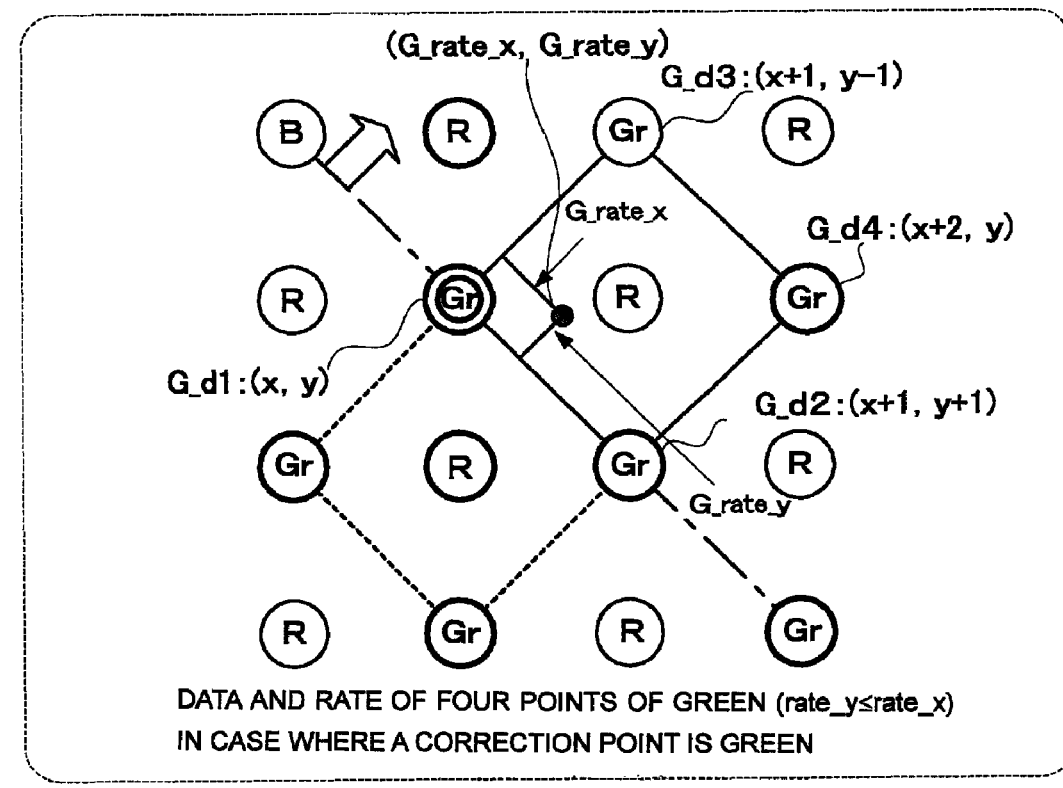
FIG. 23B is a view showing a concept of calculation of an address and a rate wherein the address: (x, y)=(odd, odd) in (b) the GRBG type 26.

As shown in FIG. 23, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_y>rate_x, the rate exists within a region defined by a solid line in FIG. 23A. In case of rate_y≦rate_x, the rate exists within a region defined by a solid line in FIG. 23B.

Then, the correction point data for each color are determined by a correction calculation such as a linear operation. The method of the correction calculation is the same as the step S16.

(C) (c) Calculation of Address and Rate in the Gorge Type 27 i) c) In Case of Address: (x, y)=(Even, Even) in the GBRG Type 27

Now, (c) calculation of the address and the rate in case of address: (x, y)=(even, even) in the GBRG type 27 will be described below with reference to FIGS. 24 and 25. In this case, the color indicated by the address (x, y) is green.

As shown in FIGS. 24 and 25, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (209) to (212) and the rate may be expressed by Expressions (213) and (214).

$R\_D1=(x,y-1)$      Expression (209)

$R\_d2=(x+2,y-1)$      Expression (210)

$R\_d3=(x,y+1)$      Expression (211)

$R\_d4=(x+2,y+1)$      Expression (212)

$R\_rate\_x=rate\_x/2$      Expression (213)

$R\_rate\_y=rate\_y/2+0.5$      Expression (214)

Figure 24A:
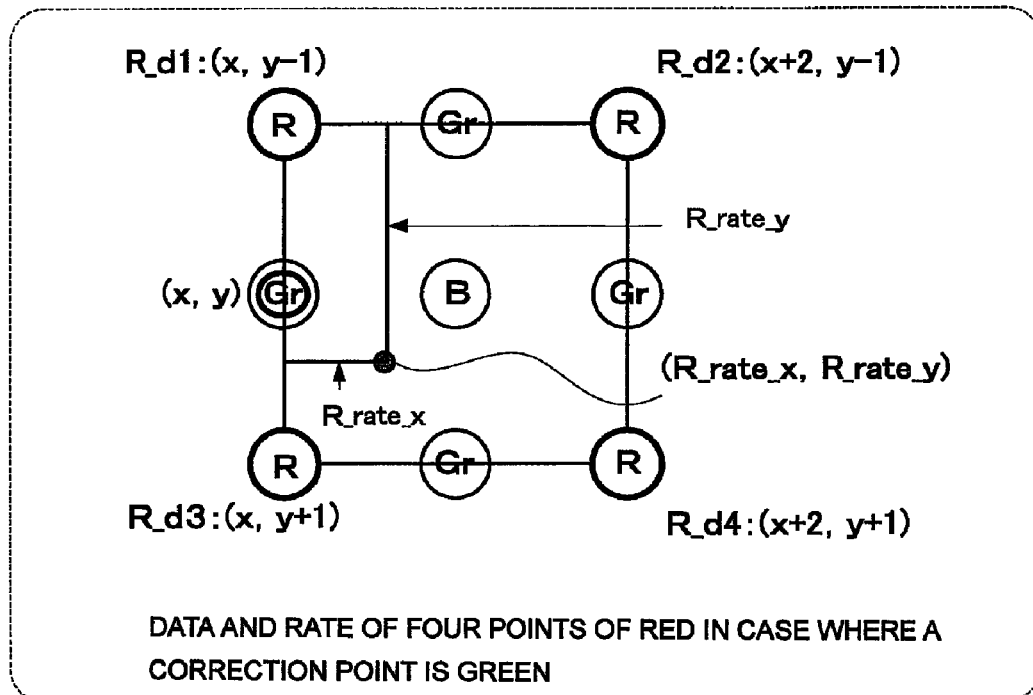
FIG. 24A is a view showing a concept of calculation of an address and a rate wherein the address: (x, y)=(even, even) in (c) a GBRG type 27.

As shown in FIG. 24A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (215) to (218) and the rate may be expressed by the following Expressions (219) and (220):

$B\_d1=(x-1,y)$      Expression (215)

$B\_d2=(x+1,y)$      Expression (216)

$B\_d3=(x-1,y+2)$      Expression (217)

$B\_d4=(x+1,y+2)$      Expression (218)

$B\_rate\_x=rate\_x/2+0.5$      Expression (219)

$B\_rate\_y=rate\_y/2$      Expression (220)

Figure 24B:
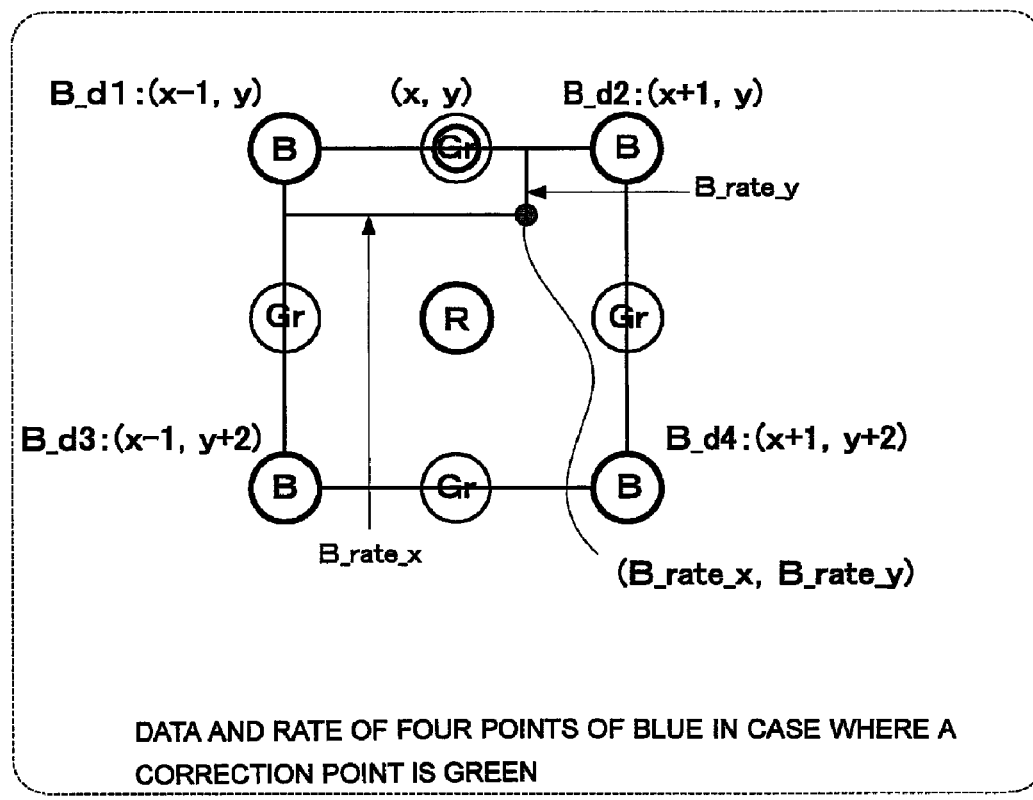
FIG. 24B is a view showing a concept of calculation of an address and a rate wherein the address: (x, y)=(even, even) in (c) the GBRG type 27.

As shown in FIG. 24B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (221) to (224) and the rate may be expressed by Expressions (225) and (226) in case of i-1) rate_y>rate_x. In addition, the correction data may be expressed by the following Expressions (227) to (230) and the rate may be expressed by the following Expressions (231) and (232) in case of i-2) rate_y≦rate_x.

In case of i-1) rate_y>rate_x $G\_d1=(x,y)$      Expression (221)

$G\_d2=(x+1,y+1)$      Expression (222)

$G\_d3=(x-1,y+1)$      Expression (223)

$G\_d4=(x,y+2)$      Expression (224)

$G\_rate\_x=(rate\_y+rate\_x)/2$      Expression (225)

$G\_rate\_y=(rate\_y-rate\_x)/2$      Expression (226)

In case of i-2) rate_y≦rate_x $G\_d1=(x,y)$      Expression (227)

$G\_d2=(x+1,y+1)$      Expression (228)

$G\_d3=(x+1,y-1)$      Expression (229)

$G\_d4=(x+2,y)$      Expression (230)

$G\_rate\_x=(rate\_y+rate\_x)/2$      Expression (231)

$G\_rate\_y=(rate\_x-rate\_y)/2$      Expression (232)

Figure 25A:
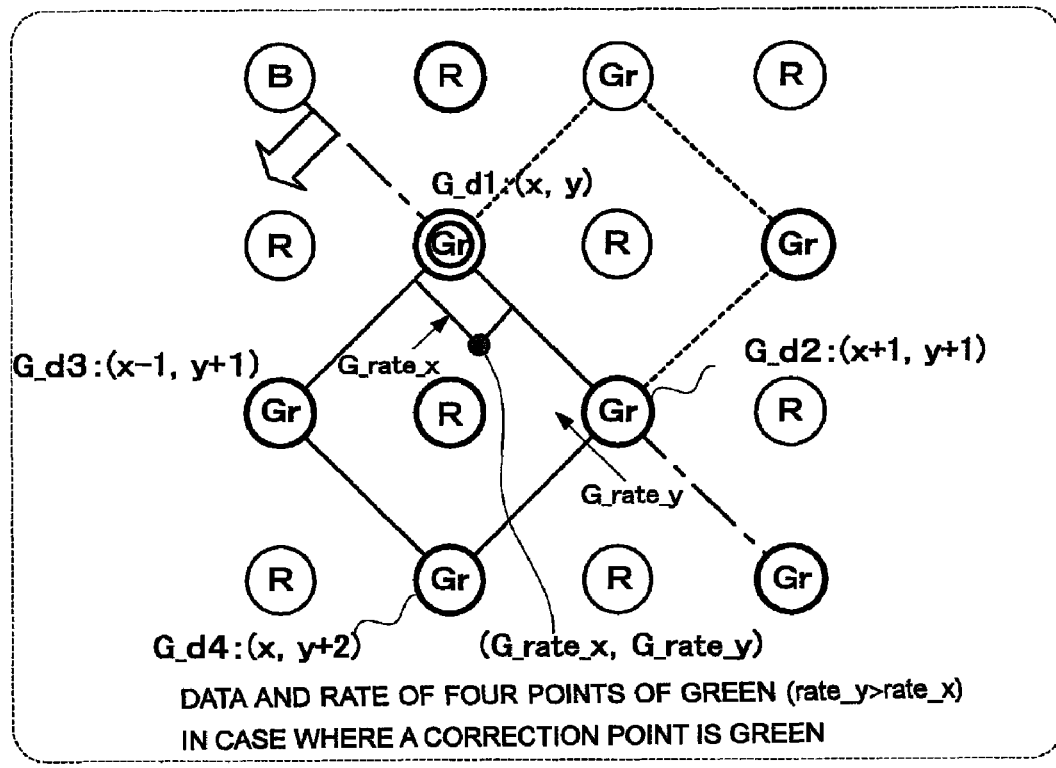
FIG. 25A is a view showing a concept of calculation of an address and a rate wherein the address: (x, y)=(even, even) in (c) the GBRG type 27.
Figure 25B:
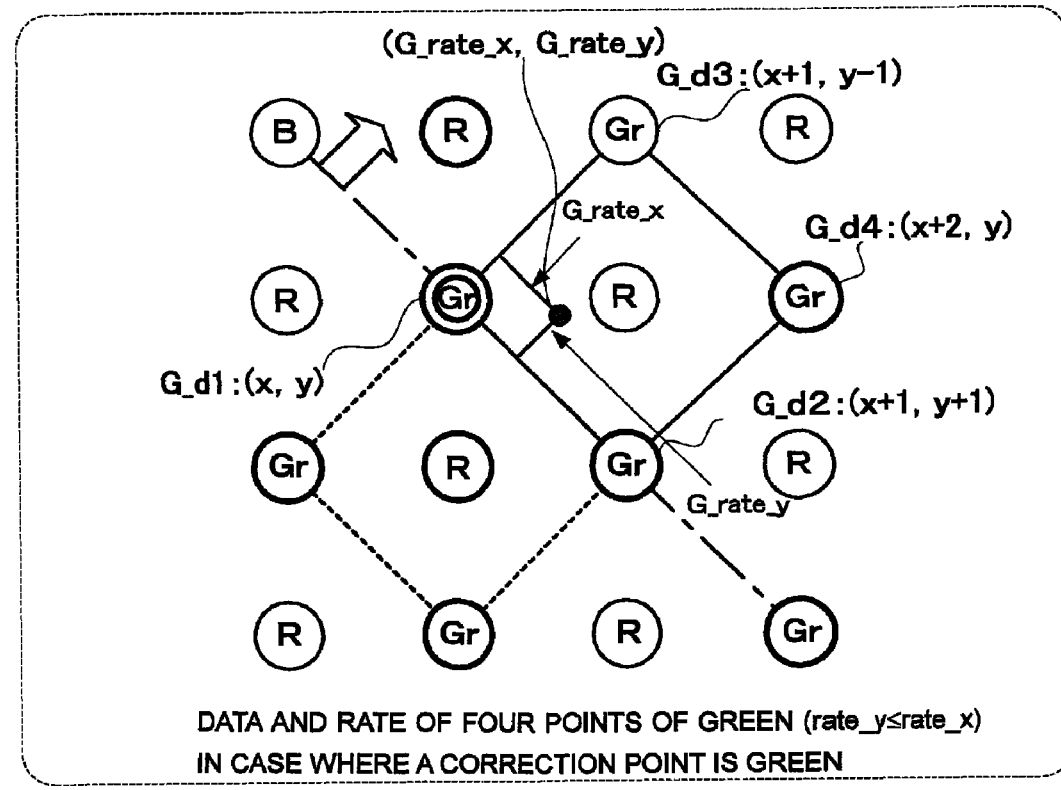
FIG. 25B is a view showing a concept of calculation of an address and a rate wherein the address: (x, y)=(even, even) in (c) the GBRG type 27.

As shown in FIG. 25, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_y>rate_x, the rate exists within a region defined by a solid line in FIG. 25A. In case of rate_y≦rate_x, the rate exists within a region defined by a solid line in FIG. 25B.

Then, the correction point data for each color are determined by a correction calculation such as a linear operation. The method of the correction calculation is the same as the step S16.

ii) c) In Case of Address: (x, y)=(Odd, Even) in GBRG Type 27

Now, (c) calculation of the address and the rate in case of address: (x, y)=(odd, even) in the GBRG type 27 will be described below with reference to FIGS. 26 and 27. In this case, the color indicated by the address (x, y) is blue.

As shown in FIGS. 26 and 27, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (233) to (236) and the rate may be expressed by the following Expressions (237) and (238):

$R\_d1=(x-1,y-1)$   Expression (233)

$R\_d2=(x+1,y-1)$   Expression (234)

$R\_d3=(x-1,y+1)$   Expression (235)

$R\_d4=(x+1,y+1)$   Expression (236)

$R\_rate\_x=rate\_x/2+0.5$   Expression (237)

$R\_rate\_y=rate\_y/2+0.5$   Expression (238)

Figure 26A:
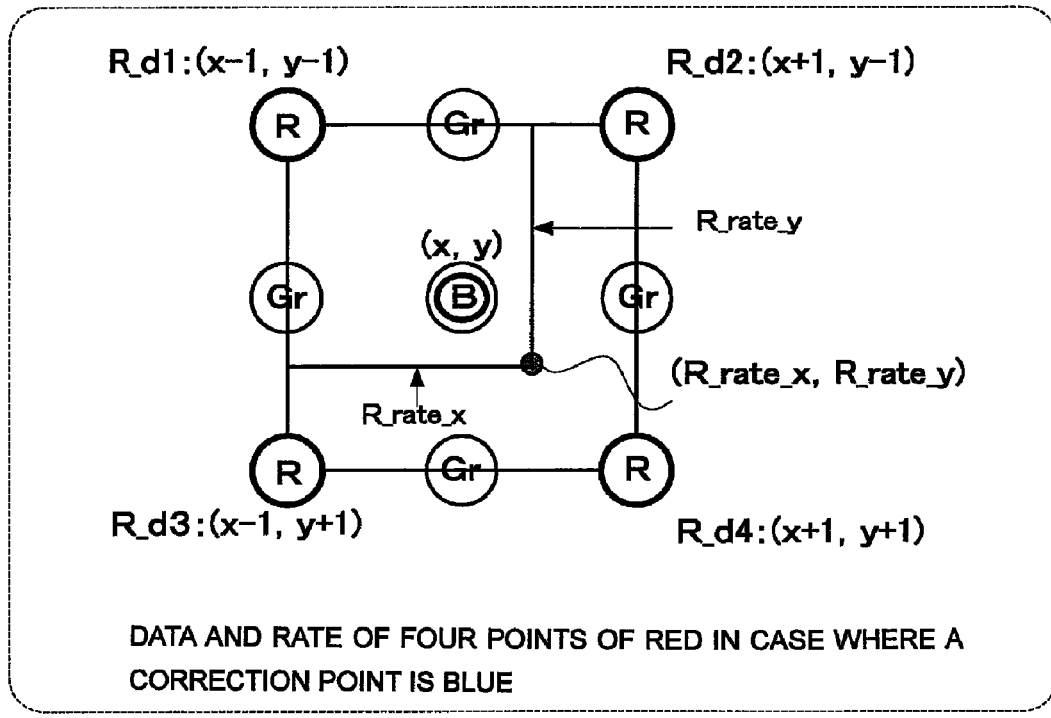
FIG. 26A is a view showing a concept of calculation of an address and a rate wherein the address: (x, y)=(odd, even) in (c) the GBRG type 27.

As shown in FIG. 26A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (239) to (242) and the rate may be expressed by the following Expressions (243) and (244).

$B\_d1=(x,y)$   Expression (239)

$B\_d2=(x+2,y)$   Expression (240)

$B\_d3=(x,y+2)$   Expression (241)

$B\_d4=(x+2,y+2)$   Expression (242)

$B\_rate\_x=rate\_x/2$   Expression (243)

$B\_rate\_y=rate\_y/2$   Expression (244)

Figure 26B:
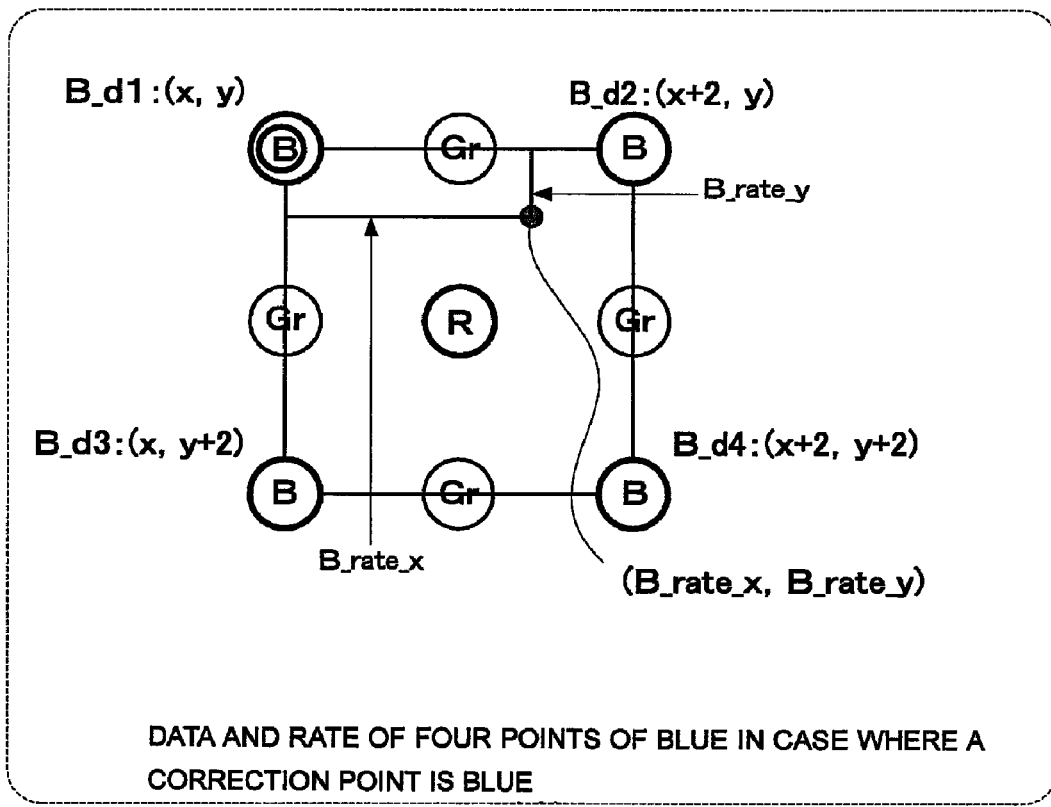
FIG. 26B is a view showing a concept of calculation of an address and a rate wherein the address: (x, y)=(odd, even) in (c) the GRBG type 27.

As shown in FIG. 26B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (245) to (248) and the rate may be expressed by the following Expressions (249) and (250) in case of ii-1) rate_x+rate_y<1.0. In addition, the correction data may be expressed by the following Expressions (251) to (254) and the rate may be expressed by the following Expressions (255) and (256) in case of ii-2) rate_x+rate_y1.0.

In case of ii-1) rate_x+rate_y<1.0

$G\_d1=(x,y-1)$   Expression (245)

$G\_d2=(x+1,y)$   Expression (246)

$G\_d3=(x-1,y)$   Expression (247)

$G\_d4=(x,y+1)$   Expression (248)

$G\_rate\_x=(rate\_x+rate\_y)/2+0.5$   Expression (249)

$G\_rate\_y=(rate\_y-rate\_x)/2+0.5$   Expression (250)

In case of ii-2) rate_x+rate_y$\geq$1.0

$G\_d1=(x+1,y)$   Expression (251)

$G\_d2=(x+2,y+1)$   Expression (252)

$G\_d3=(x,y+1)$   Expression (253)

$G\_d4=(x+1,y+2)$   Expression (254)

$G\_rate\_x=(rate\_x+rate\_y)/2-0.5$   Expression (255)

$G\_rate\_y=(rate\_y-rate\_x)/2+0.5$   Expression (256)

Figure 27A:
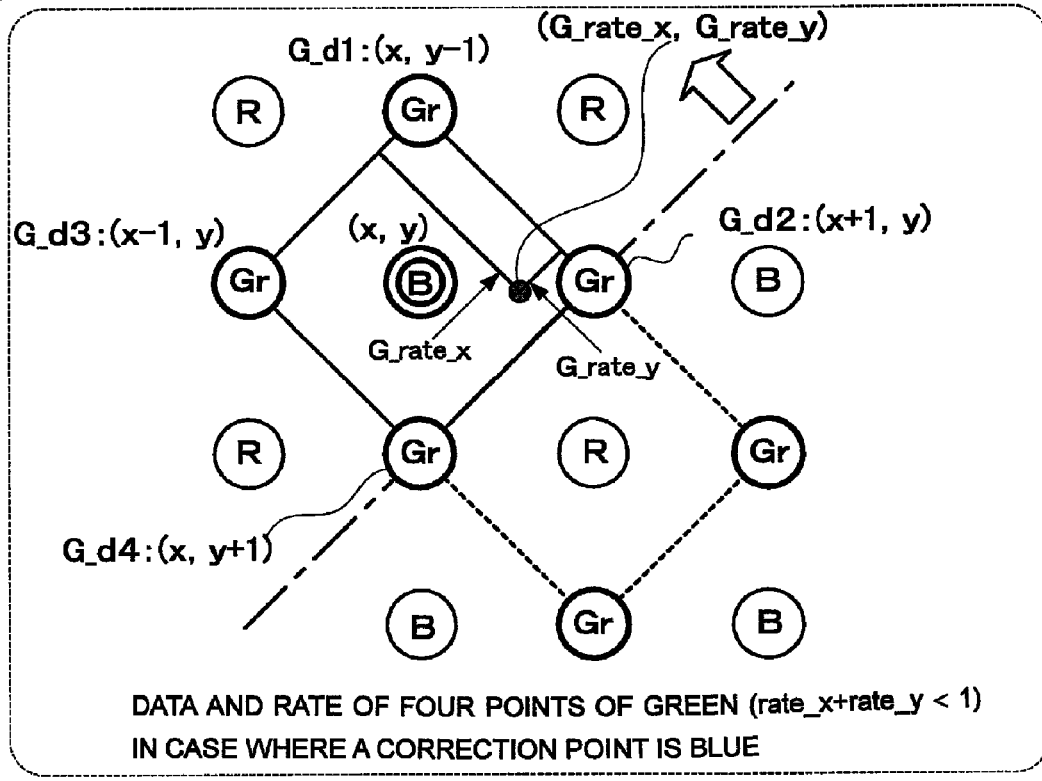
FIG. 27A is a view showing a concept of calculation of an address and a rate wherein the address: (x, y)=(odd, even) in (c) the GBRG type 27.
Figure 27B:
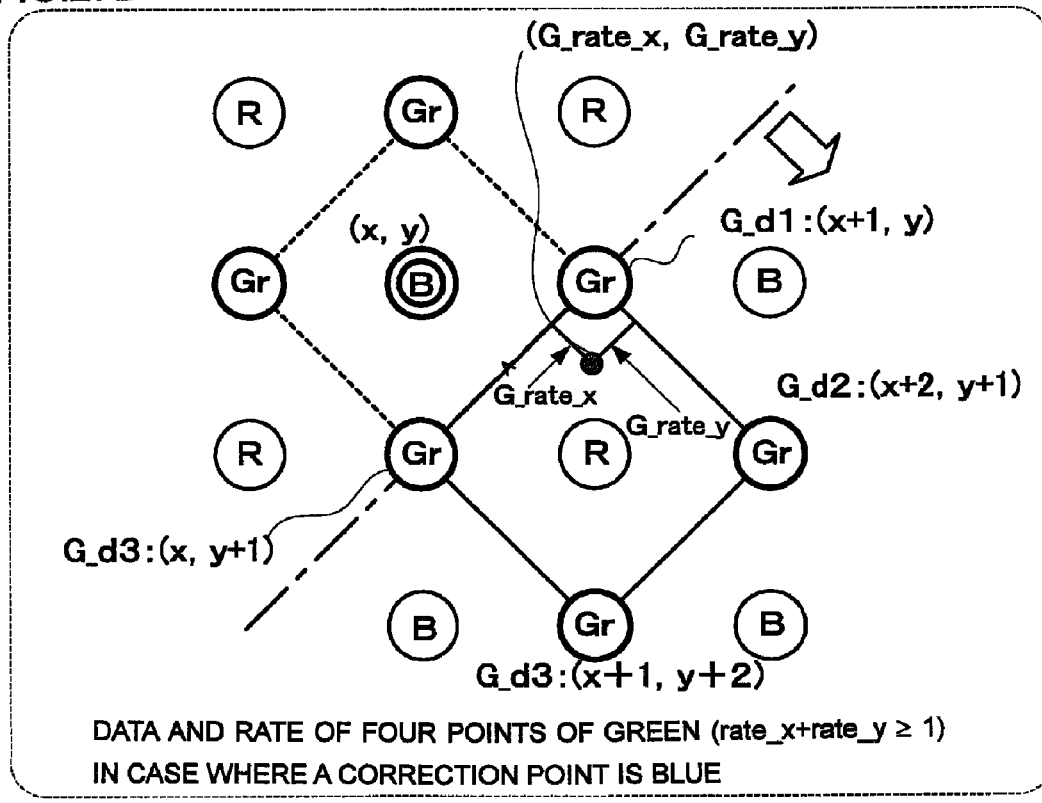
FIG. 27B is a view showing a concept of calculation of an address and a rate wherein the address: (x, y)=(odd, even) in (c) the GRBG type 27.

As shown in FIG. 27, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_x+rate_y<1.0, the rate exists within a region defined by a solid line in FIG. 27A. In case of rate_x+rate_y$\geq$1.0, the rate exists within a region defined by a solid line in FIG. 27B.

Then, the correction point data for each color are determined by a correction calculation such as a linear operation. The method of the correction calculation is the same as the step S16.

iii) c) In Case of Address: (x, y)=(Even, Odd) in the GBRG Type 27

Now, (c) calculation of the address and the rate in case of address: (x, y)=(even, odd) in the GBRG type 27 will be described below with reference to FIGS. 28 and 29. In this case, the color indicated by the address (x, y) is red.

As shown in FIGS. 28 and 29, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (257) to (260) and the rate may be expressed by the following Expressions (261) and (262):

$R\_d1=(x,y)$   Expression (257)

$R\_d2=(x+2,y)$   Expression (258)

$R\_d3=(x,y+2)$   Expression (259)

$R\_d4=(x+2,y+2)$   Expression (260)

$R\_rate\_x=rate\_x/2$   Expression (261)

$R\_rate\_y=rate\_y/2$   Expression (262)

Figure 28A:
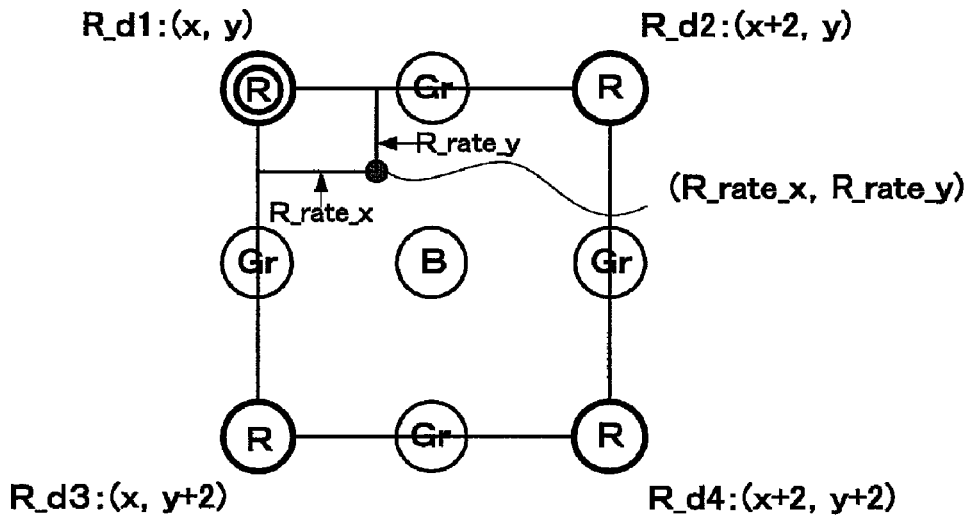
FIG. 28A is a view showing a concept of calculation of an address and a rate wherein the address: (x, y)=(even, odd) in (c) the GBRG type 27.

As shown in FIG. 28A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (263) to (266) and the rate may be expressed by the following Expressions (267) and (268).

$$B\_d1=(x-1,y-1) \quad \text{Expression (263)}$$

$$B\_d2=(x+1,y-1) \quad \text{Expression (264)}$$

$$B\_d3=(x-1,y+1) \quad \text{Expression (265)}$$

$$B\_d4=(x+1,y+1) \quad \text{Expression (266)}$$

$$B\_rate\_x=rate\_x/2+0.5 \quad \text{Expression (267)}$$

$$B\_rate\_y=rate\_y/2+0.5 \quad \text{Expression (268)}$$

Figure 28B:
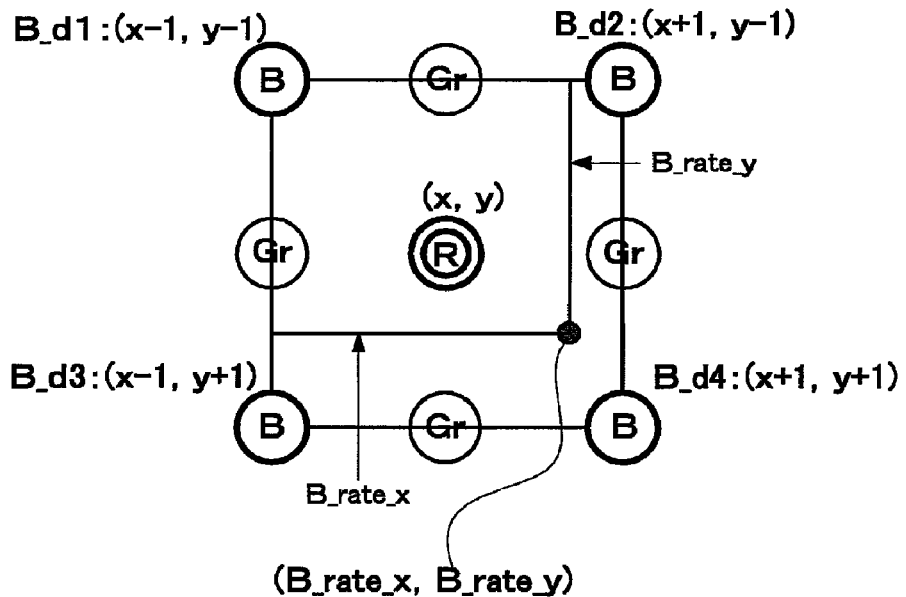
FIG. 28B is a view showing a concept of calculation of an address and a rate wherein the address: (x, y)=(even, odd) in (c) the GRBG type 27.

As shown in FIG. 28B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (269) to (272) and the rate may be expressed by the following Expressions (273) and (274) in case of iii-1) rate_x+rate_y<1.0. In addition, the correction data may be expressed by the following Expressions (275) to (278) and the rate may be expressed by the following Expressions (279) and (280) in case of iii-2) rate_x+rate_y≧1.0.

In case of iii-1) rate_x+rate_y<1.0

$$G\_d1=(x,y-1) \quad \text{Expression (269)}$$

$$G\_d2=(x+1,y) \quad \text{Expression (270)}$$

$$G\_d3=(x-1,y) \quad \text{Expression (271)}$$

$$G\_d4=(x,y+1) \quad \text{Expression (272)}$$

$$G\_rate\_x=(rate\_x+rate\_y)/2+0.5 \quad \text{Expression (273)}$$

$$G\_rate\_y=(rate\_y-rate\_x)/2+0.5 \quad \text{Expression (274)}$$

In case of iii-2) rate_x+rate_y≧1.0

$$G\_d1=(x+1,y) \quad \text{Expression (275)}$$

$$G\_d2=(x+2,y+1) \quad \text{Expression (276)}$$

$$G\_d3=(x,y+1) \quad \text{Expression (277)}$$

$$G\_d4=(x+1,y+2) \quad \text{Expression (278)}$$

$$G\_rate\_x=(rate\_x+rate\_y)/2-0.5 \quad \text{Expression (279)}$$

$$G\_rate\_y=(rate\_y-rate\_x)/2+0.5 \quad \text{Expression (280)}$$

Figure 29A:
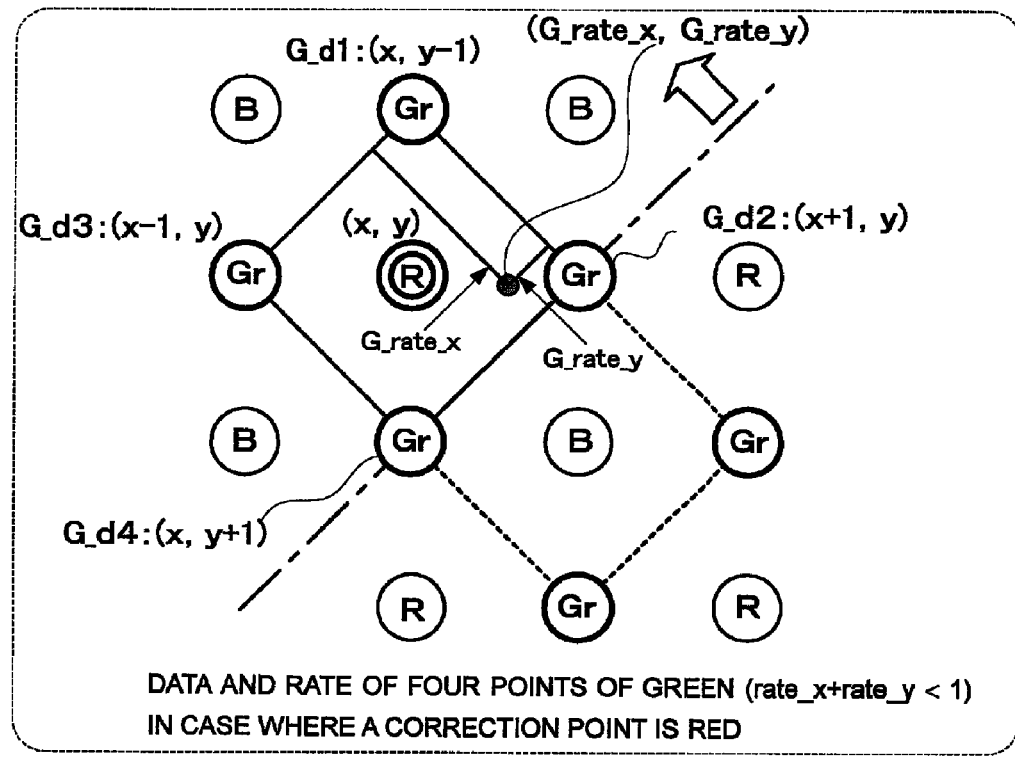
FIG. 29A is a view showing a concept of calculation of an address and a rate wherein the address: (x, y)=(even, odd) in (c) the GBRG type 27.
Figure 29B:
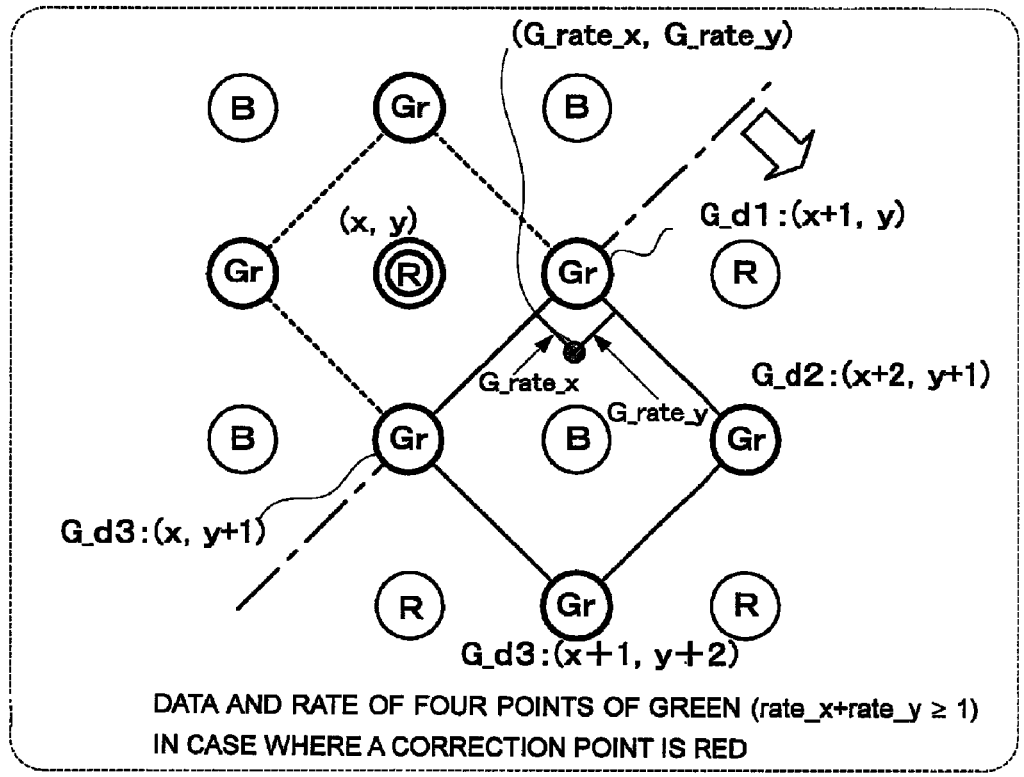
FIG. 29B is a view showing a concept of calculation of an address and a rate wherein the address: (x, y)=(even, odd) in (c) the GRBG type 27.

As shown in FIG. 29, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_x+rate_y<1.0, the rate exists within a region defined by a solid line in FIG. 29A. In case of rate_x+rate_y≧1.0, the rate exists within a region defined by a solid line in FIG. 29B.

Then, the correction point data for each color are determined by a correction calculation such as a linear operation. The method of the correction calculation is the same as the step S16.

iv) c) In Case of Address: (x, y)=(Odd, Odd) in GBRG Type 27

Now, (c) calculation of the address and the rate in case of address: (x, y)=(odd, odd) in the GBRG type 27 will be described below with reference to FIGS. 30 and 31. In this case, the color indicated by the address (x, y) is green.

As shown in FIGS. 30 and 31, the acquired data of the respective colors are indicated as "R_d1,2,3,4" (acquired data of red), "B_d1,2,3,4" (acquired data of blue), and "G_d1,2, 3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (185) to (188) and the rate may be expressed by the following Expressions (189) and (190):

$$R\_d1=(x-1,y) \quad \text{Expression (281)}$$

$$R\_d2=(x+1,y) \quad \text{Expression (282)}$$

$$R\_d3=(x-1,y+2) \quad \text{Expression (283)}$$

$$R\_d4=(x+1,y+2) \quad \text{Expression (284)}$$

$$R\_rate\_x=rate\_x/2+0.5 \quad \text{Expression (285)}$$

$$R\_rate\_y=rate\_y/2 \quad \text{Expression (286)}$$

Figure 30A:
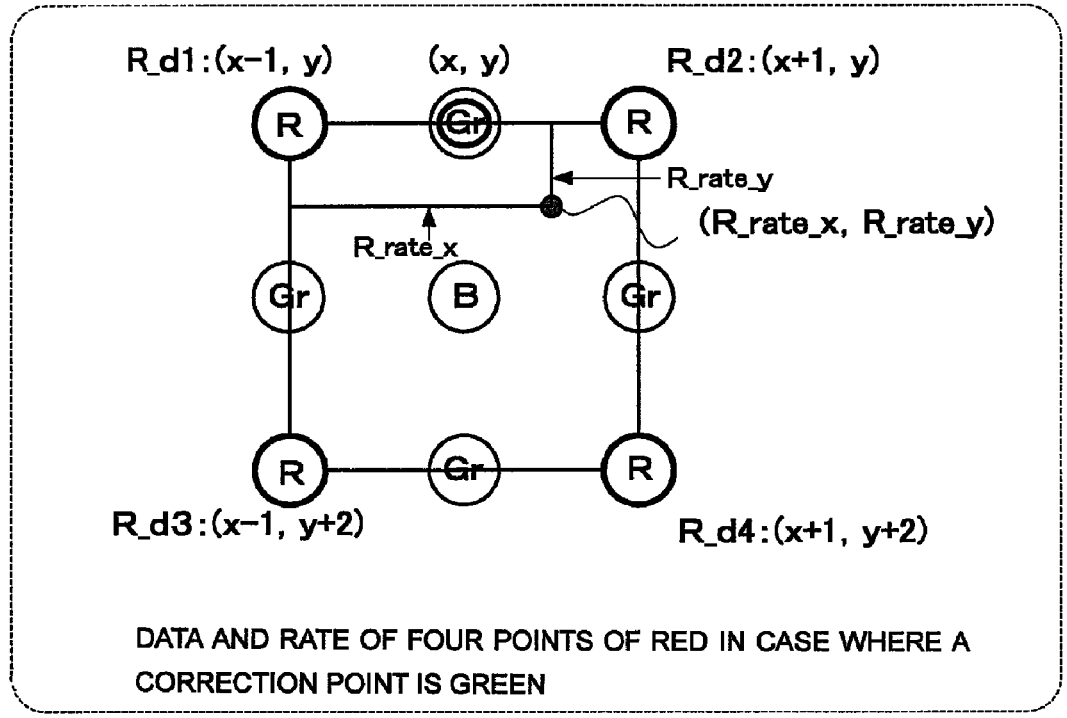
FIG. 30A is a view showing a concept of calculation of an address and a rate wherein the address: (x, y)=(odd, odd) in (c) the GBRG type 27.

As shown in FIG. 30A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (287) to (290) and the rate may be expressed by the following Expressions (291) and (292).

$$B\_d1=(x,y-1) \quad \text{Expression (287)}$$

$$B\_d2=(x+2,y-1) \quad \text{Expression (288)}$$

$$B\_d3=(x,y+1) \quad \text{Expression (289)}$$

$$B\_d4=(x+2,y+1) \quad \text{Expression (290)}$$

$$B\_rate\_x=rate\_x/2 \quad \text{Expression (291)}$$

$$B\_rate\_y=rate\_y/2+0.5 \quad \text{Expression (292)}$$

Figure 30B:
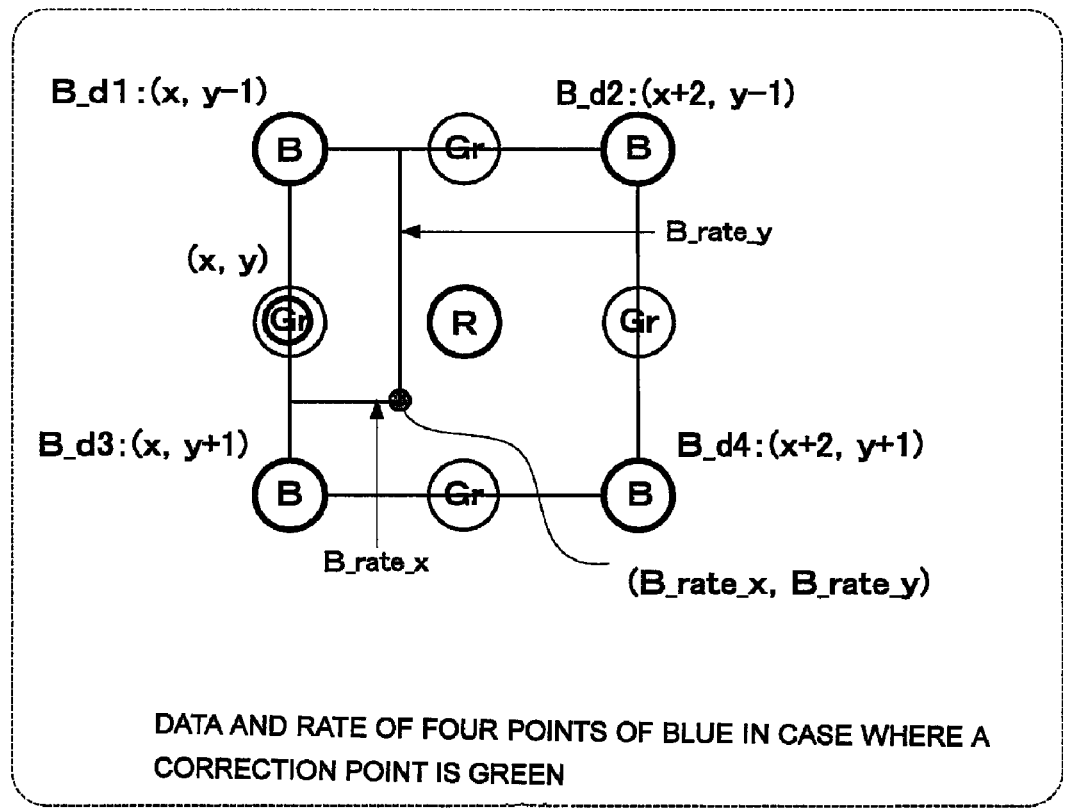
FIG. 30B is a view showing a concept of calculation of an address and a rate wherein the address: (x, y)=(odd, odd) in (c) the GRBG type 27.

As shown in FIG. 30B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (293) to (296) and the rate may be expressed by the following Expressions (297) and (298) in case of iv-1) rate_y>rate_x. In addition, the correction data may be expressed by the following Expressions (299) to (302) and the rate may be expressed by the following Expressions (303) and (304) in case of iv-2) rate_y≦rate_x.

In case of iv-1) rate_y>rate_x $$G\_d1=(x,y) \quad \text{Expression (293)}$$

$$G\_d2=(x+1,y+1) \quad \text{Expression (294)}$$

$$G\_d3=(x-1,y+1) \quad \text{Expression (295)}$$

$$G\_d4=(x,y+2) \quad \text{Expression (296)}$$

$$G\_rate\_x=(rate\_y+rate\_x)/2 \quad \text{Expression (297)}$$

$$G\_rate\_y=(rate\_y-rate\_x)/2 \quad \text{Expression (298)}$$

In case of iv-2) rate_y≦rate_x $$G\_d1=(x,y) \quad \text{Expression (299)}$$

$$G\_d2=(x+1,y+1) \quad \text{Expression (300)}$$

$$G\_d3=(x+1,y-1) \quad \text{Expression (301)}$$

$$G\_d4=(x+2,y) \quad \text{Expression (302)}$$

$$G\_rate\_x=(rate\_y+rate\_x)/2 \quad \text{Expression (303)}$$

$$G\_rate\_y=(rate\_x-rate\_y)/2 \quad \text{Expression (304)}$$

Figure 31A:
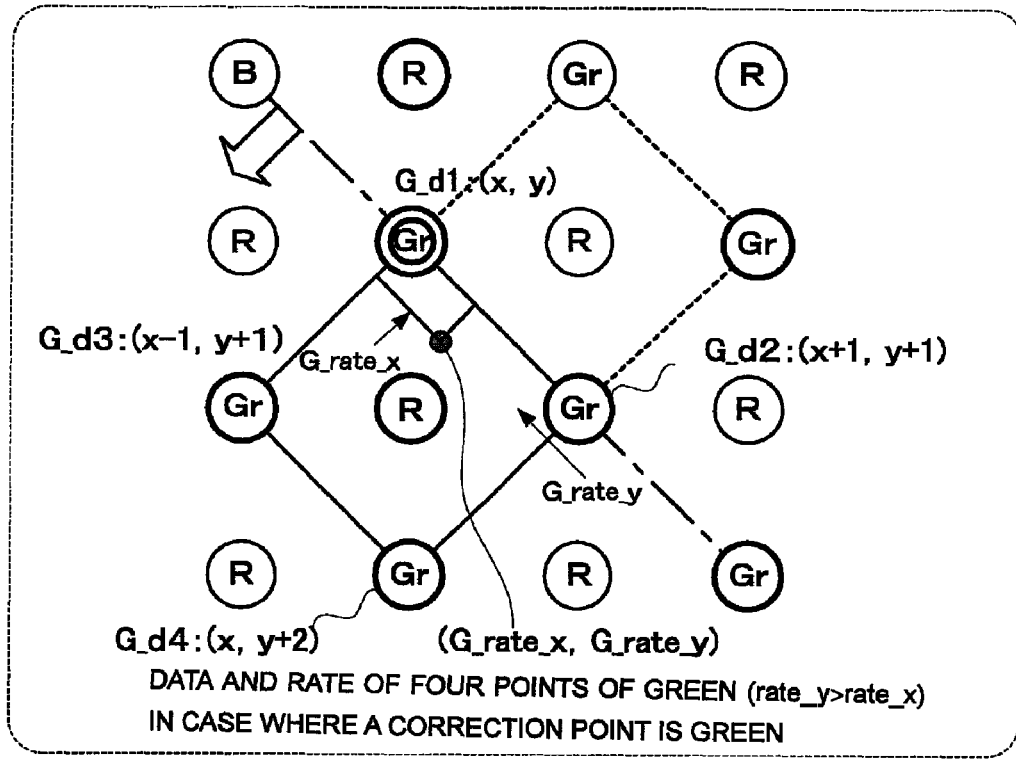
FIG. 31A is a view showing a concept of calculation of an address and a rate wherein the address: (x, y)=(odd, odd) in (c) the GBRG type 27.
Figure 31B:
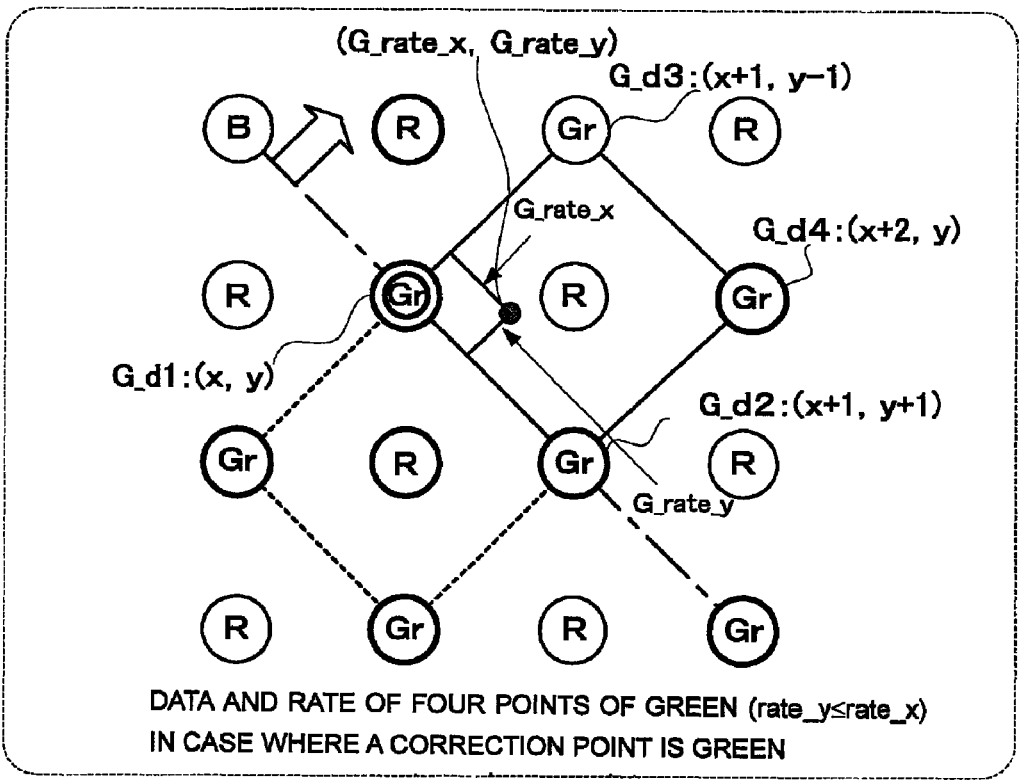
FIG. 31B is a view showing a concept of calculation of an address and a rate wherein the address: (x, y)=(odd, odd) in (c) the GRBG type 27.

As shown in FIG. 31, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_y>rate_x, the rate exists within a region defined by a solid line in FIG. 31A. In case of rate_y≦rate_x, the rate exists within a region defined by a solid line in FIG. 31B.

Then, the correction point data for each color are determined by a correction calculation such as a linear operation. The method of the correction calculation is the same as the step S16.

(D) (d) Calculation of Address and Rate in the BGGR Type 28 i) d) In Case of Address: (x, y)=(Even, Even) in the BGGR Type 28

Now, (d) calculation of the address and the rate in case of address: (x, y)=(even, even) in the BGGR type 28 will be described below with reference to FIGS. 32 and 33. In this case, the color indicated by the address (x, y) is blue.

As shown in FIGS. 32 and 33, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (305) to (308) and the rate may be expressed by Expressions (309) and (310).

$$R\_d1=(x-1,y-1) \quad \text{Expression (305)}$$

$$R\_d2=(x+1,y-1) \quad \text{Expression (306)}$$

$$R\_d3=(x-1,y+1) \quad \text{Expression (307)}$$

$$R\_d4=(x+1,y+1) \quad \text{Expression (308)}$$

$$R\_rate\_x=rate\_x/2+0.5 \quad \text{Expression (309)}$$

$$R\_rate\_y=rate\_y/2+0.5 \quad \text{Expression (310)}$$

Figure 32A:
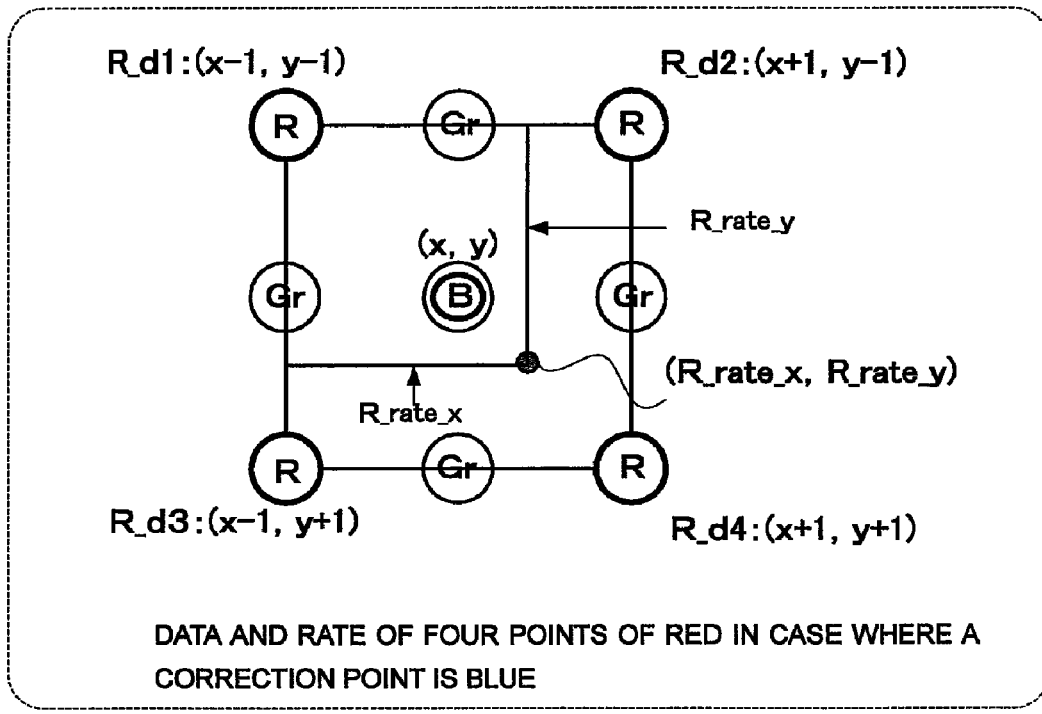
FIG. 32A is a view showing a concept of calculation of an address and a rate wherein the address: (x, y)=(even, even) in (d) a BGGR type 28.

As shown in FIG. 32A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (311) to (314) and the rate may be expressed by the following Expressions (315) and (316):

$$B\_d1=(x,y) \quad \text{Expression (311)}$$

$$B\_d2=(x+2,y) \quad \text{Expression (312)}$$

$$B\_d3=(x,y+2) \quad \text{Expression (313)}$$

$$B\_d4=(x+2,y+2) \quad \text{Expression (314)}$$

$$B\_rate\_x=rate\_x/2 \quad \text{Expression (315)}$$

$$B\_rate\_y=rate\_y/2 \quad \text{Expression (316)}$$

Figure 32B:
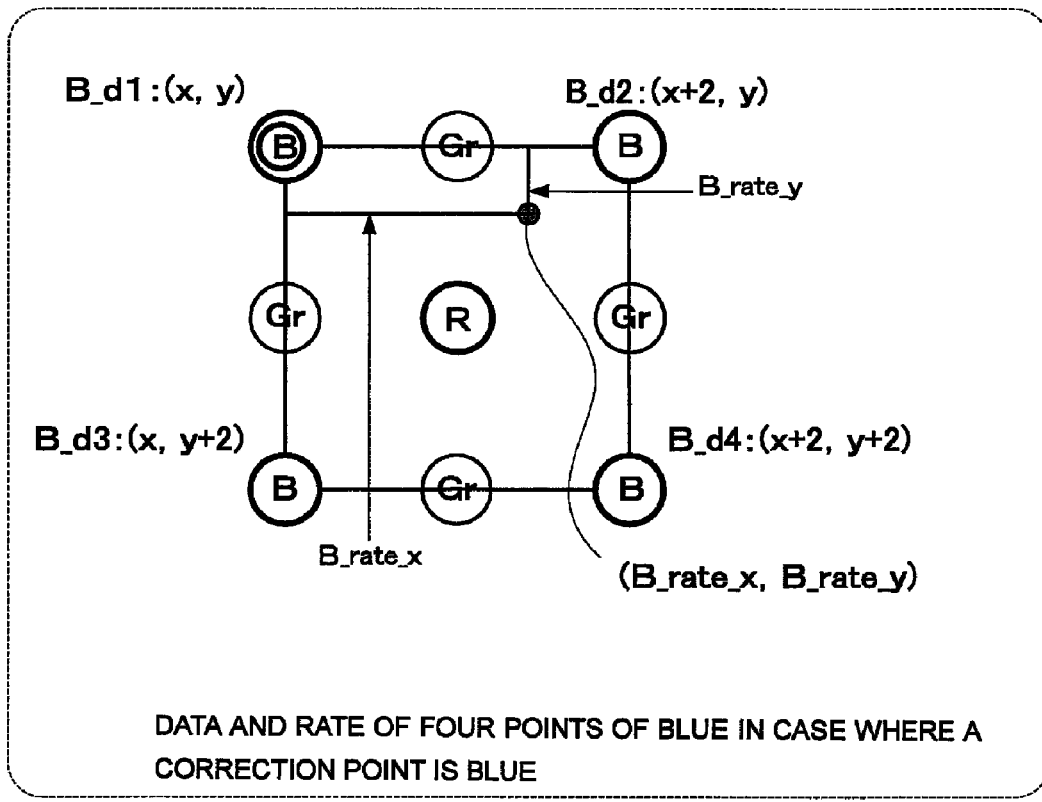
FIG. 32B is a view showing a concept of calculation of an address and a rate wherein the address: (x, y)=(even, even) in (d) the BGGR type 28.

As shown in FIG. 32B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (317) to (320) and the rate may be expressed by Expressions (323) and (326) in case of i-1) rate_x+rate_y<1.0. In addition, the correction data may be expressed by the following Expressions (323) to (326) and the rate may be expressed by the following Expressions (327) and (328) in case of i-2) rate_x+rate_y≧1.0.

In case of i-1) rate_x+rate_y<1.0

$$G\_d1=(x,y-1) \quad \text{Expression (317)}$$

$$G\_d2=(x+1,y) \quad \text{Expression (318)}$$

$$G\_d3=(x-1,y) \quad \text{Expression (319)}$$

$$G\_d4=(x,y+1) \quad \text{Expression (320)}$$

$$G\_rate\_x=(rate\_y+rate\_x)/2+0.5 \quad \text{Expression (321)}$$

$$G\_rate\_y=(rate\_y-rate\_x)/2+0.5 \quad \text{Expression (322)}$$

In case of i-2) rate_x+rate_y≧1.0

$$G\_d1=(x+1,y) \quad \text{Expression (323)}$$

$$G\_d2=(x+2,y+1) \quad \text{Expression (324)}$$

$$G\_d3=(x,y+1) \quad \text{Expression (325)}$$

$$G\_d4=(x+1,y+2) \quad \text{Expression (326)}$$

$$G\_rate\_x=(rate\_y+rate\_x)/2+0.5 \quad \text{Expression (327)}$$

$$G\_rate\_y=(rate\_y-rate\_x)/2+0.5 \quad \text{Expression (328)}$$

Figure 33A:
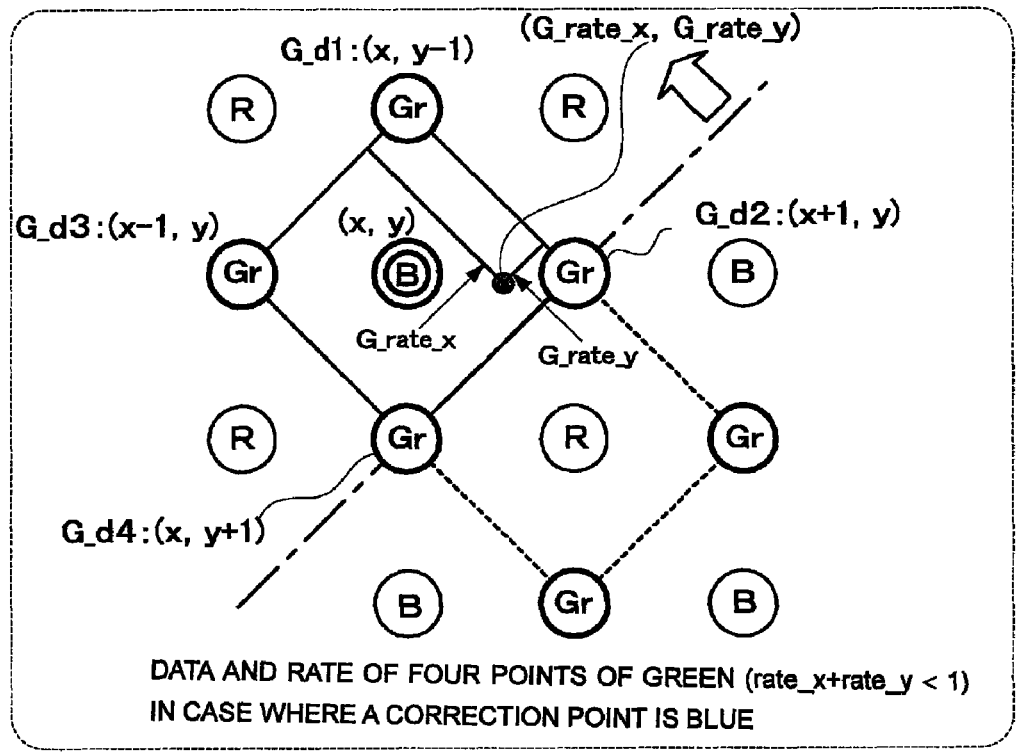
FIG. 33A is a view showing a concept of calculation of an address and a rate wherein the address: (x, y)=(even, even) in (d) the BGGR type 28.
Figure 33B:
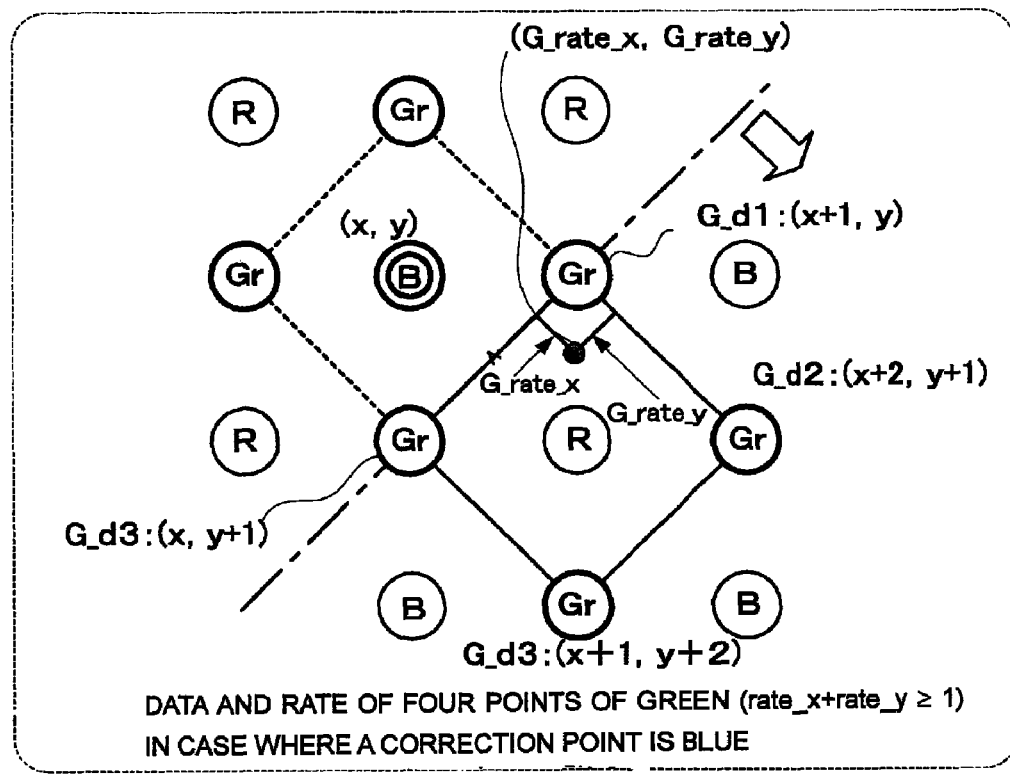
FIG. 33B is a view showing a concept of calculation of an address and a rate wherein the address: (x, y)=(even, even) in (d) the BGGR type 28.

As shown in FIG. 33, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_x+rate_y<1.0, the rate exists within a region defined by a solid line in FIG. 33A. In case of rate_x+rate_y≧1.0, the rate exists within a region defined by a solid line in FIG. 33B.

Then, the correction point data for each color are determined by a correction calculation such as a linear operation. The method of the correction calculation is the same as the step S16.

ii) d) In Case of Address: (x, y)=(Odd, Even) in BGGR Type 28

Now, (d) calculation of the address and the rate in case of address: (x, y)=(odd, even) in the BGGR type 28 will be described below with reference to FIGS. 34 and 35. In this case, the color indicated by the address (x, y) is green.

As shown in FIGS. 34 and 35, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y"

(rate of red), "B_rate_x" (rate of blue), "B_rate_y" (rate of blue), "G_rate_x" (rate of green), and "G_rate_y" (rate of green).

The correction data of red may be expressed by the following Expressions (329) to (332) and the rate may be expressed by the following Expressions (333) and (334):

$$R\_d1=(x,y-1) \quad \text{Expression (329)}$$

$$R\_d2=(x+2,y-1) \quad \text{Expression (330)}$$

$$R\_d3=(x,y+1) \quad \text{Expression (331)}$$

$$R\_d4=(x+2,y+1) \quad \text{Expression (332)}$$

$$R\_rate\_x=rate\_x/2 \quad \text{Expression (333)}$$

$$R\_rate\_y=rate\_y/2+0.5 \quad \text{Expression (334)}$$

Figure 34A:
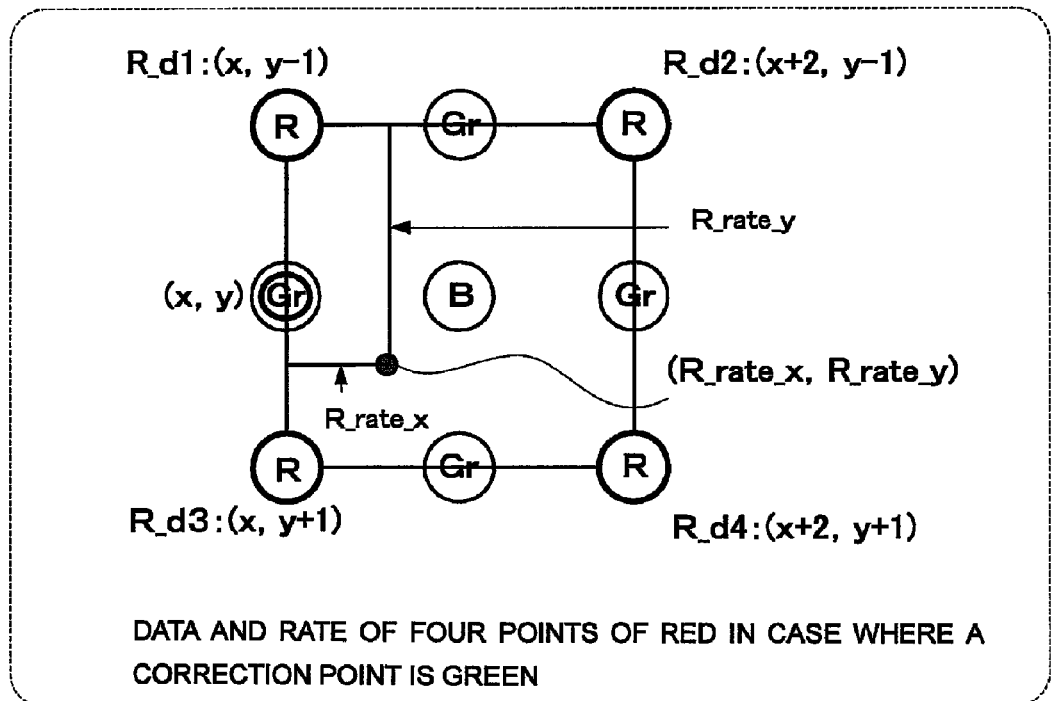
FIG. 34A is a view showing a concept of calculation of an address and a rate wherein the address: (x, y)=(odd, even) in (d) the BGGR type 28.

As shown in FIG. 34A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (335) to (338) and the rate may be expressed by the following Expressions (339) and (340).

$$B\_d1=(x-1,y) \quad \text{Expression (335)}$$

$$B\_d2=(x+1,y) \quad \text{Expression (336)}$$

$$B\_d3=(x-1,y+2) \quad \text{Expression (337)}$$

$$B\_d4=(x+1,y+2) \quad \text{Expression (338)}$$

$$B\_rate\_x=rate\_x/2+0.5 \quad \text{Expression (339)}$$

$$B\_rate\_y=rate\_y/2 \quad \text{Expression (340)}$$

Figure 34B:
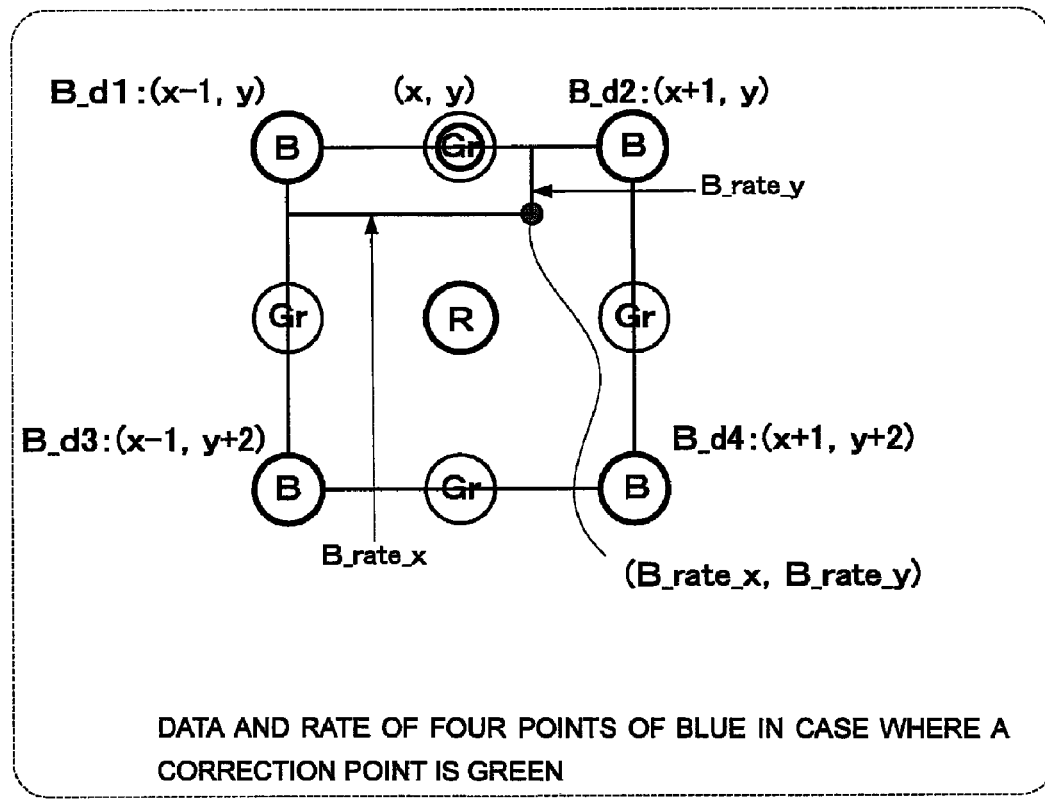
FIG. 34B is a view showing a concept of calculation of an address and a rate wherein the address: (x, y)=(odd, even) in (d) the BGGR type 28.

As shown in FIG. 34B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (341) to (344) and the rate may be expressed by the following Expressions (345) and (346) in case of ii-1) rate_y>rate_x. In addition, the correction data may be expressed by the following Expressions (347) to (350) and the rate may be expressed by the following Expressions (351) and (352) in case of ii-2) rate_y≦rate_x.

In case of ii-1) rate_y>rate_x $$G\_d1=(x,y) \quad \text{Expression (341)}$$

$$G\_d2=(x+1,y+1) \quad \text{Expression (342)}$$

$$G\_d3=(x-1,y+1) \quad \text{Expression (343)}$$

$$G\_d4=(x,y+2) \quad \text{Expression (344)}$$

$$G\_rate\_x=(rate\_x+rate\_y)/2 \quad \text{Expression (345)}$$

$$G\_rate\_y=(rate\_y-rate\_x)/2 \quad \text{Expression (346)}$$

In case of ii-2) rate_y≦rate_x $$G\_d1=(x,y) \quad \text{Expression (347)}$$

$$G\_d2=(x+1,y+1) \quad \text{Expression (348)}$$

$$G\_d3=(x+1,y-1) \quad \text{Expression (349)}$$

$$G\_d4=(x+2,y) \quad \text{Expression (350)}$$

$$G\_rate\_x=(rate\_y+rate\_x)/2 \quad \text{Expression (351)}$$

$$G\_rate\_y=(rate\_x-rate\_y)/2 \quad \text{Expression (352)}$$

Figure 35A:
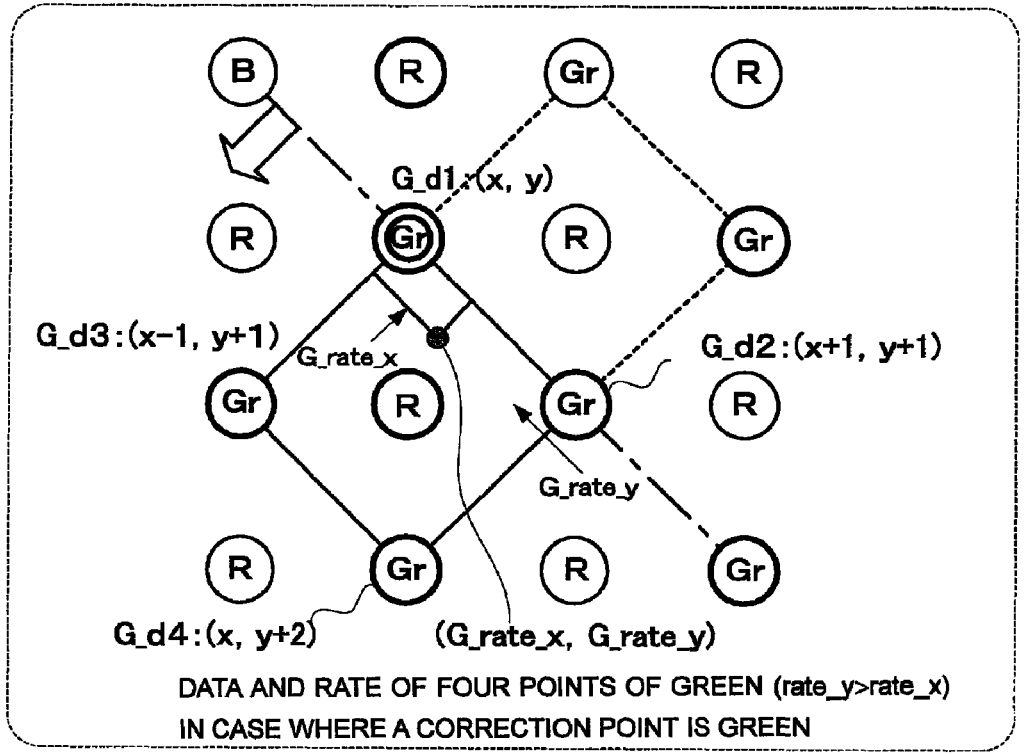
FIG. 35A is a view showing a concept of calculation of an address and a rate wherein the address: (x, y)=(odd, even) in (d) the BGGR type 28.
Figure 35B:
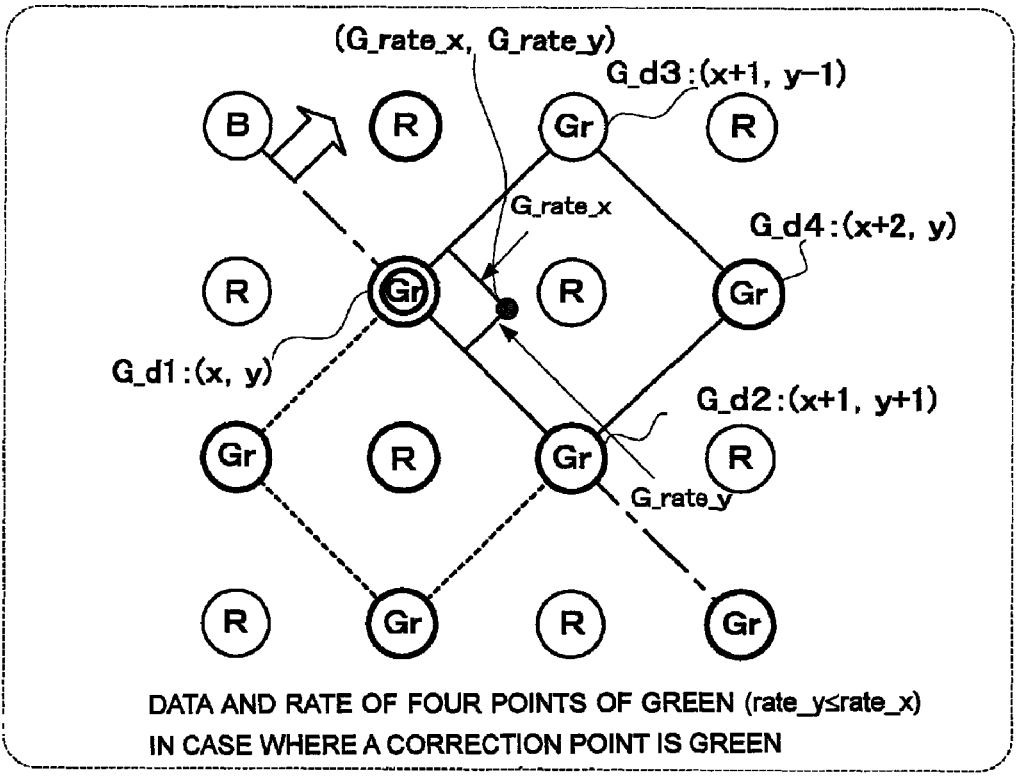
FIG. 35B is a view showing a concept of calculation of an address and a rate wherein the address: (x, y)=(odd, even) in (d) the BGGR type 28.

As shown in FIG. 35, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_y>rate_x, the rate exists within a region defined by a solid line in FIG. 35A. In case of rate_y≦rate_x, the rate exists within a region defined by a solid line in FIG. 35B.

Then, the correction point data for each color are determined by a correction calculation such as a linear operation. The method of the correction calculation is the same as the step S16.

iii) d) In Case of Address: (x, y)=(Even, Odd) in the BGGR Type 28

Now, (d) calculation of the address and the rate in case of address: (x, y)=(even, odd) in the BGGR type 28 will be described below with reference to FIGS. 36 and 37. In this case, the color indicated by the address (x, y) is green.

As shown in FIGS. 36 and 37, the acquired data of the respective colors are indicated as "R_d1,2,3,4" (acquired data of red), "B_d1,2,3,4" (acquired data of blue), and "G_d1,2,3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (353) to (356) and the rate may be expressed by the following Expressions (357) and (358):

$$R\_d1=(x-1,y) \quad \text{Expression (353)}$$

$$R\_d2=(x+1,y) \quad \text{Expression (354)}$$

$$R\_d3=(x-1,y+2) \quad \text{Expression (355)}$$

$$R\_d4=(x+1,y+2) \quad \text{Expression (356)}$$

$$R\_rate\_x=rate\_x/2+0.5 \quad \text{Expression (357)}$$

$$R\_rate\_y=rate\_y/2 \quad \text{Expression (358)}$$

Figure 36A:
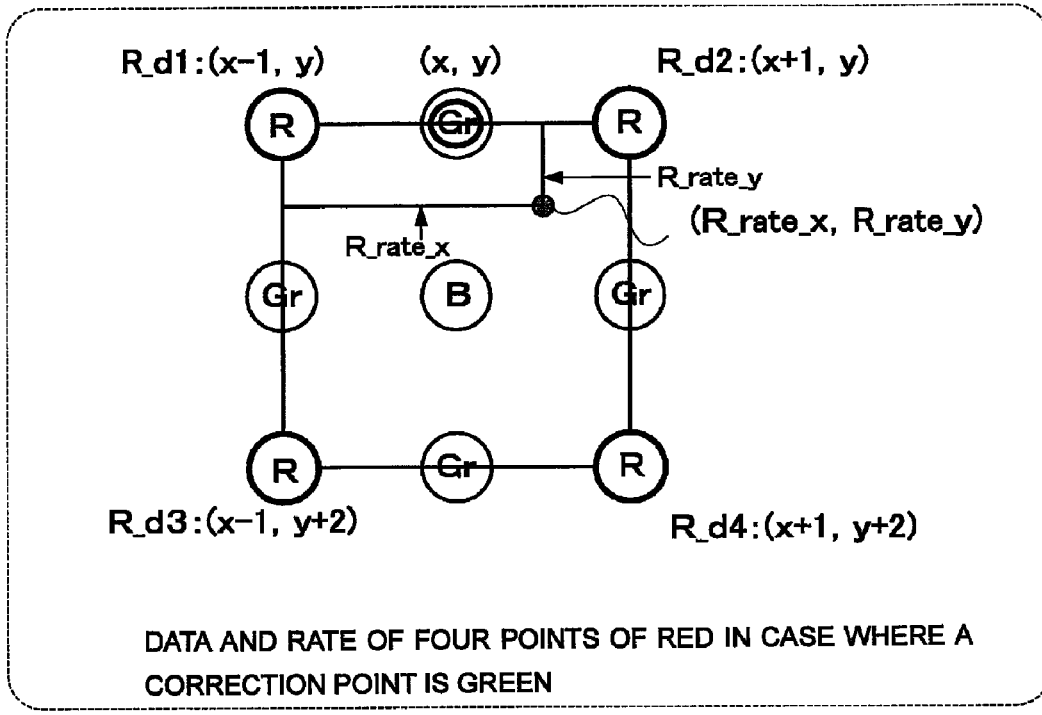
FIG. 36A is a view showing a concept of calculation of an address and a rate wherein the address: (x, y)=(even, odd) in (d) the BGGR type 28.

As shown in FIG. 36A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (359) to (362) and the rate may be expressed by the following Expressions (363) and (364).

$$B\_d1=(x,y-1) \quad \text{Expression (359)}$$

$$B\_d2=(x+2,y-1) \quad \text{Expression (360)}$$

$$B\_d3=(x,y+1) \quad \text{Expression (361)}$$

$$B\_d4=(x+2,y+1) \quad \text{Expression (362)}$$

$$B\_rate\_x=rate\_x/2 \quad \text{Expression (363)}$$

$$B\_rate\_y=rate\_y/2+0.5 \quad \text{Expression (364)}$$

Figure 36B:
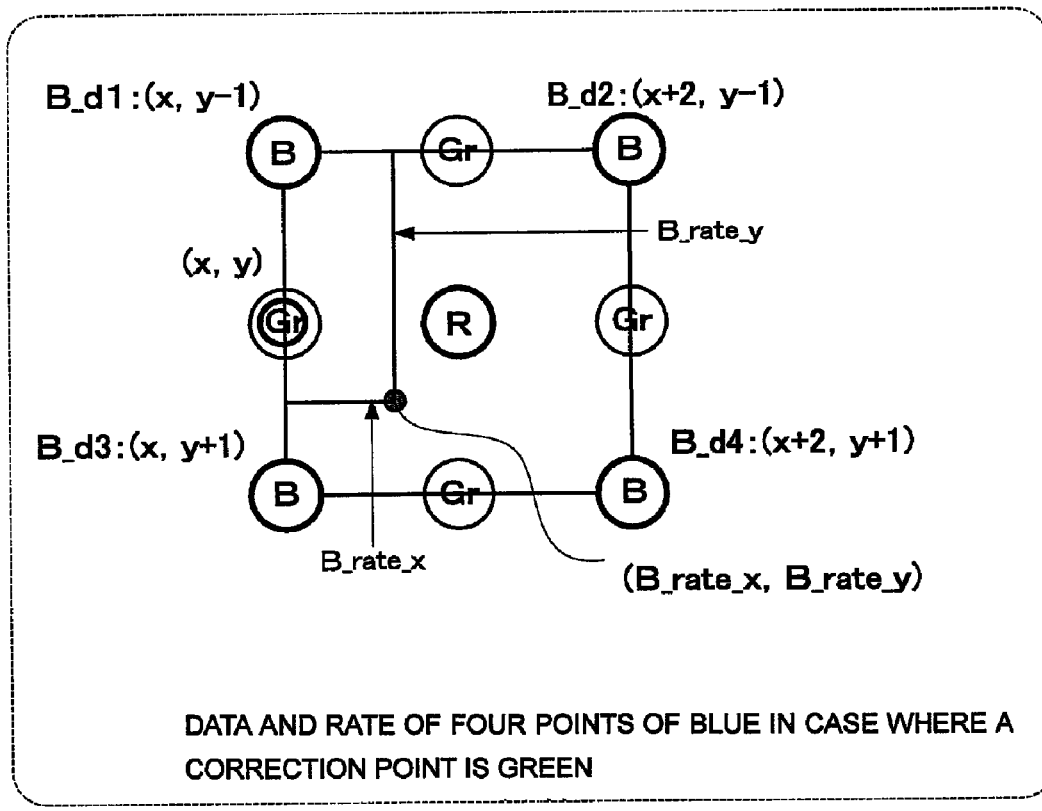
FIG. 36B is a view showing a concept of calculation of an address and a rate wherein the address: (x, y)=(even, odd) in (d) the BGGR type 28.

As shown in FIG. 36B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (365) to (368) and the rate may be expressed by the following Expressions (369) and (370) in case of iii-1) rate_y>rate_x. In addition, the correction data may be expressed by the following Expressions (371) to (374) and the rate may be expressed by the following Expressions (375) and (376) in case of iii-2) rate_y≦rate_x.

In case of iii-1) rate_y>rate_x $G\_d1=(x,y)$  Expression (365)

$G\_d2=(x+1,y+1)$  Expression (366)

$G\_d3=(x-1,y+1)$  Expression (367)

$G\_d4=(x,y+2)$  Expression (368)

$G\_rate\_x=(rate\_y+rate\_x)/2$  Expression (369)

$G\_rate\_y=(rate\_y-rate\_x)/2$  Expression (370)

In case of iii-2) rate_y≦rate_x $G\_d1=(x,y)$  Expression (371)

$G\_d2=(x+1,y+1)$  Expression (372)

$G\_d3=(x+1,y-1)$  Expression (373)

$G\_d4=(x+2,y)$  Expression (374)

$G\_rate\_x=(rate\_y+rate\_x)/2$  Expression (375)

$G\_rate\_y=(rate\_x-rate\_y)/2$  Expression (376)

Figure 37A:
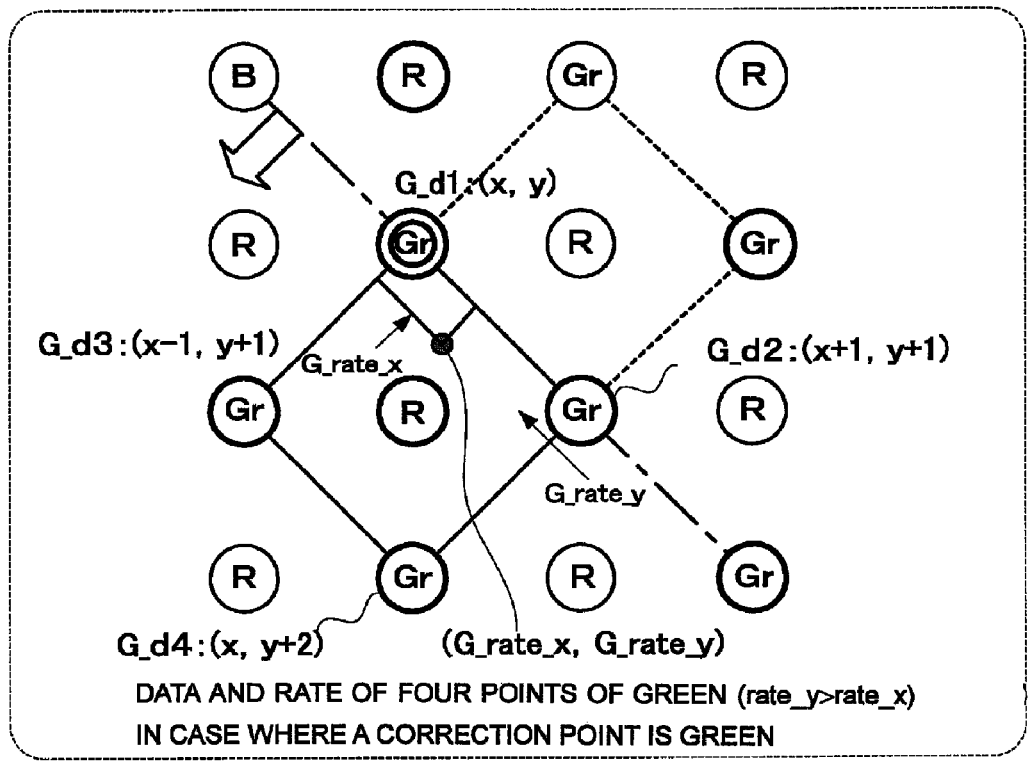
FIG. 37A is a view showing a concept of calculation of an address and a rate wherein the address: (x, y)=(even, odd) in (d) the BGGR type 28.
Figure 37B:
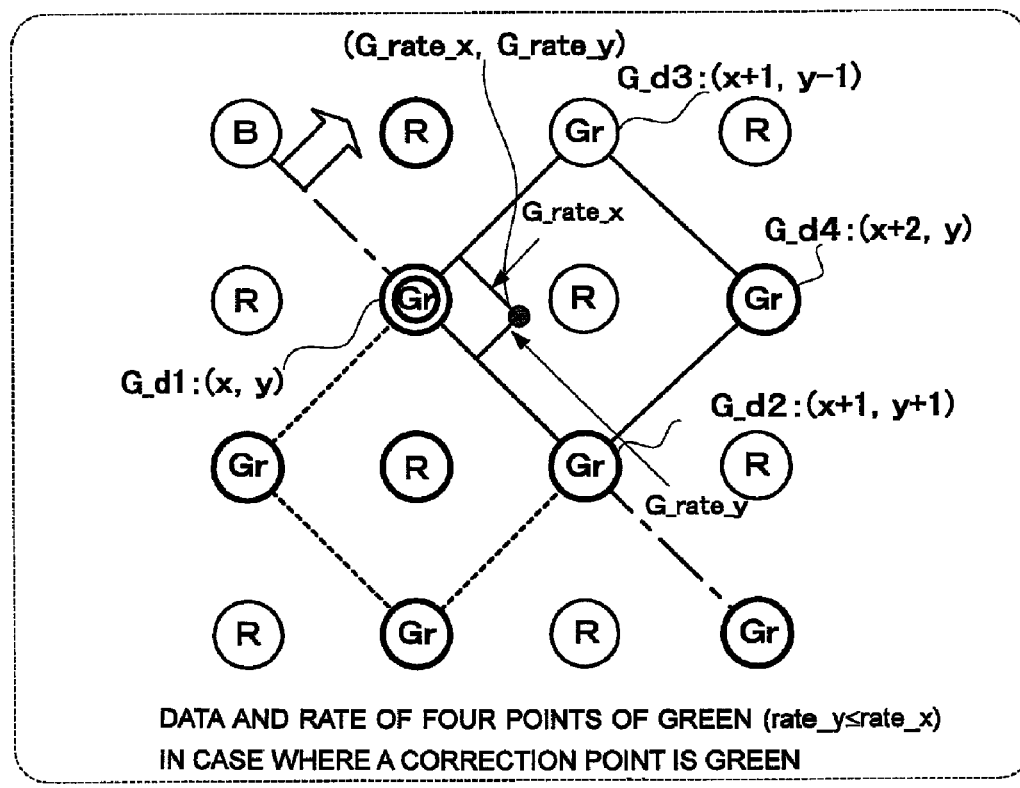
FIG. 37B is a view showing a concept of calculation of an address and a rate wherein the address: (x, y)=(even, odd) in (d) the BGGR type 28.

As shown in FIG. 37, the distance between the adjacent pixels may be expressed by "1", and the distance between the adjacent green pixels may be expressed by "root 2". The distance between the adjacent green pixels are normalized as "1", and accordingly, the rate may be expressed as "1/root 2". In case of rate_y>rate_x, the rate exists within a region defined by a solid line in FIG. 37A. In case of rate_y≦rate_x, the rate exists within a region defined by a solid line in FIG. 37B.

Then, the correction point data for each color are determined by a correction calculation such as a linear operation. The method of the correction calculation is the same as the step S16.

iv) d) In Case of Address: (x, y)=(Odd, Odd) in BGGR Type 28

Now, (c) calculation of the address and the rate in case of address: (x, y)=(odd, odd) in the BGGR type 28 will be described below with reference to FIGS. 38 and 39. In this case, the color indicated by the address (x, y) is red.

As shown in FIGS. 38 and 39, the acquired data of the respective colors are indicated as "R_d1,2,3,4" (acquired data of red), "B_d1,2,3,4" (acquired data of blue), and "G_d1,2, 3,4" (acquired data of green), and the rate of the respective colors are indicated as "R_rate_x" (rate of red), "R_rate_y" (rate of red), "B_rate_x" (rate of blue), "B_rate_y" (rate of blue), "G_rate_x" (rate of green), and "G_rate_y" (rate of green).

The correction data of red may be expressed by the following Expressions (377) to (380) and the rate may be expressed by the following Expressions (381) and (382):

$R\_d1=(x,y)$  Expression (377)

$R\_d2=(x+2,y)$  Expression (378)

$R\_d3=(x,y+2)$  Expression (379)

$R\_d4=(x+2,y+2)$  Expression (380)

$R\_rate\_x=rate\_x/2$  Expression (381)

$R\_rate\_y=rate\_y/2$  Expression (382)

Figure 38A:
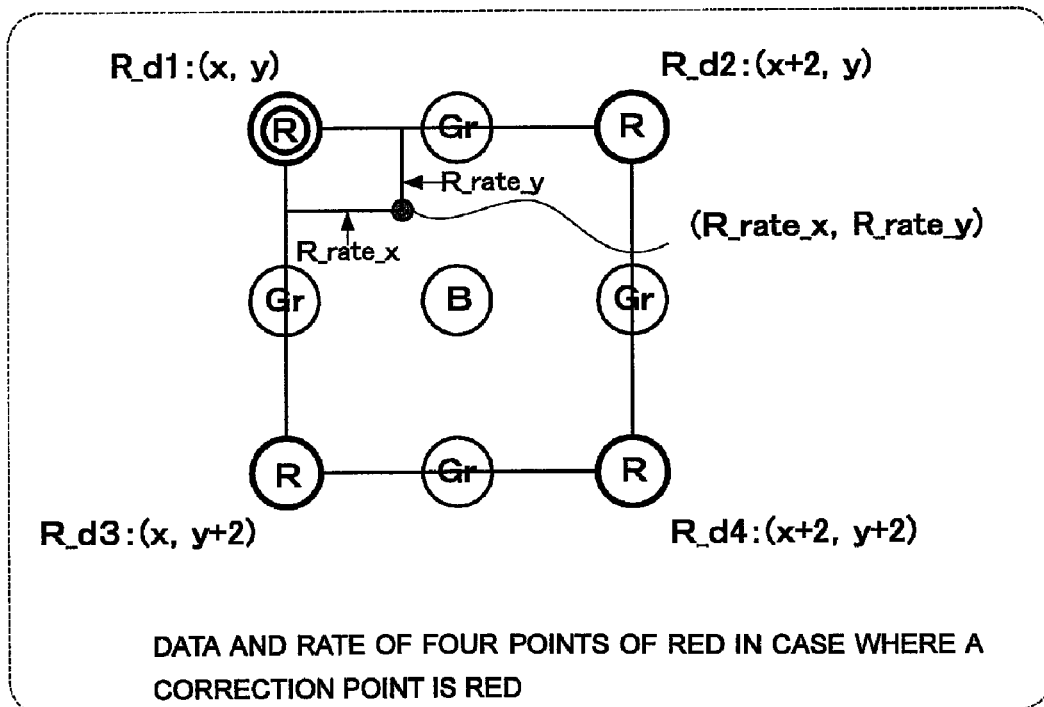
FIG. 38A is a view showing a concept of calculation of an address and a rate wherein the address: (x, y)=(odd, odd) in (d) the BGGR type 28.

As shown in FIG. 38A, the distance between the adjacent pixels may be expressed by "1", and the distance between the adjacent red pixels may be expressed by "2". The distance between the adjacent red pixels are normalized as "1", and accordingly, the rate may be expressed as "1/2".

Then, the correction data of blue are expressed by the following Expressions (383) to (386) and the rate may be expressed by the following Expressions (387) and (388).

$B\_d1=(x-1,y-1)$  Expression (383)

$B\_d2=(x+1,y-1)$  Expression (384)

$B\_d3=(x-1,y+1)$  Expression (385)

$B\_d4=(x+1,y+1)$  Expression (386)

$B\_rate\_x=rate\_x/2+0.5$  Expression (387)

$B\_rate\_y=rate\_y/2+0.5$  Expression (388)

Figure 38B:
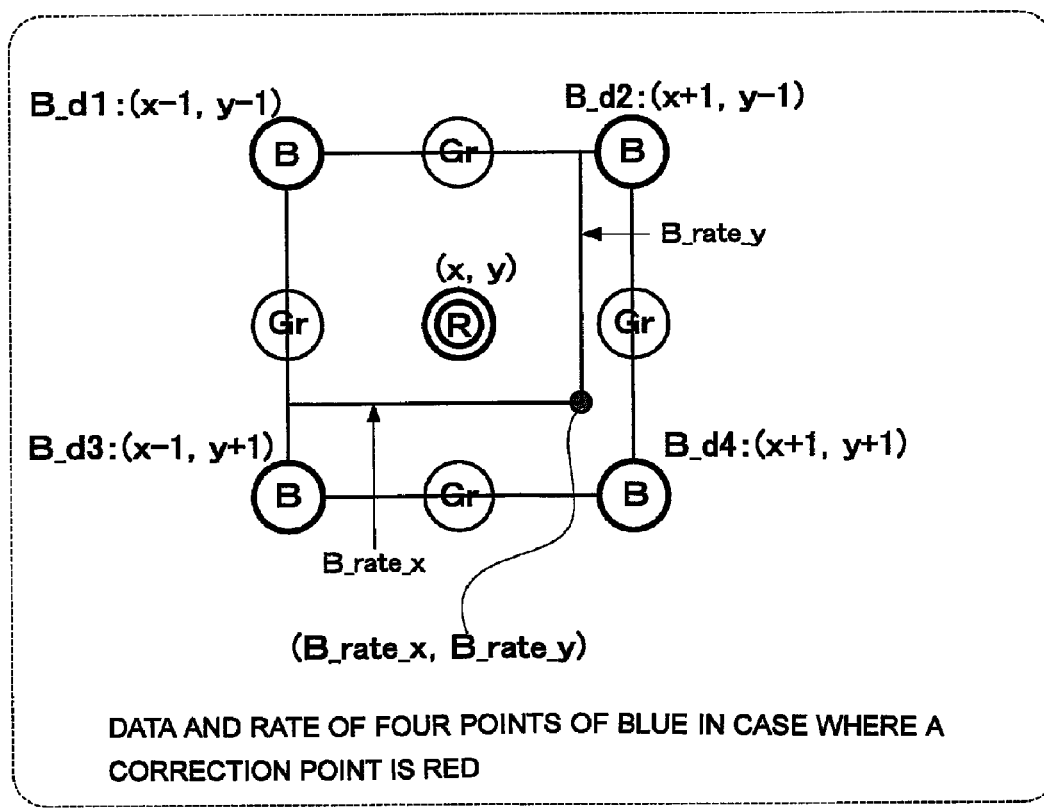
FIG. 38B is a view showing a concept of calculation of an address and a rate wherein the address: (x, y)=(odd, odd) in (d) the BGGR type 28.

As shown in FIG. 38B, the distance between the adjacent pixels may be expressed by "1", and the distance between the adjacent blue pixels may be expressed by "2". The distance between the adjacent blue pixels are normalized as "1", and accordingly, the rate may be expressed as "1/2".

Then, the correction data of green may be expressed by the following Expressions (389) to (392) and the rate may be expressed by the following Expressions (393) and (394) in case of iv-1) rate_x+rate_y<1.0. In addition, the correction data may be expressed by the following Expressions (395) to (398) and the rate may be expressed by the following Expressions (399) and (400) in case of iv-2) rate_x+rate_y≧1.0.

In case of iv-1) rate_x+rate_y<1.0

$G\_d1=(x,y-1)$  Expression (389)

$G\_d2=(x+1,y)$  Expression (390)

$G\_d3=(x-1,y)$  Expression (391)

$G\_d4=(x,y+1)$  Expression (392)

$G\_rate\_x=(rate\_x+rate\_y)/2+0.5$  Expression (393)

$G\_rate\_y=(rate\_y-rate\_x)/2+0.5$  Expression (394)

In case of iv-2) rate_x+rate_y≧1.0

$G\_d1=(x+1,y)$  Expression (395)

$G\_d2=(x+2,y+1)$  Expression (396)

$G\_d3=(x,y+1)$  Expression (397)

$G\_d4=(x+1,y+2)$  Expression (398)

$G\_rate\_x=(rate\_x+rate\_y)/2-0.5$  Expression (399)

$G\_rate\_y=(rate\_y-rate\_x)/2+0.5$  Expression (400)

As shown in FIG. 39, the distance between the adjacent pixels may be expressed by "1", and the distance between the adjacent green pixels may be expressed by "root 2". The distance between the adjacent green pixels are normalized as "1", and accordingly, the rate may be expressed as "1/root 2".

Figure 39A:
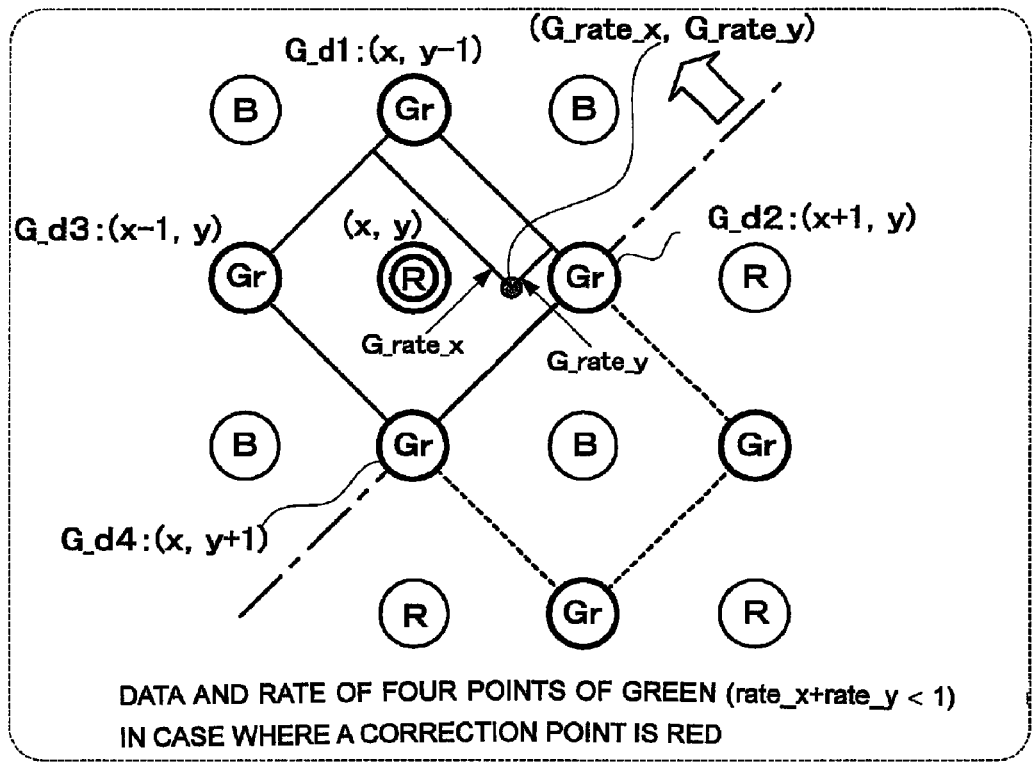
FIG. 39A is a view showing a concept of calculation of an address and a rate wherein the address: (x, y)=(odd, odd) in (d) the BGGR type 28.
Figure 39B:
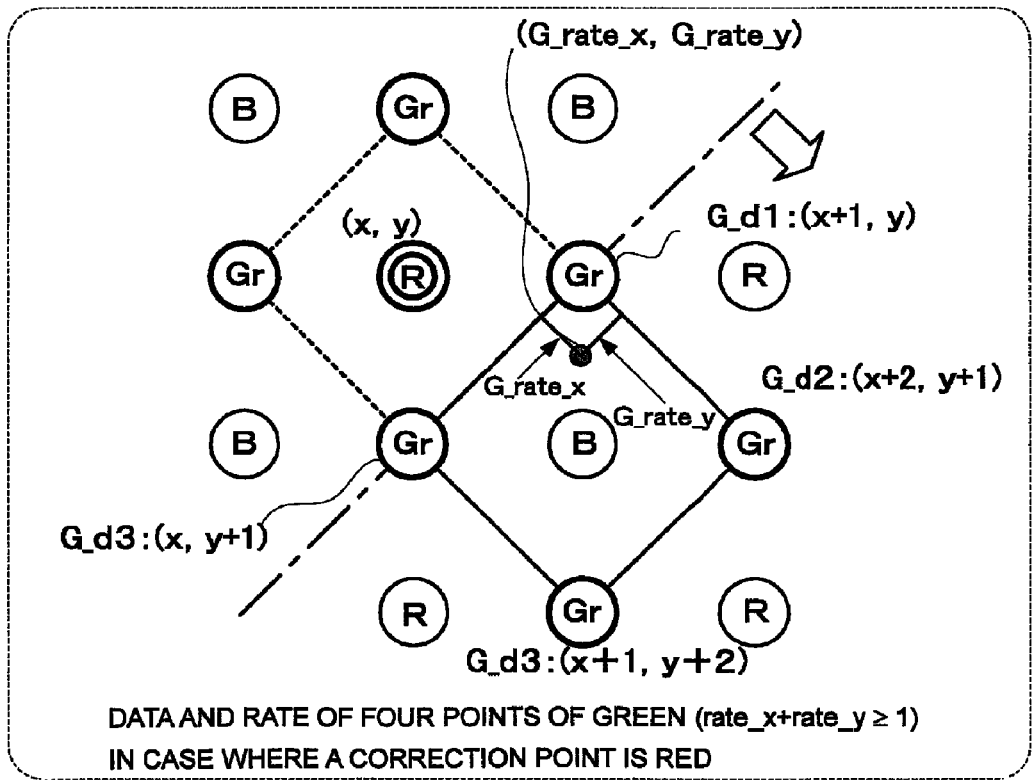
FIG. 39B is a view showing a concept of calculation of an address and a rate wherein the address: (x, y)=(odd, odd) in (d) the BGGR type 28.

In case of rate_x+rate_y<1.0, the rate exists within a region defined by a solid line in FIG. 39A. In case of rate_x+rate_y≧1.0, the rate exists within a region defined by a solid line in FIG. 39B.

Then, the correction point data for each color are determined by a correction calculation such as a linear operation. The method of the correction calculation is the same as the step S16.

According to the embodiment of the present invention as described above, the fish-eye image corrected address generating section 8 generates the output data pixel information, and the interpolation calculation section 12 acquires the input data color information, based on the input data pixel information as calculated based on the color filter array of the Bayer pattern, and calculates the output data color information through the linear operation, based on the above-mentioned input data color information.

It is therefore possible to acquire the RGB data from the input data, without using an exclusive processing circuit, thus performing an image conversion with a high image quality in a simpler structure at a low cost.

1 - - - optical system
1a - - - fish-eye lens
1b - - - image sensor
2 - - - camera I/F
3 - - - image correction signal processing circuit section
4 - - - corrected coordinate input section
5 - - - display monitor
6 - - - input frame memory
7 - - - UART or USB communication unit
8 - - - fish-eye image corrected address generation section
9 - - - Bayer pattern data correction calculation section
10 - - - output frame memory
11 - - - data acquiring control section
12 - - - interpolation calculation section
13 - - - data writing control section
S - - - image processing apparatus The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2009-093384 filed on Apr. 7, 2009 including the specification, claims, drawings and summary is incorporated herein by reference in its entirety.

What is claimed is:

1. An image processing apparatus that converts an input data, which is indicative of a fish-eye image as captured through a fish-eye lens, into an output data, which is indicative of a plane image that is two-dimensionally visible, said apparatus comprising:

an input data conversion unit that converts said fish-eye image into said input data, said input data comprising an input data pixel information indicative of pixels of which said fish-eye image is composed, and an input data color information indicative of a color information corresponding to said pixels;

a fish-eye image corrected address generating unit that generates, based on said input data pixel information, an output data pixel information indicative of the pixels of which said plane image is composed;

an input data color information acquiring unit that acquires said input data color information based on a pattern of a color filter array of a Bayer pattern;

an output data color information calculating unit that calculates, based on said input data color information, an output data color information indicative of the color information corresponding to the pixels of which said plane image is composed;

an output data generating unit that generates said output data comprising said output data pixel information and said output data color information; and a storage unit that stores said input data and said output data.

2. The apparatus as claimed in claim 1, wherein:
said output data color information calculating unit performs a linear operation to calculate said output data color information.

3. A computer-readable recording medium on which an image processing program is stored, said program is to be executed by a computer included in an image processing apparatus that converts an input data, which is indicative of a fish-eye image as captured through a fish-eye lens, into an output data, which is indicative of a plane image that is two-dimensionally visible, to cause the computer to function as:

an input data conversion unit that converts said fish-eye image into said input data, said input data comprising an input data pixel information indicative of pixels of which said fish-eye image is composed, and an input data color information indicative of a color information corresponding to said pixels;

a fish-eye image corrected address generating unit that generates, based on said input data pixel information, an output data pixel information indicative of the pixels of which said plane image is composed;

an input data color information acquiring unit that acquires said input data color information based on a pattern of a color filter array of a Bayer pattern;

an output data color information calculating unit that calculates, based on said input data color information, an output data color information indicative of the color information corresponding to the pixels of which said plane image is composed;

an output data generating unit that generate said output data comprising said output data pixel information and said output data color information; and a storage unit that stores said input data and said output data.

* * * * *